US012172861B2

(12) United States Patent
Abe et al.

(10) Patent No.: US 12,172,861 B2
(45) Date of Patent: Dec. 24, 2024

(54) MEDIUM PROCESSING DEVICE, STORAGE MEDIUM, AND IMAGE FORMING SYSTEM

(71) Applicants: Kohta Abe, Kanagawa (JP); Kei Sasaki, Kanagawa (JP); Kazuki Seto, Kanagawa (JP); Kazuki Mishina, Kanagawa (JP); Naoki Kobayashi, Kanagawa (JP)

(72) Inventors: Kohta Abe, Kanagawa (JP); Kei Sasaki, Kanagawa (JP); Kazuki Seto, Kanagawa (JP); Kazuki Mishina, Kanagawa (JP); Naoki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/174,061

(22) Filed: Feb. 24, 2023

(65) Prior Publication Data

US 2023/0271804 A1 Aug. 31, 2023

(30) Foreign Application Priority Data

Feb. 28, 2022 (JP) ................................ 2022-030097
Dec. 9, 2022 (JP) ................................ 2022-197252

(51) Int. Cl.

| | |
|---|---|
| ***B65H 37/04*** | (2006.01) |
| ***B31F 5/02*** | (2006.01) |
| ***B65H 43/00*** | (2006.01) |

(52) U.S. Cl.

CPC ............... *B65H 43/00* (2013.01); *B31F 5/02* (2013.01); *B65H 37/04* (2013.01);
(Continued)

(58) Field of Classification Search

CPC .......... B65H 37/04; B65H 2301/43828; B65H 2301/5142; B65H 2301/51616;
(Continued)

(56) References Cited

U.S. PATENT DOCUMENTS 9,104,163 B2 * 8/2015 Serizawa ........... G03G 15/6544
10,089,563 B2 * 10/2018 Kondo ................ B41J 13/0009
(Continued)

FOREIGN PATENT DOCUMENTS

JP 2014-148398 8/2014
JP 2016-216227 12/2016

OTHER PUBLICATIONS

U.S. Appl. No. 18/153,023, filed Jan. 11, 2023, Junya Suzuki, et al.
(Continued)

*Primary Examiner* — Leslie A Nicholson, III
(74) *Attorney, Agent, or Firm* — Harness, Dickey & Pierce, P.L.C.

(57) ABSTRACT

A medium processing apparatus includes a liquid applier, a crimper, a stapler, and circuitry. The liquid applier applies liquid to a liquid application position of a medium. The crimper presses and deforms at least a part to which the liquid is applied by the liquid applier, to bind a plurality of media including the medium to which the liquid is applied. The stapler performs stapling with a staple on a medium bundle in which the plurality of media is bound by the crimper. The circuitry controls operations of the crimper, the liquid applier, and the stapler, and selectively switches between first binding performed by the liquid applier and the crimper and second binding performed by only the stapler, in accordance with information on the medium or a binding position at which the medium bundle is bound by the crimper.

18 Claims, 34 Drawing Sheets

(52) U.S. Cl.
CPC .. *B65H 2301/5142* (2013.01); *B65H 2511/13* (2013.01); *B65H 2511/30* (2013.01); *B65H 2511/52* (2013.01)

(58) Field of Classification Search
CPC ........... B65H 2406/00; G03G 15/6544; G03G 2215/00852; B31F 1/07; B31F 5/02; B31F 5/101; B31F 2201/0787; B31F 2201/0779; B31F 2201/0752
USPC ................................ 270/58.07, 58.08, 58.09
See application file for complete search history.

(56) References Cited

U.S. PATENT DOCUMENTS

| | | | | |
|---|---|---|---|---|
| 10,093,511 | B2 * | 10/2018 | Okada | B65H 37/04 |
| 10,097,711 | B2 * | 10/2018 | Suzuki | B31F 5/02 |
| 10,322,903 | B2 * | 6/2019 | Yokomizo | B42B 5/00 |
| 11,383,951 | B2 * | 7/2022 | Kawakami | B41J 11/58 |
| 2014/0219747 | A1 | 8/2014 | Takahashi et al. | |
| 2016/0340145 | A1 | 11/2016 | Kunieda et al. | |
| 2020/0317462 | A1 | 10/2020 | Kawakami | |
| 2022/0394145 | A1 | 12/2022 | Seto et al. | |

OTHER PUBLICATIONS

U.S. Appl. No. 18/157,142, filed Jan. 20, 2023, Kensuke Fukuchi, et al.
Extended European Search Report, dated Sep. 6, 2023, issued in corresponding European Patent Application No. 23158162.0.

* cited by examiner

FIG. 25

FIRST THRESHOLD A

| | | PAPER THICKNESS | | |
|---|---|---|---|---|
| | | PLAIN PAPER | MEDIUM THICK PAPER | THICK PAPER |
| PAPER TYPE | NOT SET | 15 | 10 | 5 |
| | COATED PAPER | – | 5 | 0 |

FIG. 26

SECOND THRESHOLD B

| | | PAPER THICKNESS | | |
|---|---|---|---|---|
| | | PLAIN PAPER | MEDIUM THICK PAPER | THICK PAPER |
| PAPER TYPE | NOT SET | 5 | 3 | 0 |
| | COATED PAPER | – | 0 | 0 |

MEDIUM PROCESSING DEVICE, STORAGE MEDIUM, AND IMAGE FORMING SYSTEM

CROSS-REFERENCE TO RELATED APPLICATIONS

This patent application is based on and claims priority pursuant to 35 U.S.C. § 119(a) to Japanese Patent Application Nos. 2022-030097, filed on Feb. 28, 2022, and 2022-197252, filed on Dec. 9, 2022, in the Japan Patent Office, the entire disclosure of each of which is hereby incorporated by reference herein.

BACKGROUND

Technical Field

Embodiments of the present disclosure relate to a medium processing apparatus, a storage medium, and an image forming system.

Related Art

A medium processing apparatus is known that forms a bundle of sheet-shaped media (sheet bundle). As binding performed in order to form a sheet bundle in a medium processing apparatus, there are known "staple binding" that uses a metal staple and "stapleless binding" that does not use a metal staple from the viewpoint of saving resources and reducing environmental load. A medium processing apparatus that performs stapleless binding includes a crimper that can perform so-called "crimp binding" to sandwich a sheet bundle with serrate binding teeth to press and deform the sheet bundle. Sheets of paper are widely known as an example of sheet-shaped media. For this reason, in the following description, a bundle of sheets of paper as a plurality of media is an example of a sheet bundle.

In the present specification, the "staple binding" may be simply referred to as "stapling", and the "stapleless binding" may be referred to as "crimp binding" or "crimping".

In a sheet processing apparatus capable of selectively executing staple binding and crimp binding, there is known a technique of automatically switching a binding method so as to execute staple binding when the number of sheets that can be bound by crimp binding is exceeded.

SUMMARY

According to an aspect of the present disclosure, a medium processing apparatus includes a liquid applier, a crimper, a stapler, and circuitry. The liquid applier applies liquid to a liquid application position of a medium. The crimper presses and deforms at least a part to which the liquid is applied by the liquid applier, to bind a plurality of media including the medium to which the liquid is applied. The stapler performs stapling with a staple on a medium bundle in which the plurality of media is bound by the crimper. The circuitry controls operations of the crimper, the liquid applier, and the stapler, and selectively switches between first binding performed by the liquid applier and the crimper and second binding performed by only the stapler, in accordance with information on the medium or a binding position at which the medium bundle is bound by the crimper.

According to another aspect of the present disclosure, an image forming system includes an image forming apparatus and the medium processing apparatus. The image forming apparatus forms images on a plurality of media. The medium processing apparatus performs a binding operation on the medium bundle including the plurality of media on which the images are formed by the image forming apparatus.

According to still another aspect of the present disclosure, a non-transitory computer-readable storage medium storing program code to be executed in the controller of the medium processing apparatus, to control the operations of the crimper, the liquid applier, and the stapler.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 25 is a table illustrating an example of first threshold values in liquid-application crimp binding;

FIG. 26 is a table illustrating an example of second threshold values in crimp binding;

Figure 1:
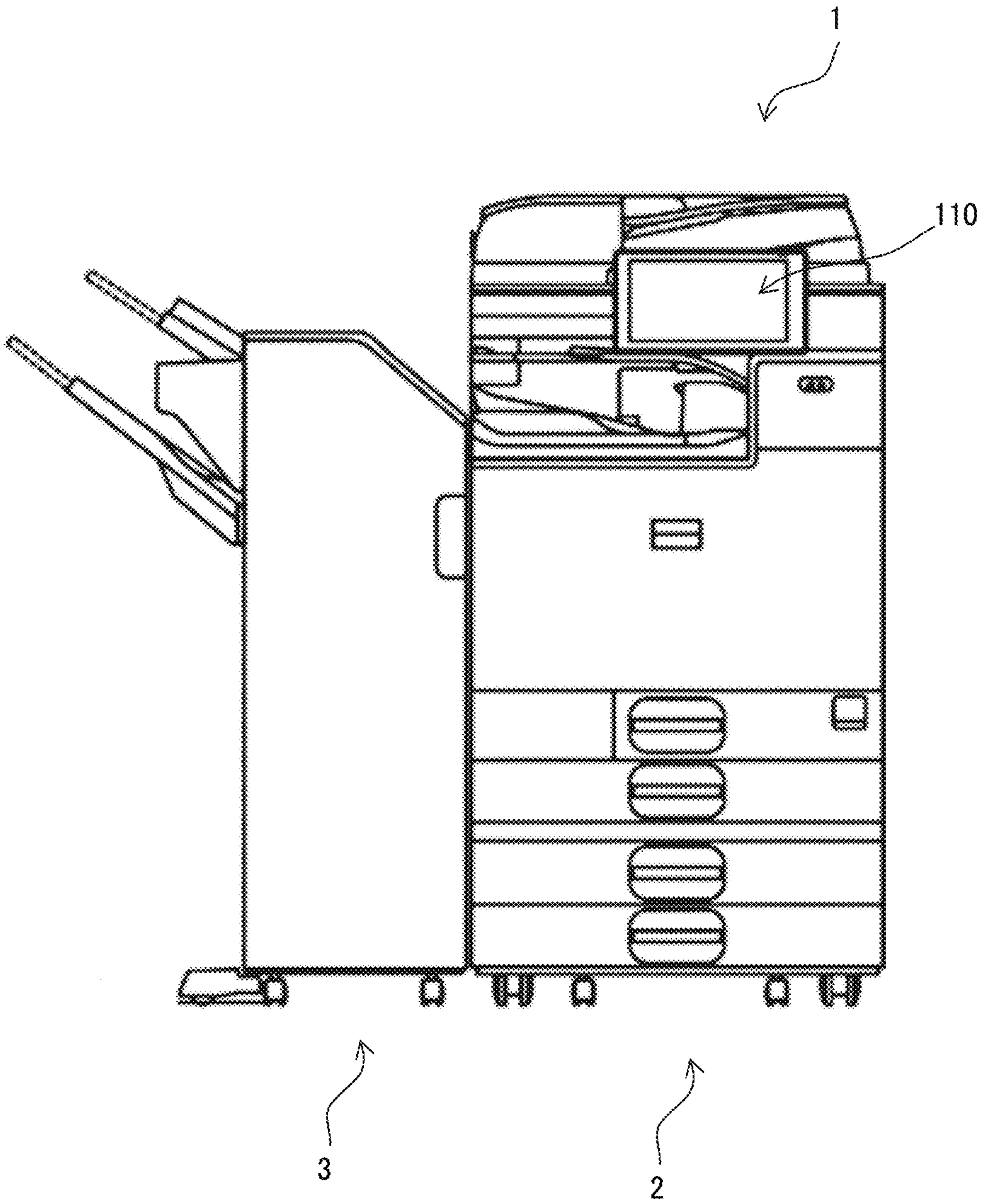
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Initially, a description is given of a first embodiment of the present disclosure.

With reference to the drawings, a description is now given of an image forming system 1 according to an embodiment of the present disclosure. FIG. 1 is a diagram illustrating the overall configuration of the image forming system 1. The image forming system 1 has a function of forming an image on a sheet P (medium) as a sheet-shaped medium and performing post-processing on the sheet P on which the image is formed. As illustrated in FIG. 1, the image forming system 1 includes an image forming apparatus 2 and a post-processing apparatus (medium processing apparatus) 3 serving as a medium processing apparatus in cooperation with each other. If all the functional configurations of the post-processing apparatus 3 can be included in the image forming apparatus 2, such a configuration may be adopted in the image forming system 1.

The image forming apparatus 2 forms an image on the sheet P and outputs the sheet P bearing the image to the post-processing apparatus 3. The image forming apparatus 2 includes a tray that accommodates the sheet P, a conveyor that conveys the sheet P accommodated in the tray, and an image former that forms an image on the sheet P conveyed by the conveyor. The image forming unit may be an inkjet image forming device that forms an image with ink or an electrophotographic image forming device that forms an image with toner. Since the image forming apparatus 2 has a typical configuration, a detailed description of the configuration and functions of the image forming apparatus 2 are omitted.

A description is given below of the internal structure of the post-processing apparatus 3.

Figure 2:
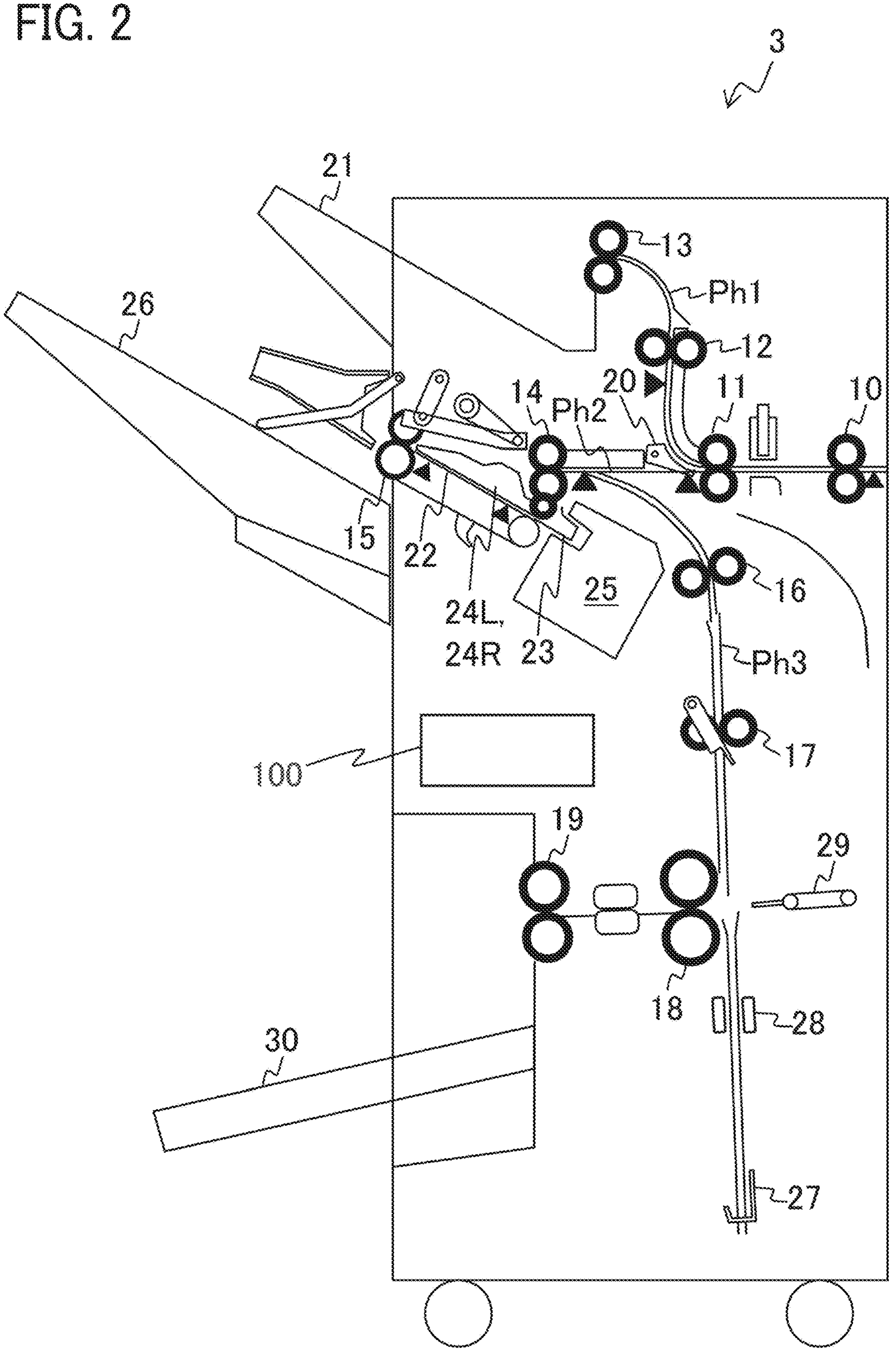
FIG. 2 is a diagram illustrating the internal configuration of a post-processing apparatus according to a first embodiment of the present disclosure.

FIG. 2 is a diagram illustrating an internal configuration of the post-processing apparatus 3 according to the first embodiment of the present disclosure. The post-processing apparatus 3 performs post-processing on the sheet P on which an image is formed by the image forming apparatus 2. The post-processing according to the present embodiment is binding as a process to bind a sheet bundle as a media bundle that a bundle of multiple sheets P on which images are formed. In the following description, the sheet bundle may be referred to as a "sheet bundle Pb." More specifically, the binding according to the present embodiment includes "staple binding" in which the sheet bundle Pb is bound with a staple(s), "crimp binding" in which the sheet bundle Pb is deformed by pressure and bound at a binding position corresponding to a part of the sheets P without application of liquid, and a "liquid-application crimp binding" in which the sheet bundle Pb is deformed by pressure and bound at the binding position after application of liquid. The binding also includes an end binding process of binding an end portion along any side of the sheet bundle Pb and saddle binding of binding a central portion of the sheet bundle Pb.

In the following description, the "liquid-application crimp binding" is referred to as a "first binding", the "staple binding" is referred to as a "second binding", and the "crimp binding" is referred to as a "third binding."

The post-processing device 3 includes conveyance roller pairs 10 to 19 as a post-processing conveyance unit and a switching claw 20 as a branch switcher that selectively switches a conveyance direction in the post-processing conveyance unit. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an output tray 26 via an internal tray 22. The third conveyance passage Ph3 is a passage branching from the first conveyance passage Ph1 between the conveyance roller pairs 11 and 14 in the conveyance direction and extending to an output tray 30.

The switching claw 20 is disposed at a branching position of the first conveyance passage Ph1 and the second conveyance passage Ph2. The switching claw 20 can be switched between a first position and a second position. The switching claw 20 in the first position guides the sheet P to be output to the output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. In FIG. 2, each black triangle indicates a conveyance sensor that detects the position of the sheet P during conveyance.

The post-processing apparatus 3 includes the output tray 21. The sheet P that is output through the first conveyance passage Ph1 rests on the output tray 21. Among the sheets P supplied from the image forming apparatus 2, the sheets P that are not bound are output to the output tray 21.

The post-processing apparatus 3 further includes the internal tray 22 (tray), an end fence 23, side fences 24L and 24R, a first binder 25, a second binder 55, and the output tray 26. The internal tray 22, the end fence 23, the side fences 24L and 24R, the first binder 25, and the second binder 55 perform the edge stitching on the sheet bundle Pb constructed of a plurality of sheets P conveyed to the internal tray 22 from the second conveyance passage Ph2. The edge stitching includes parallel stitching, oblique stitching, and vertical stitching. The parallel stitching (see FIGS. 13A and 13B and FIG. 12) is a process to perform stitching along one side of the sheet bundle Pb parallel to the main scanning direction. The oblique stitching is a process to perform stitching at a corner of the sheet bundle Pb. The vertical stitching is a process to perform stitching along one side of the sheet bundle Pb parallel to the conveyance direction.

Among the sheets P supplied from the image forming apparatus 2, the sheet bundle Pb subjected to the edge stitching is output to the output tray 26. In the following description, a direction in which the sheet P is conveyed from the conveyance roller pair 15 toward the end fence 23 is defined as a "conveyance direction." The term "width of the sheet (medium)" includes the length of the sheet P in a direction (main scanning direction) perpendicular to the thickness direction and the conveyance direction of the sheet P, and the length of the sheet P in the conveyance direction.

The sheets P that are sequentially conveyed through the second conveyance passage Ph2 are temporarily placed on the internal tray 22. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The first binder 25 binds an end of the sheet bundle Pb aligned by the end fence 23 and the side fences 24L and 24R. Then, the conveyance roller pair 15 outputs the sheet bundle Pb subjected to the edge stitching to the output tray 26.

A description is given below of a liquid application crimper.

Figure 3:
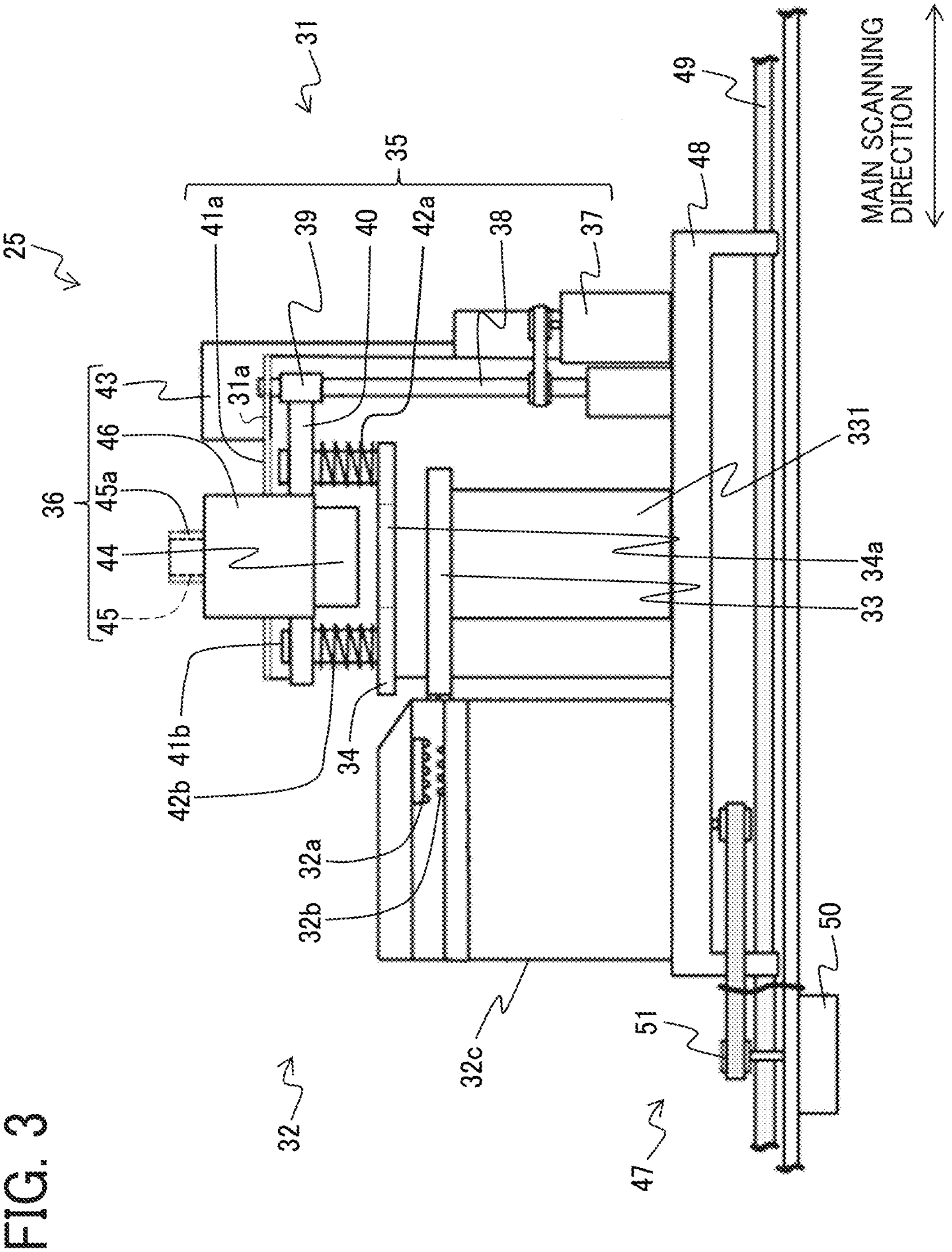
FIG. 3 is a schematic view of an upstream side of a first binder in a conveyance direction, according to an embodiment of the present disclosure.
Figure 4:
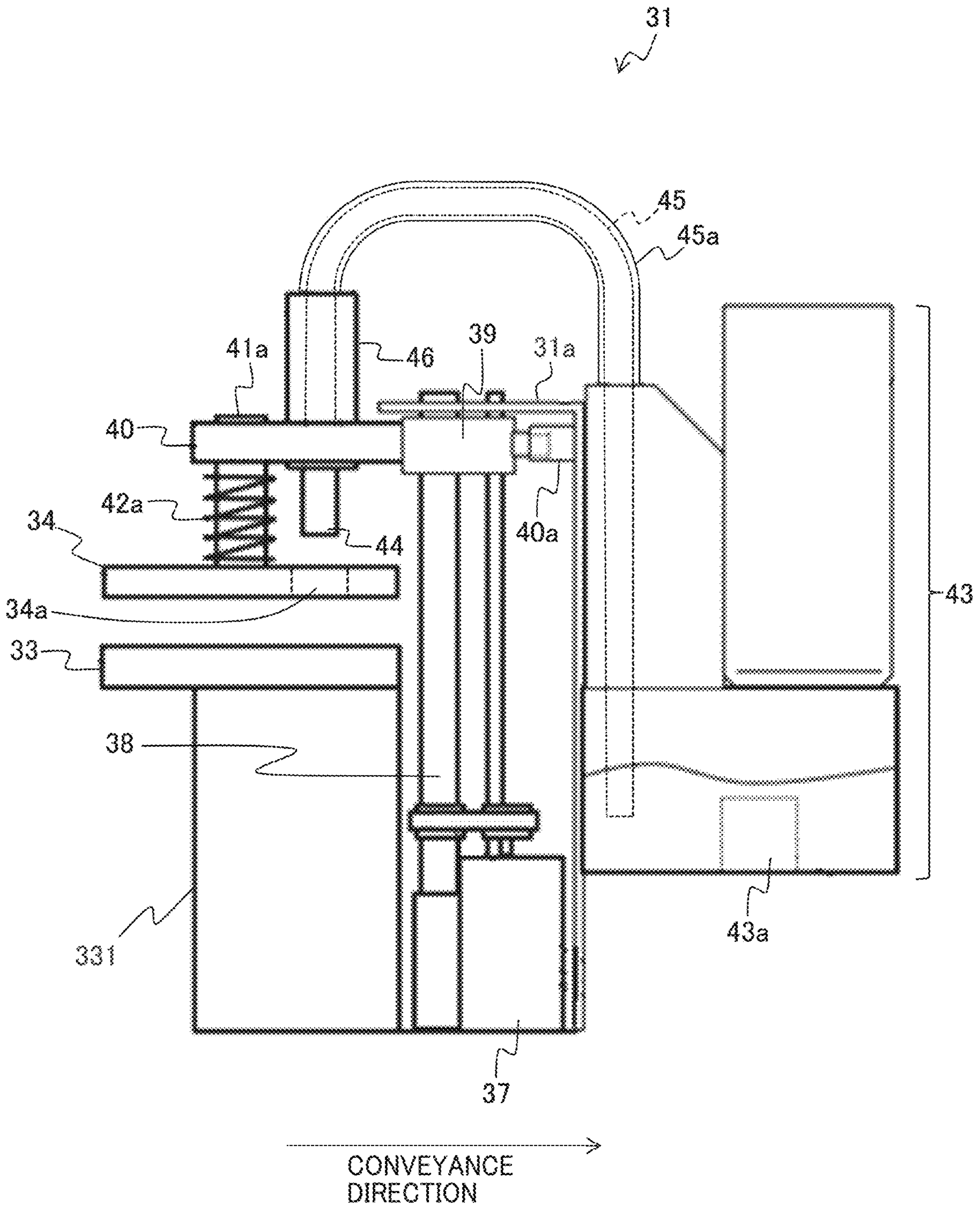
FIG. 4 is a schematic view of a liquid applier of the first binder of FIG. 3 in a main scanning direction.

FIG. 3 is a schematic view of the first binder 25 serving as a liquid application crimper that performs liquid application and crimp binding, as viewed from the upstream side in the conveyance direction. FIG. 4 is a schematic view of a liquid applier 31 of the first binder 25 in the main scanning direction. As illustrated in FIGS. 3 and 4, the first binder 25 includes a liquid applier 31 that applies liquid and a crimper 32 that performs crimping and binding. The liquid applier 31 and the crimper 32 are disposed adjacent to each other in the main scanning direction downstream from the internal tray 22 in the conveyance direction.

The liquid applier 31 applies liquid (for example, water) that is stored in a liquid storage tank 43 to the sheet P or the sheet bundle Pb placed on the internal tray 22. In the following description, the application of liquid may be referred to as "liquid application."

More specifically, the liquid that is stored in the liquid storage tank 43 and used for the "liquid application" includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in a liquid storage tank 43 may include an additive in addition to the main component. The liquid that is stored in the liquid storage tank 43 may include residual chlorine used as tap water. Preferably, for example, the liquid that is stored in the liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply for the crimp binding because tap water is easy to obtain and store. A liquid including water as a main component as exemplified above enhances the binding strength of the sheet bundle Pb, as compared with a liquid of which the main component is not water.

The liquid applier 31 can be moved in the main scanning direction together with the crimper 32 by a driving force transmitted from the first-binder movement motor 50. A liquid application position to which the liquid is applied on the sheet P or the sheet bundle Pb by the liquid applier 31 corresponds to the binding position at which the sheet P or the sheet bundle Pb is to be crimped and bound. For this reason, in the following description, the liquid application position and the binding position are denoted by the same reference numeral.

As illustrated in FIGS. 3 and 4, the liquid applier 31 includes a lower pressure plate 33, an upper pressure plate 34 (presser), a liquid applier movement assembly 35, and a liquid application assembly 36. The components of the liquid applier 31 such as the lower pressure plate 33, the upper pressure plate 34, the liquid applier movement assembly 35, and the liquid application assembly 36 are held by a liquid application frame 31*a* and a base 48.

The lower pressure plate 33 and the upper pressure plate 34 are disposed downstream from the internal tray 22 in the conveyance direction. The lower pressure plate 33 supports, from below, the sheet P or the sheet bundle Pb placed on the internal tray 22. The lower pressure plate 33 is disposed on a lower-pressure-plate holder 331. The upper pressure plate 34 can move (up and down) in the thickness direction of the sheet P above the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction." The upper pressure plate 34 has a through hole 34*a* penetrating in the thickness direction at a position where the through hole 34*a* faces an end of a liquid application member 44 attached to a base plate 40.

The liquid applier movement assembly 35 moves the upper pressure plate 34, the base plate 40, and the liquid application member 44 up and down in the thickness direction of the sheet P or the sheet bundle Pb. The liquid applier movement assembly 35 according to the present embodiment moves the upper pressure plate 34, the base plate 40, and the liquid application member 44 in conjunction with each other with a single liquid applier movement motor 37. The liquid applier movement assembly 35 includes, for example, the liquid applier movement motor 37, a trapezoidal screw 38, a nut 39, the base plate 40, columns 41*a* and 41*b*, and coil springs 42*a* and 42*b*.

The liquid applier movement motor 37 generates a driving force to move the upper pressure plate 34, the base plate 40, and the liquid application member 44. The trapezoidal screw 38 extends in a vertical direction in FIGS. 3 and 4 and is rotatably supported by the liquid application frame 31*a*. The trapezoidal screw 38 is coupled to an output shaft of the liquid applier movement motor 37 via, for example, a pulley and a belt. The nut 39 is screwed to the trapezoidal screw 38. The trapezoidal screw 38 is rotated by the driving force transmitted from the liquid applier movement motor 37. The rotation of the trapezoidal screw 38 moves the nut 39.

The base plate 40 is disposed above the upper pressure plate 34. The base plate 40 holds the liquid application member 44 with the end of the liquid application member 44 projecting downward. The base plate 40 is coupled to the trapezoidal screw 38 to move together with the trapezoidal screw 38. The position of the base plate 40 in the vertical direction is detected by a movement sensor 40*a* (see FIG. 7).

The columns 41*a* and 41*b* project downward from the base plate 40 around the end of the liquid application member 44. The columns 41*a* and 41*b* can move relative to the base plate 40 in the thickness direction. The columns 41*a* and 41*b* have respective lower ends holding the upper pressure plate 34. The columns 41*a* and 41*b* have respective upper ends provided with stoppers that prevent the columns 41*a* and 41*b* from being removed from the base plate 40. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid application assembly 36 applies liquid to the sheet P or the sheet bundle Pb placed on the internal tray 22. Specifically, the liquid application assembly 36 brings the end of the liquid application member 44 into contact with the sheet P or the sheet bundle Pb to apply the liquid to at least one sheet P of the sheet bundle Pb. The liquid application assembly 36 includes the liquid storage tank 43, the liquid application member 44, a supplier 45, and a joint 46.

The liquid storage tank 43 stores the liquid to be supplied to the sheet P or the sheet bundle Pb. The amount of liquid that is stored in the liquid storage tank 43 is detected by a liquid amount sensor 43*a* (see FIG. 7). The liquid application member 44 applies the liquid stored in the liquid storage tank 43 to the sheet P or the sheet bundle Pb. The liquid application member 44 is mounted on the base plate 40 with an end of the liquid application member 44 facing downward. The liquid application member 44 is made of a material having a relatively high liquid absorption (for example, sponge or fiber).

The supplier 45 is an elongated member having a base end immersed in the liquid stored in the liquid storage tank 43 and another end coupled to the liquid application member 44. Like the liquid application member 44, for example, the supplier 45 is made of a material having a relatively high liquid absorption. Accordingly, the liquid absorbed from the base end of the supplier 45 is supplied to the liquid application member 44 by capillary action.

A protector 45*a* is an elongated cylindrical body (for example, a tube) that is fitted around the supplier 45. Such a configuration prevents the liquid absorbed by the supplier 45 from leaking or evaporating. Each of the supplier 45 and the protector 45*a* is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the liquid applier movement assembly 35.

The crimper 32 presses and deforms the sheet bundle Pb with serrate binding teeth 32*a* and 32*b* to bind the sheet bundle Pb. Nipping, pressing, and deforming the sheet bundle Pb by the binding teeth 32*a* and 32*b* to bind the sheet bundle Pb is referred to as "crimp binding" below. In other words, the crimper 32 binds the sheet bundle Pb by crimping without staples. The components of the crimper 32 such as the binding teeth 32*a* serving as upper crimping teeth and the binding teeth 32*b* serving as lower crimping teeth are disposed on a crimping frame 32*c*.

A description is given below of the configuration of binding teeth 32*a* and 32*b*.

Figure 5A:
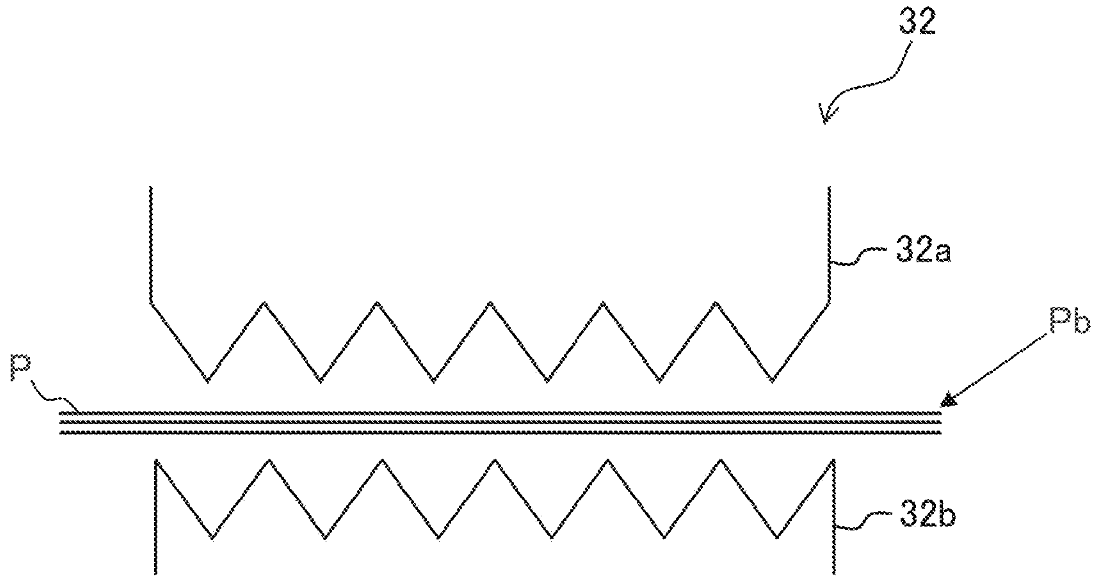
FIGS. 5A and 5B are schematic diagrams illustrating a configuration of a crimper according to an embodiment of the present disclosure.
Figure 5B:

FIGS. 5A and 5B are schematic diagrams illustrating a configuration of the crimper 32. As illustrated in FIGS. 5A and 5B, the crimper 32 includes the binding teeth 32*a* and the binding teeth 32*b* in pair, which may be referred to as a pair of binding teeth 32*a* and binding teeth 32*b* in the following description. The binding teeth 32*a* and the binding teeth 32*b* are disposed to face each other in the thickness direction of the sheet bundle Pb so that the binding teeth 32*a* and the binding teeth 32*b* can sandwich the sheet bundle Pb placed on the internal tray 22. The binding teeth 32*a* and the binding teeth 32*b* have respective serrate faces facing each other. The serrate face of each of the binding teeth 32*a* and the binding teeth 32*b* includes concave portions and convex portions alternately formed. The concave portions and the convex portions of the binding teeth 32*a* are shifted from those of the binding teeth 32*b* such that the binding teeth 32*a* are engaged with the binding teeth 32*b*. The binding teeth 32*a* and the binding teeth 32*b* are brought into contact with and separated from each other by a driving force of a contact-separation motor 32*d* illustrated in FIG. 7.

In a process in which the sheets P of the sheet bundle Pb are supplied to the internal tray 22, the binding teeth 32*a* and the binding teeth 32*b* are apart from each other as illustrated in FIG. 5A. When all the sheets P of the sheet bundle Pb are placed on the internal tray 22, the pair of binding teeth 32*a* and binding teeth 32*b* are engaged with each other as illustrated in FIG. 5B by the driving force of the contact-separation motor 32*d* to press and deform the sheet bundle Pb in the thickness direction. As a result, the sheet bundle Pb that has been placed on the internal tray 22 is crimped and bound. The sheet bundle Pb thus crimped and bound is output to the output tray 26 by the conveyance roller pair 15.

The configuration of the crimper 32 as a crimping assembly is not limited to the configuration of the present embodiment and may be any other configuration in which the binding teeth 32*a* and the binding teeth 32*b* of the crimping assembly are engaged with each other. The crimping assembly may be a crimping assembly disclosed in Japanese Patent No. 6057167. In this case, the crimping assembly brings the binding teeth 32*a* and the binding teeth 32*b* into contact with each other and separate the binding teeth 32*a* and the binding teeth 32*b* form each other with a link assembly and a driving source that simply rotates forward or that rotates forward and backward. Alternatively, the crimping assembly may employ a linear motion system to linearly bring the binding teeth 32*a* and the binding teeth 32*b* into contact with each other and separate the binding teeth 32*a* and the binding teeth 32*b* from each other with a screw assembly that converts the rotational motion of a driving source into linear motion.

As illustrated in FIG. 3, the first binder 25 includes a first movement assembly 47. The first movement assembly 47 moves the first binder 25, specifically, the liquid applier 31 and the crimper 32, in the main scanning direction along a downstream end in the conveyance direction of the sheet P placed on the internal tray 22. The first movement assembly 47 includes, for example, the base 48, a guide shaft 49, the first-binder movement motor 50, and a driving force transmission assembly 51.

The liquid applier 31 and the crimper 32 are attached to the base 48 such that the liquid applier 31 and the crimper 32 are adjacent to each other in the main scanning direction. The guide shaft 49 extends in the main scanning direction at a position downstream from the internal tray 22 in the conveyance direction. The guide shaft 49 supports the base 48 such that the base 48 can move in the main scanning direction. The first-binder movement motor 50 generates a driving force to move the first binder 25.

The driving force transmission assembly 51 transmits the driving force of the first-binder movement motor 50 to the base 48 via a pulley and a timing belt. As a result, the liquid applier 31 and the crimper 32 integrated by the base 48 move in the main scanning direction along the guide shaft 49. The position of the first binder 25 may be ascertained with, for example, an encoder sensor attached to an output shaft of the first-binder movement motor 50.

A description is given below of a stapler.

Figure 6:
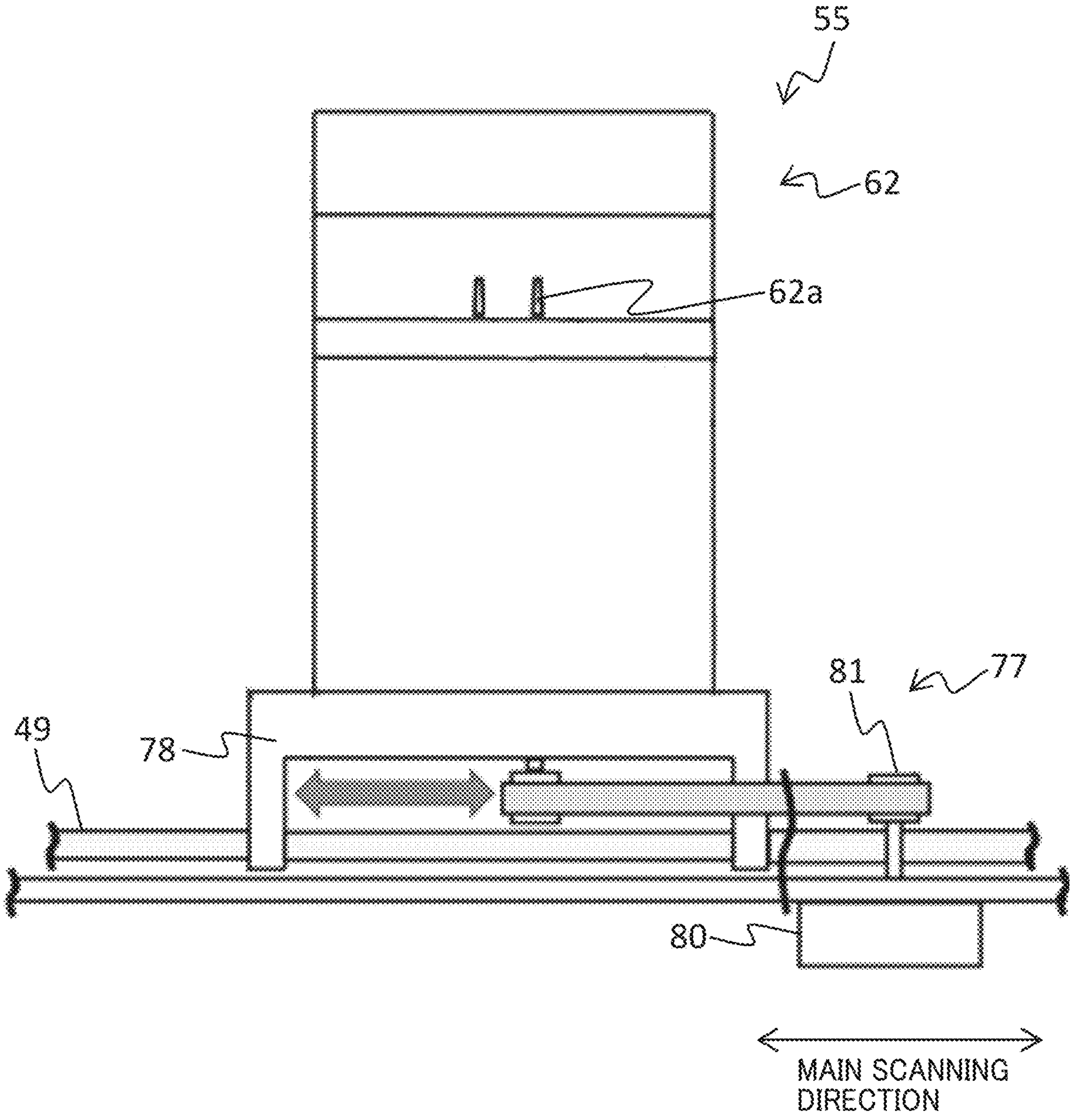
FIG. 6 is a schematic view of an upstream side of a second binder in a conveyance direction, according to an embodiment of the present disclosure.
Figure 13A:
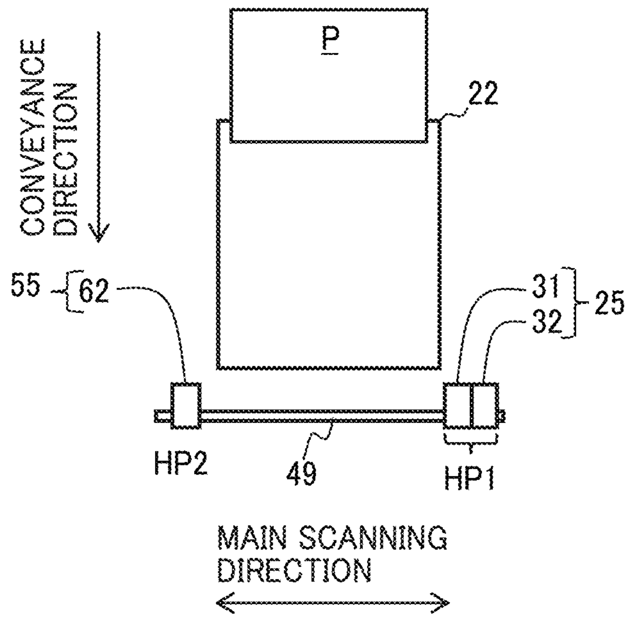
FIGS. 13A and 13B are diagrams illustrating the position of each binder in the second binding.
Figure 13B:
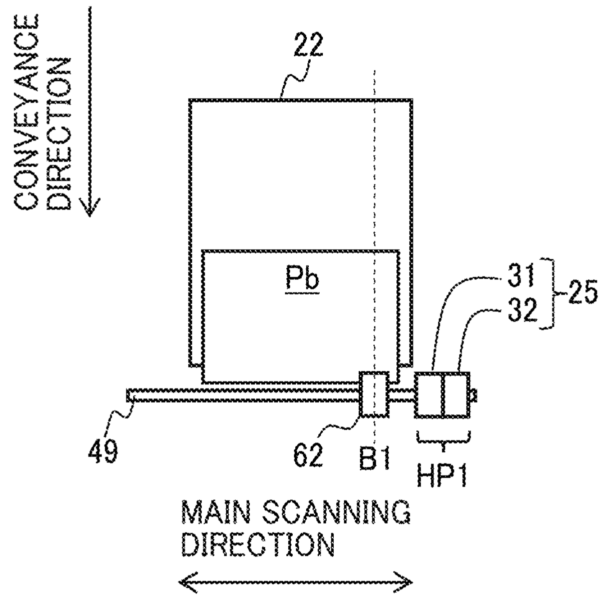

Next, the second binder 55 as a stapler is described in detail. FIG. 6 is a schematic view of an upstream side of the second binder 55 in the conveyance direction. The second binder 55 includes a staple binder 62 that binds the sheet bundle Pb using a staple(s). As illustrated in FIGS. 13A and 13B, the staple binder 62 is disposed downstream from the internal tray 22 in the conveyance direction and apart from the first binder 25 in the main scanning direction.

The staple binder 62 has a configuration of performing so-called "staple binding" to bind a sheet bundle Pb with a staple(s). More specifically, the staple binder 62 includes a stapler driving motor 62*d* (see FIG. 7) that drives the stapler 62*a*. The driving force of the stapler driving motor 62*d* causes a staple loaded in the stapler 62*a* to penetrate through a sheet bundle Pb to bind the sheet bundle Pb. The staple binder 62 may have a known configuration.

As illustrated in FIG. 6, the second binder 55 includes a second movement assembly 77. The second movement assembly 77 moves the second binder 55 in the main scanning direction along a downstream end of the sheet P or the sheet bundle Pb placed on the internal tray 22 in the conveyance direction of the sheet P or the sheet bundle Pb. The second movement assembly 77 includes, for example, a base 78, a guide shaft 49, the second-binder movement motor 80, and a driving force transmission assembly 81. Since the configuration of the second movement assembly 77 is common to that of the first movement assembly 47, the description thereof is omitted.

The first binder 25 and the second binder 55 are supported by the common guide shaft 49. The first movement assembly 47 and the second movement assembly 77 move the first binder 25 and the second binder 55 in the main scanning direction along the common guide shaft 49. Further, the first movement assembly 47 and the second movement assembly 77 can independently move the first binder 25 and the second binder 55.

As illustrated in FIG. 2, the post-processing apparatus 3 further includes an end fence 27, a saddle binder 28, a sheet folding blade 29, and the output tray 30. The end fence 27, the saddle binder 28, and the sheet folding blade 29 perform the saddle stitching on the sheet bundle Pb constructed of the sheets P that are conveyed through the third conveyance passage Ph3. Among the sheets P supplied from the image forming apparatus 2, the sheet bundle Pb subjected to the saddle stitching is output to the output tray 30.

The end fence 27 aligns the positions of the sheets P that are sequentially conveyed through the third conveyance passage Ph3, in a direction in which the sheets P are conveyed.

The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

A description is given below of the control block of the post-processing apparatus 3.

Figure 7:
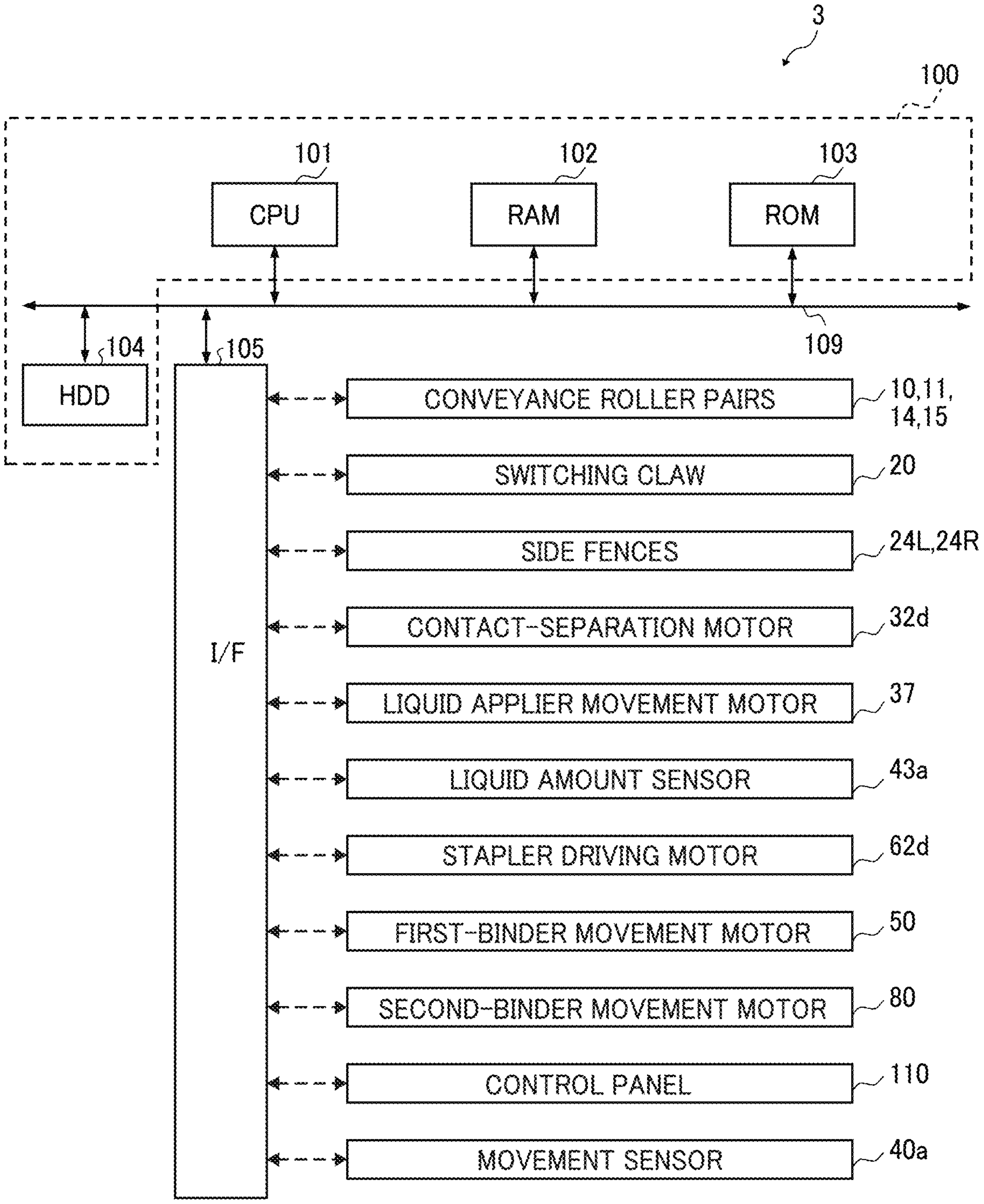
FIG. 7 is a block diagram illustrating the hardware configuration of controlling operations of the post-processing apparatus according to the first embodiment.

Next, a control block configuration as a controller of the post-processing apparatus 3 according to the first embodiment is described with reference to FIG. 7. FIG. 7 illustrates a hardware configuration for executing control processing executed in the post-processing apparatus 3. As illustrated in FIG. 7, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the contact-separation motor 32*d*, the liquid applier movement motor 37, the stapler driving motor 62*d*, the first-binder movement motor 50, the second-binder movement motor 80, the movement sensor 40*a*, the liquid amount sensor 43*a*, and a control panel 110 to the common bus 109. The controller 100 operates, via the I/F 105, the conveyance roller pairs 10, 11, 14, and 15, the switching claw 20, the side fences 24L and 24R, the liquid applier movement motor 37, the contact-separation motor 32*d*, the first-binder movement motor 50, the stapler driving motor 62*d*, and the second-binder movement motor 80. The controller 100 acquires detection results from the movement sensor 40*a* and the liquid amount sensor 43*a*. Although FIG. 7 illustrates only the components related to the first binder 25 and the second binder 55 that perform the edge binding, the components related to the saddle binder 28 that performs the saddle stitching are also controlled by the controller 100.

As illustrated in FIG. 1, the image forming apparatus 2 includes the control panel 110. The control panel 110 includes an operation device that receives instructions from a user and a display serving as a notifier that notifies the user of information. The operation device includes, for example, hard keys and a touch screen overlaid on a display. The control panel 110 acquires information from the user through the operation device and provides information to the user through the display. Note that a specific example of the notifier is not limited to the display and may be a light emitting diode (LED) lamp or a speaker. The post-processing apparatus 3 may include the control panel 110 like the control panel 110 described above.

The controller 100 as control circuitry executes the binding process in response to acquisition of an instruction to execute the binding process (hereinafter, referred to as a "binding instruction") from the image forming apparatus 2. The binding instruction includes, for example, the number of sheets P constituting a sheet bundle Pb, the number of binding positions, and the positions of binding in the main scanning direction. In the following description, the number of sheets P per sheet bundle Pb (the number of sheets P constituting the sheet bundle Pb) is referred to as a "predetermined number N".

The controller 100 selectively executes first binding, second binding, and third binding, which will be described below, while automatically switching between the first binder 25 and the second binder 55 according to the predetermined number N of sheets, the number of sheets of the sheet bundle Pb, and various setting information related to the binding included in the binding instruction. The controller 100 as the control circuitry is configured to automatically switch the binding type, the binding position, and the number of times of binding in accordance with information (medium information) such as the number of sheets P, to select and execute optimum binding as a method of the binding process for the sheet bundle Pb.

Next, a first binder 25' which is a modification of the first binder 25 is described with reference to FIGS. 8, 9A, 9B, 9C, 10A, 10B, and 10C. A difference of the first binder 25' from the first binder 25 according to the first embodiment is that the liquid applier 31 and the crimper 32 are integrated as a single unit. In the following description, components like those of the first binder 25 according to the first embodiment are denoted by like reference numerals, and redundant descriptions thereof may be omitted.

Figure 8:
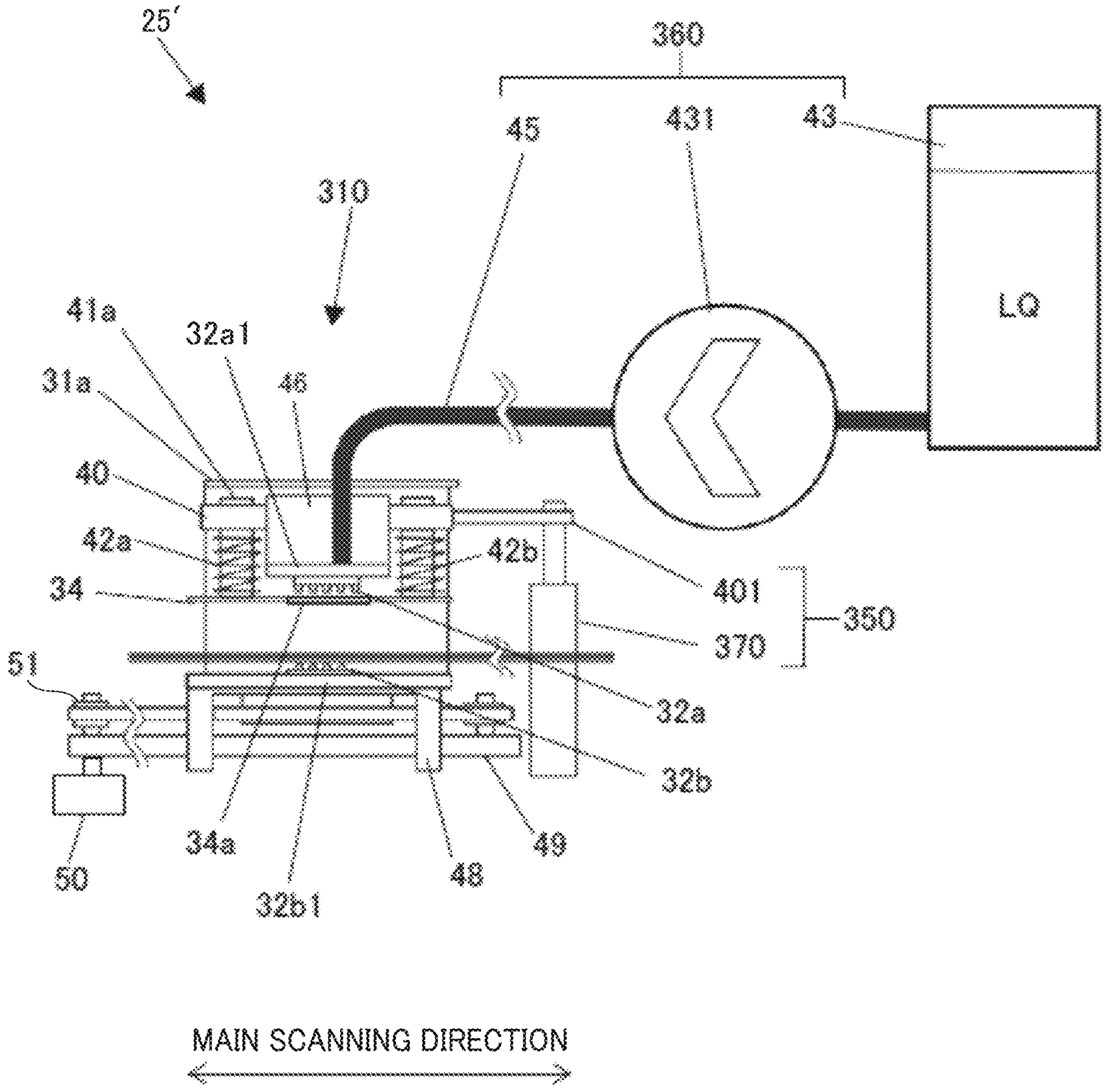
FIG. 8 is a diagram illustrating a modification of the first binder of FIG. 3.
Figure 9A:
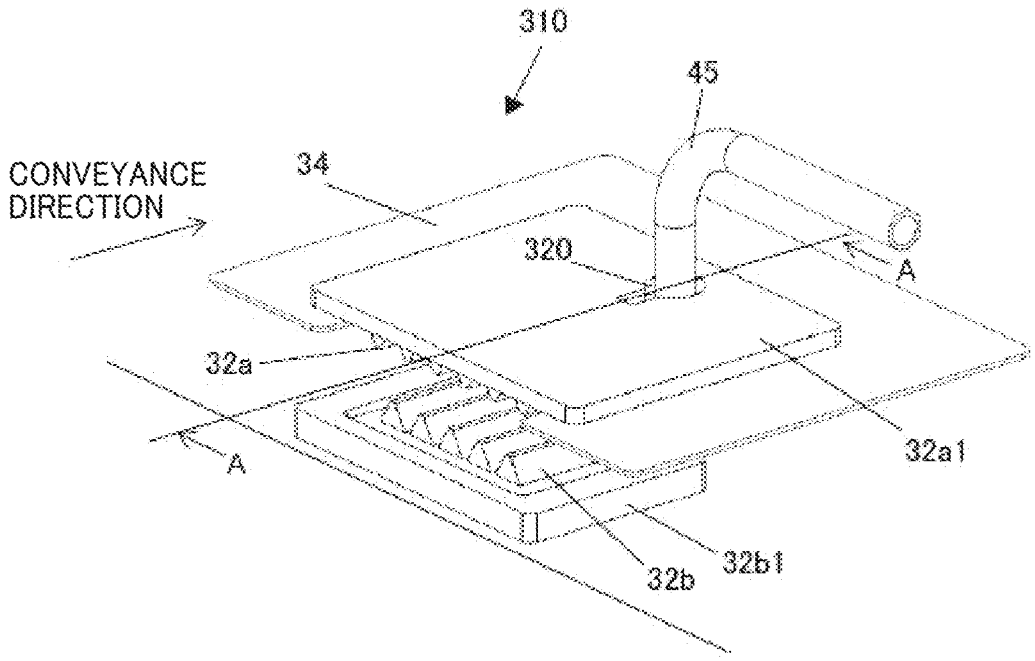
FIGS. 9A, 9B, and 9C are diagrams illustrating a liquid application crimper in the first binder of FIG. 8.
Figure 9B:
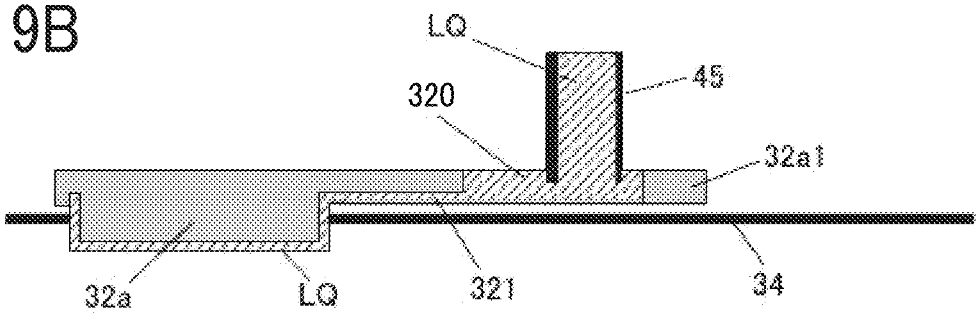
Figure 9C:
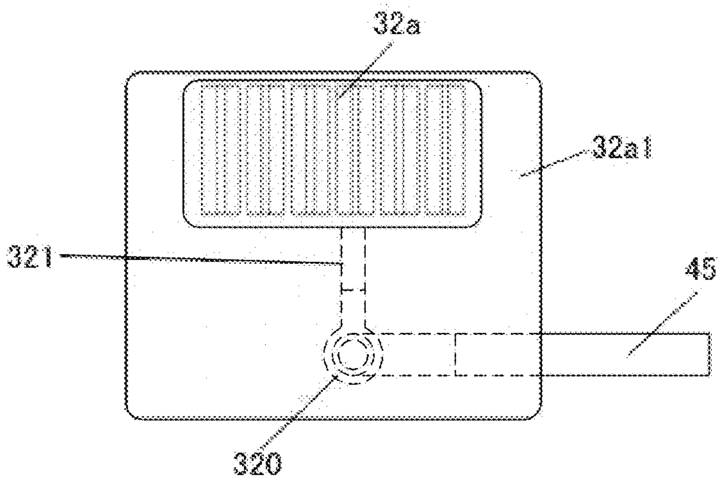

FIG. 8 is a schematic view of the first binder 25' viewed from the upstream side in the conveyance direction. FIG. 9A is a perspective view of a liquid application crimper 310. FIG. 9B is a cross-sectional view of the liquid application crimper 310 taken along line A-A in FIG. 9A. FIG. 9C is a plan view of the upper crimping teeth 32*a* of FIG. 9A as viewed from the side at which the lower crimping teeth 32*b* is disposed. FIGS. 9A, 9B, and 9C illustrate a liquid application operation and a crimp binding operation performed by the liquid application crimper 310 and are schematic views of the liquid application crimper 310 viewed from the downstream side in the conveyance direction.

As illustrated in FIG. 8, the first binder 25' includes a liquid application crimper 310 in which the liquid applier 31 and the crimper 32 of the first binder 25 according to the first embodiment are integrated as a single unit. The liquid application crimper 310 is disposed downstream from the internal tray 22 in the conveyance direction.

The liquid application crimper 310 applies liquid LQ stored in the liquid storage tank 43 to a sheet P or a sheet bundle Pb placed on the internal tray 22. The liquid application crimper 310 is configured to be movable in the main scanning direction by the driving force transmitted from the first-binder movement motor 50. The liquid application crimper 310 includes the upper pressure plate 34, the upper crimping teeth 32*a*, the lower crimping teeth 32*b*, a liquid application crimper movement assembly 350, and a liquid supply assembly 360. Components of the liquid application crimper 310 are held by the liquid application frame 31*a* and the base 48.

The liquid application crimper movement assembly 350 moves the upper pressure plate 34, the base plate 40, and the upper crimping teeth 32*a* in conjunction with each other in the thickness direction of the sheet P or the sheet bundle Pb by an electric cylinder 370. The base plate 40 holds an upper crimping teeth holder 32*al* and the upper crimping teeth 32*a* via a joint 46. The base plate 40 movably holds the upper pressure plate 34 via the columns 41*a* and 41*b*. The base plate 40 is attached to the distal end of a rod 371 of the electric cylinder 370 via a connecter 401.

The columns 41*a* and 41*b* hold the upper pressure plate 34 at lower ends of the columns 41*a* and 41*b*. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid supply assembly 360 includes a liquid storage tank 43, a supply pump 431, and a supplier 45. The supply pump 431 feeds the liquid LQ via the supplier 45 to a liquid reservoir 320 of the upper crimping teeth holder 32*al* as illustrated in FIG. 9A. The supplier 45 has a proximal end connected to the supply pump 431 and a distal end connected to the liquid reservoir 320, and is formed of an elastic elongated member.

As illustrated in FIG. 9B, the upper crimping teeth 32*a* are integrated with the upper crimping teeth holder 32*al*. The upper crimping teeth holder 32*al* is provided with the liquid reservoir 320 and a liquid supply path 321 for supplying the liquid LQ stored in the liquid reservoir 320 to the upper crimping teeth 32*a*. The surfaces of the upper crimping teeth 32*a* are subjected to a hydrophilic treatment so that the liquid LQ supplied from the liquid supply path 321 uniformly spreads over the surfaces of the upper crimping teeth 32*a*. On the other hand, the portions of the upper crimping teeth holder 32*al* other than the upper crimping teeth 32*a* are subjected to a hydrophobic treatment so that the liquid LQ efficiently spreads over the surfaces of the upper crimping teeth 32*a*.

As illustrated in FIG. 8, the lower crimping teeth 32*b* are integrated with the lower crimping teeth holder 32*b*1 as a single unit and are mounted on the base 48 via the lower crimping teeth holder 32*b*1.

Figure 10A:
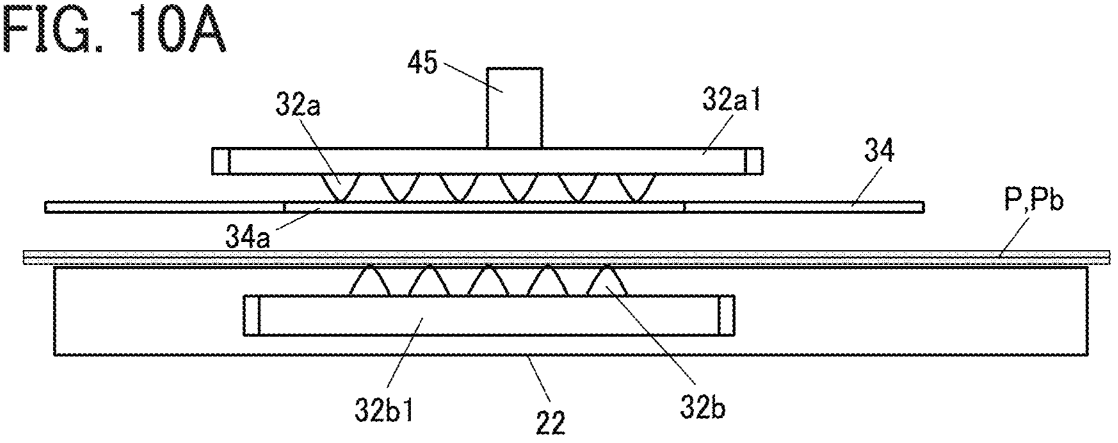
FIGS. 10A, 10B, and 10C are diagrams illustrating a liquid applying operation and a crimp binding operation by the liquid application crimper of FIGS. 9A to 9C.
Figure 10B:
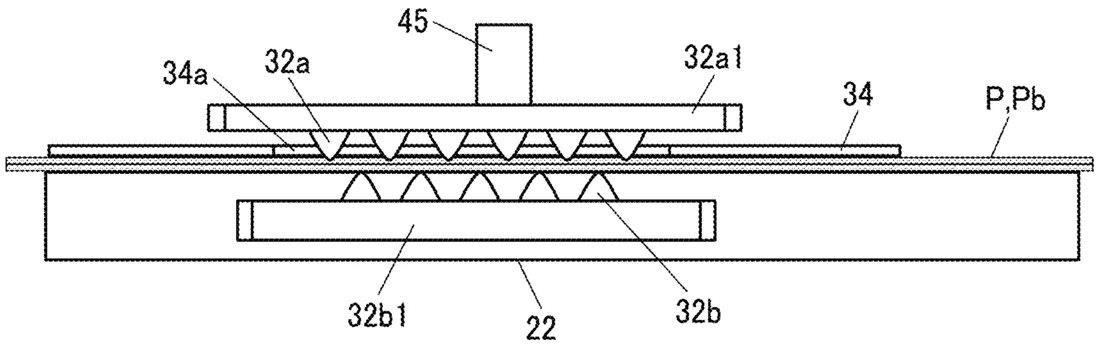
Figure 10C:
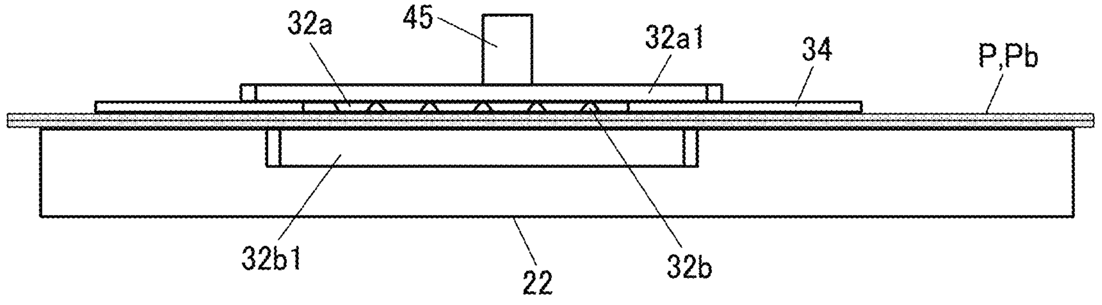

Next, the liquid application operation and the crimp binding operation by the liquid application crimper 310 will be described with reference to FIGS. 10A, 10B, and 10C. In the process of supplying a sheet P to the internal tray 22, as illustrated in FIG. 10A, the upper crimping teeth 32*a* and the lower crimping teeth 32*b* are separated from each other. When the sheet P is placed on the internal tray 22, the electric cylinder 370 is contracted to move the upper crimping teeth 32*a* and the upper pressure plate 34 toward the sheet P. Then, as illustrated in FIG. 10B, the upper pressure plate 34 first comes into contact with the sheet P, and then the upper crimping teeth 32*a* pass through the through-hole 34*a* of the upper pressure plate 34 and come into contact with the sheet P. At this time, since the liquid LQ is spread over the surfaces of the upper crimping teeth 32*a*, bringing the upper crimping teeth 32*a* into contact with the sheet P allows the liquid to be applied to the liquid application position on the sheet P. When liquid application to the liquid application position is completed, the electric cylinder 370 is extended to separate the upper crimping teeth 32*a* and the upper pressure plate 34 from the sheet P. The above-described contact and separation operation (liquid application operation) of the upper crimping teeth 32*a* and the upper pressure plate 34 with respect to the sheets P is repeatedly performed on sheets P of the sheet bundle Pb.

When the sheet bundle Pb including a predetermined number of sheets P is placed on the internal tray 22, the electric cylinder 370 is further contracted to move the upper crimping teeth 32*a* toward the lower crimping teeth 32*b*. Then, as illustrated in FIG. 10C, in a state in which the sheet bundle Pb is sandwiched between the upper crimping teeth 32*a* and the lower crimping teeth 32*b*, the upper crimping teeth 32*a* further moves toward the lower crimping teeth 32*b*. Thus, the upper crimping teeth 32*a* and the lower crimping teeth 32*b* press and deform the sheet bundle Pb to crimp and bind the sheet bundle Pb (crimp binding operation).

A description is given of a first example of a process of a medium processing program.

Next, a first example of a binding process executed by a medium processing program according to an embodiment of the present disclosure is described with reference to a flowchart of FIG. 11. Each processing function described in the following flowchart is implemented by execution of the medium processing program in the controller 100.

First, an operation of the image forming system 1 is started by an instruction operation of a user. In the instruction to start the operation, the user sets, through the control panel 110, any content of the binding for the sheet bundle Pb including a plurality of sheets P on which images have been formed and that are discharged from the image forming apparatus 2. First, the controller 100 acquires a binding instruction including information indicating the content of binding set by the user through the control panel 110 (step S801). The binding instruction acquired in step S801 includes, for example, a "predetermined number N of sheets" which is the number of sheets P per sheet bundle Pb, the thickness of sheets P (sheet thickness), the type of sheets P (paper type) such as plain paper and coated paper, the binding position of the sheet bundle Pb (binding position), and the number of sheets of the sheet bundle Pb to be bound.

Next, the controller 100 determines whether the predetermined number N acquired in step S801 is greater than a preset first threshold value A (step S802). The first threshold value A is a parameter indicating an upper limit of the number of sheets P that can be bound by the liquid-application crimp binding. In other words, the predetermined number N of sheets greater than the first threshold value A corresponds to a case where the sheets P cannot be bound by the liquid-application crimp binding or it is difficult to maintain the binding strength of the sheet bundle Pb even if the sheet bundle Pb is crimped and bound. In such a case, the staple binding is preferably used.

For example, when the maximum number of bindable sheets is 15 sheets (the first threshold value A) in the liquid-application crimp binding in which the crimp binding is performed after application of the liquid, the controller 100 determines whether the predetermined number N is 16 sheets or more. The maximum number of sheets is set as an initial value. As is described later, the initial value can be set by the user via the control panel 110, and can be appropriately changed in accordance with the number of sheets that can be bound by crimping in the first binder 25.

As the first threshold value A, a plurality of threshold values may be set that are automatically adjusted according to information such as the sheet thickness, the sheet type, and the binding position set by the binding instruction. For example, as illustrated in FIG. 25, when the paper type information is "not set (any other type than coated paper)", the first threshold values A1 that are the maximum numbers of sheets in the liquid-application crimp binding are set to "15 sheets, 10 sheets, and 5 sheets" according to the paper thickness information "plain paper, medium thick paper, and thick paper", respectively. The controller 100 determines whether the predetermined number N of sheets is greater than each of the first threshold values A1.

When the paper type information is "coated paper", the first threshold values A2 that are the maximum numbers of sheets of the liquid-application crimp bonding are set to "5 sheets and 0 sheets" according to the paper thickness information "medium thick paper and thick paper", respectively. The controller 100 determines whether the predetermined number N of sheets is greater than each of the first threshold values A2.

Further, in the case where the sheet type information is "not set (any other type than coated paper)" and corner binding of obliquely binding a corner portion of the sheet bundle Pb is performed, the same first threshold values A1 ("15 sheets, 10 sheets, and 5 sheets") as in the case of "not set (any other type than coated paper)" illustrated in FIG. 25 are set in the same manner as described above. When the paper type information is "not set (any other type than coated paper)" and the sheet bundle Pb is bound at a plurality of positions along any side (e.g., the case of so-called two position binding), values ("12 sheets, 8 sheets, and 4 sheets") obtained by multiplying the first threshold values A1 by a coefficient 0.8 may be set as first threshold values A3. Also in the case where the paper type information is "coated paper", similarly to the case where the paper type information is "not set (any other type than coated paper)", the first threshold values A2 can be adjusted according to the type of the binding position.

When the predetermined number N of sheets is greater than the first threshold value A (YES in step S802), the controller 100 determines that the number of sheets is difficult to be bound by the liquid-application crimp binding, and executes the staple binding (step S803). Details of the staple binding will be described below.

When the predetermined number N of sheets is not greater than the first threshold value A (NO in step S802), the controller 100 determines that the sheet bundle Pb can be bound by the liquid-application crimp binding. Therefore, the controller 100 determines whether the remaining amount of liquid (remaining liquid amount) in the liquid storage tank 43 is sufficient as compared with the liquid amount required for performing the liquid application, based on the output of the liquid amount sensor 43*a* (step S804). Here, the "liquid amount required for performing the liquid application" means the amount of liquid calculated by multiplying an amount of liquid to be consumed per sheet of the sheet bundle Pb of the predetermined number N of sheets by the number of sheets to which the liquid is to be applied among the sheet bundle Pb of the predetermined number N of sheets, when the liquid-application crimp binding is performed on the sheet bundle Pb of the predetermined number N of sheets.

Next, when the controller 100 determines that the remaining amount of liquid is sufficient to apply liquid to the predetermined number N of sheets (YES in step S804), the controller 100 determines whether there is an abnormality in the liquid applier 31 (step S805). Examples of the abnormality of the liquid applier 31 include a failure of the liquid applier movement motor 37. When the controller 100 determines that there is no abnormality in the liquid applier 31 (YES in step S805), the controller 100 executes the liquid-application crimp binding (step S806). Details of the liquid-application crimp binding will be described below.

On the other hand, when the controller 100 determines that there is an abnormality in the liquid applier 31 (NO in step S805), the controller 100 executes the staple binding (step S803). When the controller 100 determines that there is an abnormality in the liquid applier 31, the controller 100 can also perform, for example, pop-up display on the control panel 110 to notify the user that switching to the staple binding is performed due to, for example, a failure of the liquid applier 31. When the controller 100 determines that the remaining amount of liquid is not sufficient to apply the liquid to the predetermined number N of sheets (NO in step S804), the controller 100 determines that it is difficult to bind the sheets by the liquid-application crimp binding even if the predetermined number N of sheets is smaller than the first threshold value A, and executes the staple binding (step S803). When the controller 100 determines in step S804 that the remaining amount of liquid is not sufficient to apply the liquid to the predetermined number N of sheets, the controller 100 may perform, for example, pop-up display on the control panel 110 to notify the user that the staple binding is to be performed due to the shortage of the liquid.

When the controller 100 and the liquid amount sensor 43*a* as the liquid amount detector determine that the remaining amount of liquid is insufficient with respect to the number of sheets P of the sheet bundle Pb, the liquid-application crimp binding is avoided and the executable binding processing is performed.

Figure 12:
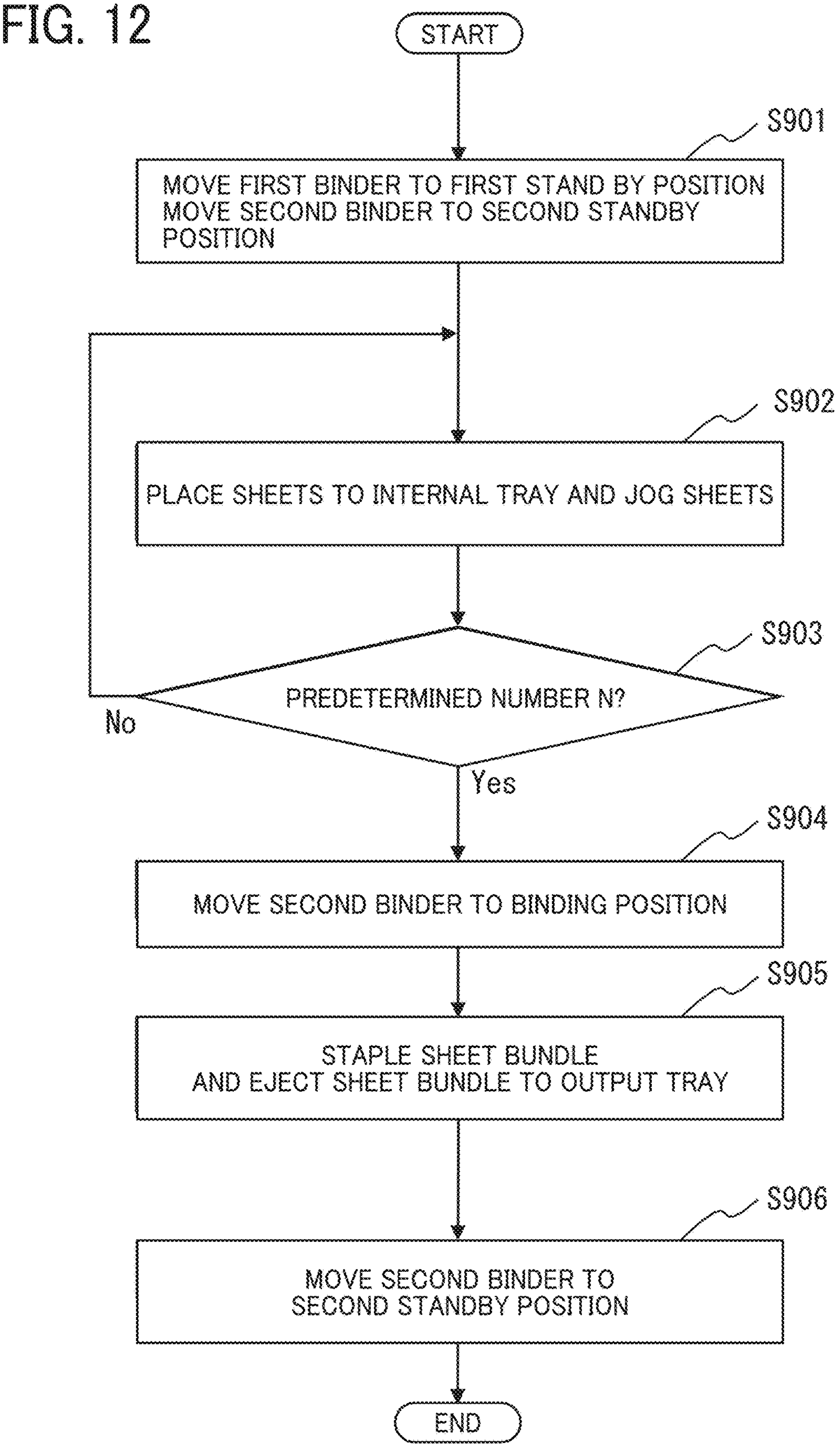
FIG. 12 is a flowchart of the second binding.

Next, a description is given of details of the staple binding (step S803) as an example of the second binding. FIG. 12 is a flowchart illustrating a process of the staple binding. FIGS. 13A and 13B are diagrams illustrating the positions of the first binder 25 and the second binder 55 during the staple binding. In step S901, at the start of the stable binding, the controller 100 drives the first-binder movement motor 50 to move the first binder 25 to a first standby position HP1, and drives the second-binder movement motor 80 to move the second binder 55 to a second standby position HP2. As illustrated in FIG. 13A, the first standby position HP1 and the second standby position HP2 correspond to opposite end portions of the guide shaft 49 in the main scanning direction.

In step S902, the controller 100 rotates the conveyance roller pairs 10, 11, 14, and 15 as the post-processing conveyance unit to place a sheet P on which an image is formed by the image forming apparatus 2 on the internal tray 22. The controller 100 also moves the side fences 24L and 24R to align the position of the sheet P or the sheet bundle Pb placed on the internal tray 22 in the main scanning direction. In short, the controller 100 performs jogging.

Subsequently, in step S903, the controller 100 determines whether the number of sheets P that are placed on the internal tray 22 has reached the predetermined number N instructed by the binding instruction. When the controller 100 determines that the number of sheets P placed on the internal tray 22 has not reached the predetermined number N of sheets (NO in step S903), the controller 100 executes the processing of step S902 again. In other words, the controller 100 executes the processing of step S902 each time a sheet P is conveyed to the internal tray 22 by the conveyance roller pairs 10, 11, 14, and 15.

When the controller 100 determines that the number of sheets P placed on the internal tray 22 has reached the predetermined number N (YES in step S903), in step S904, the controller 100 drives the second-binder movement motor 80 to move the second binder 55 in the main scanning direction so that the staple binder 62 faces the binding position B1 as illustrated in FIG. 13B.

Subsequently, in step S905, the controller 100 crimps and binds the sheet bundle Pb placed on the internal tray 22 and outputs the sheet bundle Pb to the output tray 26. Specifically, the controller 100 drives the contact-separation motor 32*d* to sandwich the binding position B1 on the sheet bundle Pb placed on the internal tray 22 with a staple.

In step S906, the controller 100 drives the second-binder movement motor 80 to move the second binder 55 to the second standby position HP2 as illustrated in FIG. 13A.

As described above, in the case where the number of sheets to be bound is not suitable for the liquid-application crimp binding, the controller 100 executes the staple binding of step S803.

Figure 14:
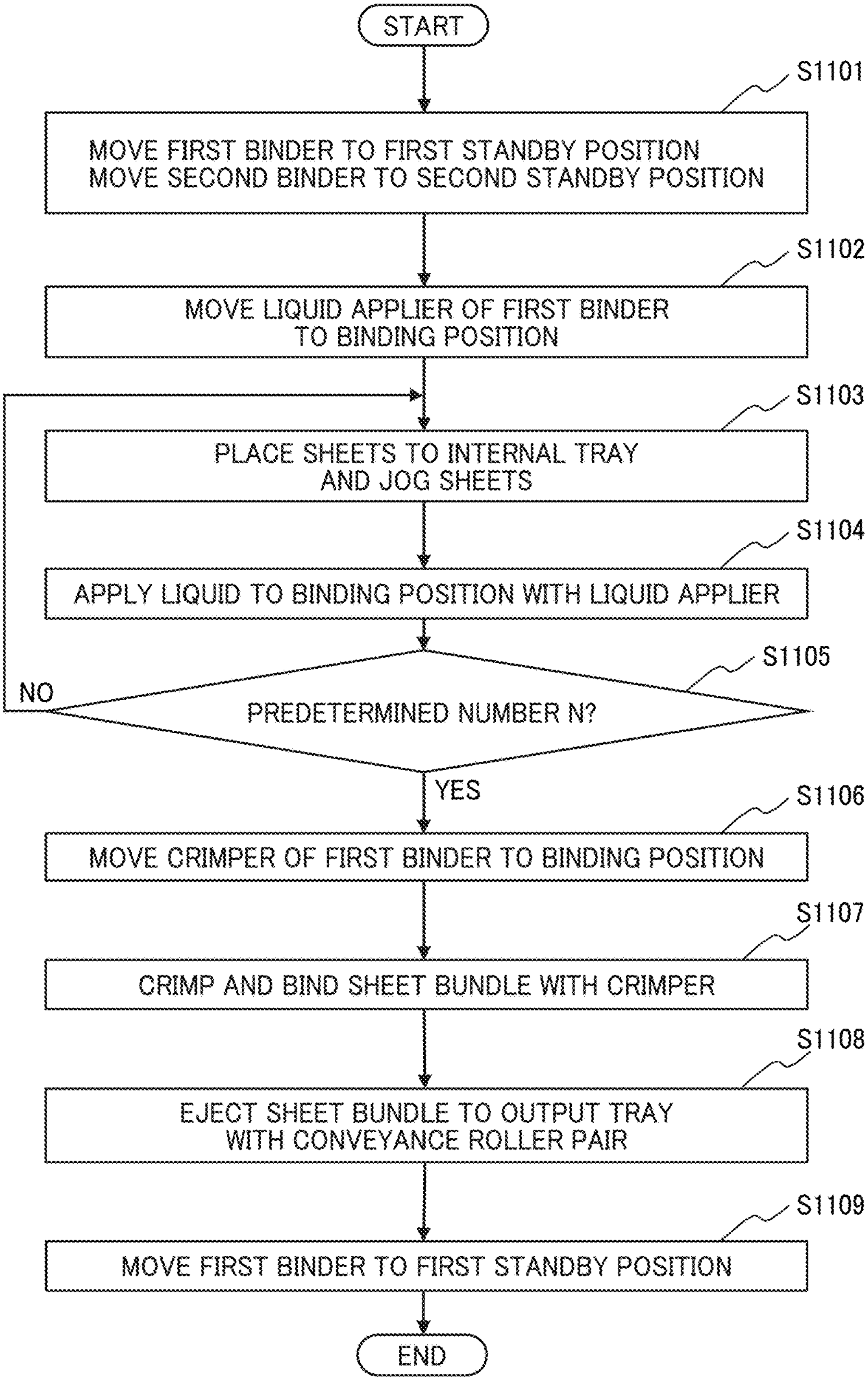
FIG. 14 is a flowchart of first binding.
Figure 15A:
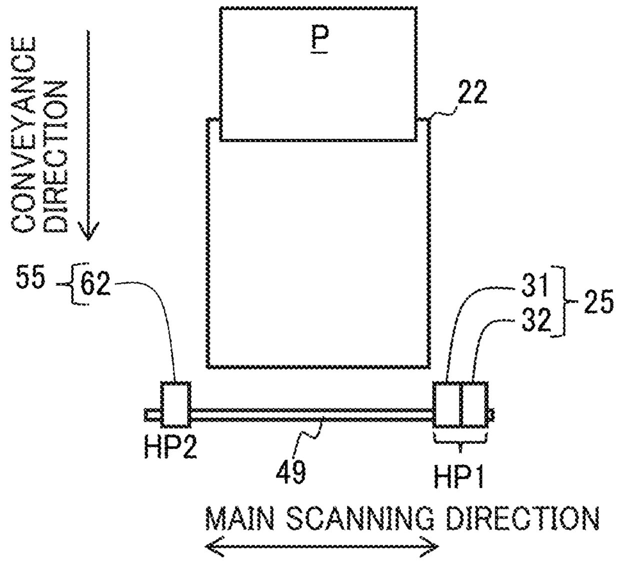
FIGS. 15A, 15B, and 15C are diagrams illustrating the position of each binder in the first binding.

Next, a description is given of details of the liquid-application crimp binding (step S805) as an example of the first binding. FIG. 14 is a flowchart illustrating a process of the liquid-application crimp binding. FIG. 15 is a diagram illustrating the positions of the first binder 25 and the second binder 55 during the liquid-application crimp binding. In step S1101, at the start of the stable binding, the controller 100 drives the first-binder movement motor 50 to move the first binder 25 to a first standby position HP1, and drives the second-binder movement motor 80 to move the second binder 55 to a second standby position HP2. As illustrated in FIG. 15A, the first standby position HP1 and the second standby position HP2 correspond to opposite end portions of the guide shaft 49 in the main scanning direction.

Figure 15B:
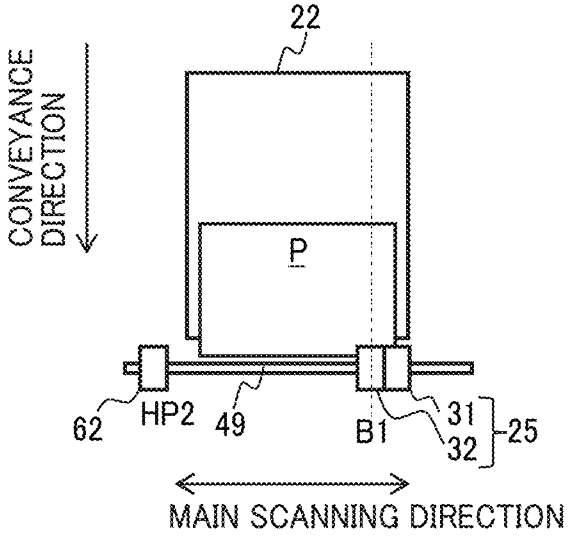

In step S1102, as illustrated in FIG. 15B, the controller 100 causes the first binder 25 to move in the main scanning direction so that the liquid applier 31 faces the binding position B1 (corresponding to the liquid application position B1) of the sheets P placed on the internal tray 22.

In step S1103, the controller 100 rotates the conveyance roller pairs 10, 11, 14, and 15 as the post-processing conveyance unit to place a sheet P on which an image is formed by the image forming apparatus 2 on the internal tray 22. In step S1103, the controller 100 also moves the side fences 24L and 24R to align the position of the sheet P or the sheet bundle Pb placed on the internal tray 22 in the main scanning direction. In short, the controller 100 performs jogging.

In step S1104, the controller 100 causes the liquid applier 31 to apply liquid to the binding position B1 of the sheet P. In other words, the controller 100 drives the liquid applier movement motor 37 to cause the liquid application member 44 to contact the binding position B1 on the sheet P placed on the internal tray 22.

As described above, the controller 100 moves the first binder 25 in the main scanning direction so that the liquid applier 31 faces the binding position B1 of the sheet P at a stage before the sheet P is placed on the internal tray 22. Such control can obviate the necessity to reciprocate the first binder 25 between the first standby position HP1 and the binding position B1 each time the sheet P is placed on the internal tray 22. Thus, the productivity of the liquid-application crimp binding can be enhanced.

In step S1105, the controller 100 determines whether the number of sheets P placed on the internal tray 22 has reached the predetermined number N instructed by the binding instruction. When the controller 100 determines that the number of sheets P placed on the internal tray 22 has not reached the predetermined number N (NO in step S1105), the controller 100 executes the processing of steps S1103 and S1104 again.

In other words, the controller 100 executes the processing of steps S1103 and S1104 each time a sheet P is conveyed to the internal tray 22 by the conveyance roller pairs 10, 11, 14, and 15. Note that the liquid may be applied to some sheets P or all the sheets P of the sheet bundle Pb. For example, the controller 100 may cause the liquid applier 31 to apply the liquid to the binding position B1 at intervals of one in every “n” sheets. Note that “n” is less than “N” (i.e., n<N).

Figure 15C:
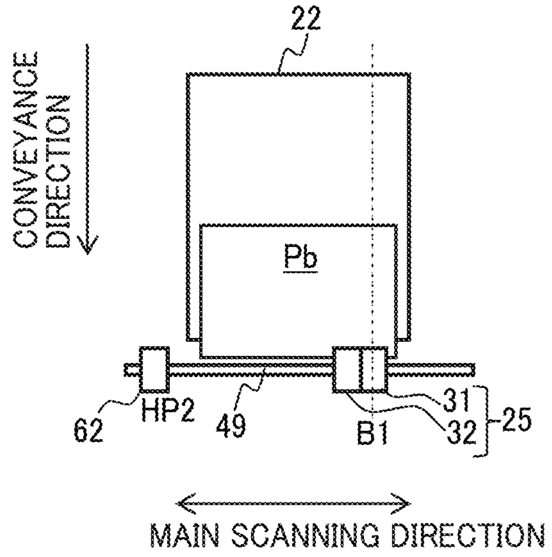

When the controller 100 determines that the number of sheets P placed on the internal tray 22 has reached the predetermined number N (YES in step S1105), in step S1106, the controller 100 drives the first-binder movement motor 50 to move the first binder 25 in the main scanning direction so that the crimper 32 faces the binding position B1 as illustrated in FIG. 15C.

In step S1107, the controller 100 causes the crimper 32 to perform crimp binding on the sheet bundle Pb placed on the internal tray 22. Specifically, the controller 100 drives the contact-separation motor 32*d* to cause the pair of binding teeth 32*a* and binding teeth 32*b* to sandwich, press, and deform the binding position B1 on the sheet bundle Pb placed on the internal tray 22 to bind the sheet bundle Pb. In step S1108, the controller 100 discharges the sheet bundle Pb crimped and bound by the conveyance roller pair 15 to the output tray 26. Specifically, the controller 100 rotates the conveyance roller pair 15 to output the sheet bundle Pb crimped and bound to the output tray 26.

In step S1109, as illustrated in FIG. 15A, the controller 100 drives the first-binder movement motor 50 to move the first binder 25 to the first standby position HP1.

As described above, when the number of sheets to be bound is suitable for the liquid application, pressure bonding, and binding process, the controller 100 executes the liquid-application crimp binding of step S805.

As described above, according to the present embodiment, the binding type can be automatically switched between the liquid-application crimp binding executed when the liquid-application crimp binding is executable for the predetermined number N of sheets and the staple binding executed when the liquid-application crimp binding is not executable.

Figure 16:
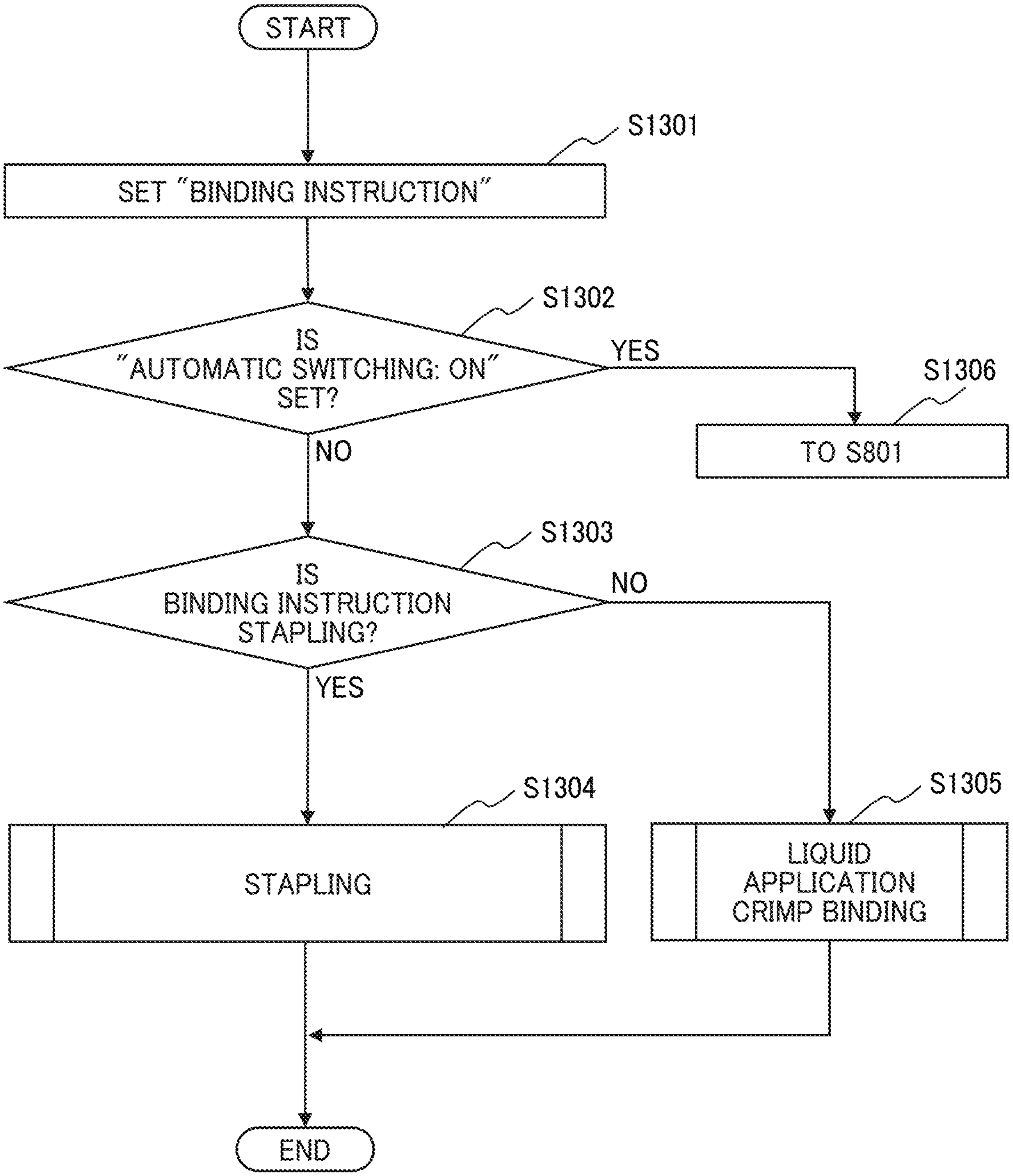
FIG. 16 is a flowchart of a process of binding in which first binding and second binding are switchable by selection of the user.

Next, a second example of the process executed by a medium processing program according to an embodiment of the present disclosure is described with reference to FIGS. 16, 17A, and 17B. Unlike the first example described above, the second example is a process in which the binding type is not automatically switched but the binding set by the user is executed.

First, an operation of the image forming system 1 is started by an instruction operation of a user. The operation start instruction is issued when the user operates (presses) a button such as “print start” displayed on the control panel 110 illustrated in FIG. 1. The controller 100 causes the control panel 110 to display a “binding automatic-switching setting screen 1001” illustrated in FIG. 17A as a series of operation start instructions before the instruction of operation start or after the operation of the operation instruction. In step S1301, the user can execute the setting of the “binding instruction” together with printing via the binding automatic-switching setting screen 1001. In the step S1301, first, the user sets the execution or non-execution (either ON or OFF) of the automatic switching of the binding type via the binding automatic-switching setting screen 1001 displayed on the control panel 110.

Figure 17A:
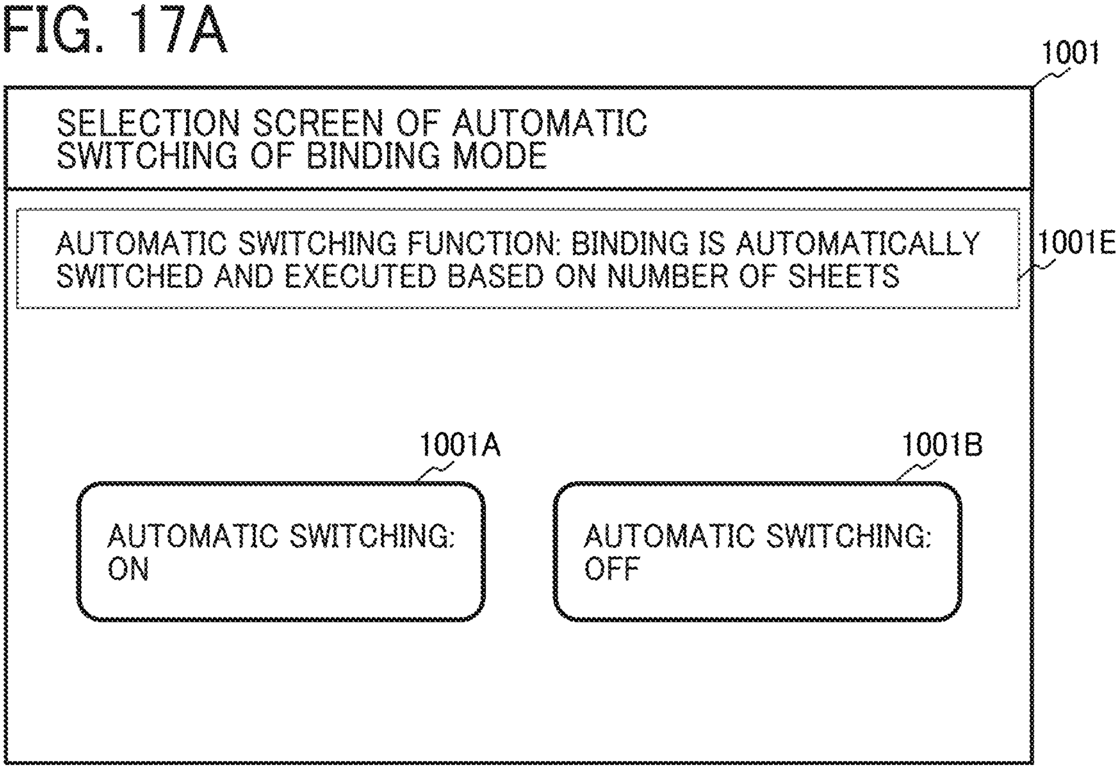
FIGS. 17A and 17B are examples of setting screens in the process of binding of FIG. 16.

As illustrated in FIG. 17A, the binding automatic-switching setting screen 1001 displays a first selection button 1001A (ON button) and a second selection button 1001B (OFF button) for operating the binding automatic-switching function. A pop-up screen of the binding automatic-switching setting screen 1001 displays a message 1001E for allowing the user to select whether to apply the automatic switching between the liquid-application crimp binding and the staple binding.

When the first selection button 1001A is selected by the user, the controller 100 stores “automatic switching ON” as the "binding instruction" in a storage area. When the second selection button 1001B ("automatic switching OFF") is selected by the user, the controller 100 displays a "binding mode selection screen 1002" as illustrated in FIG. 17B on the control panel 110. On the binding mode selection screen 1002, a third selection button 1001C for selecting "staple binding (hereinafter referred to as"stapling")" and a fourth selection button 1001D for selecting "liquid-application crimp binding" are displayed. The controller 100 stores the binding type corresponding to the selected button as a "binding instruction" in the storage area.

In step S1302, the controller 100 determines whether the "binding instruction" stored in the storage area is "automatic switching ON". If the binding instruction is "automatic switching ON" (YES in step S1302), in step S1306, the process proceeds to step S801 of the process described in FIG. 11.

If the "binding instruction" stored in the storage area is not "automatic switching ON" (NO in step S1302), in step S1303, the controller 100 determines whether the "binding instruction" is "stapling". If the binding instruction is "stapling" (YES in step S1303), in step S1304, the controller 100 executes staple binding. Since the details of the staple binding are the same as those described in the first example, a detailed description thereof is omitted.

When the binding instruction is not "stapling" (NO in step S1303), in step S1305, the controller 100 executes the liquid-application crimp binding. The details of the liquid-application crimp binding are the same as those described in the first example, and thus a detailed description thereof is omitted.

As described above, according to the present embodiment, the staple binding or the liquid-application crimp binding is appropriately selected by the selection of the user, and thus the binding optimum to the user's request can be executed.

Figure 17B:
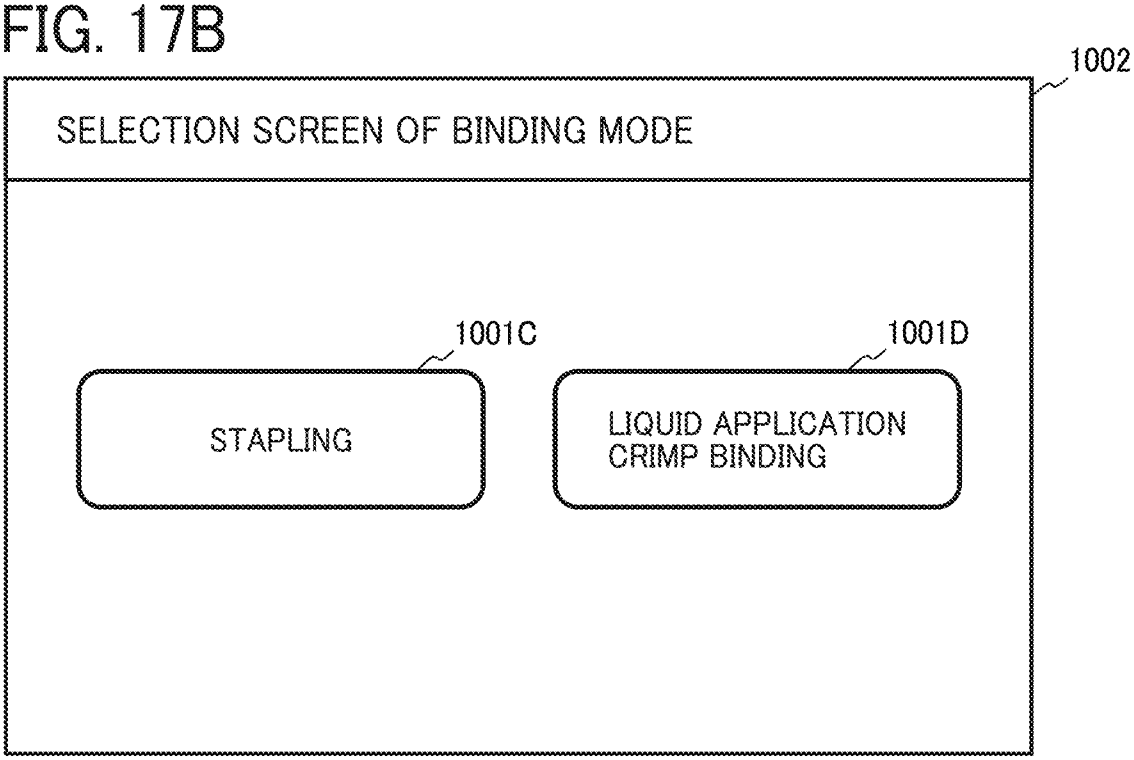

The controller 100 and the control panel 110 constitute a switching mode setting unit (FIG. 17B). The controller 100 and the control panel 110 constitute a switching confirmation unit (FIG. 17A) that allows the user to confirm whether to switch the binding type.

Next, a third example of a binding process executed by a medium processing program according to an embodiment of the present disclosure is described with reference to a flowchart of FIG. 18. Each processing function described in the following flowchart is implemented by execution of the medium processing program in the controller 100.

Figure 11:
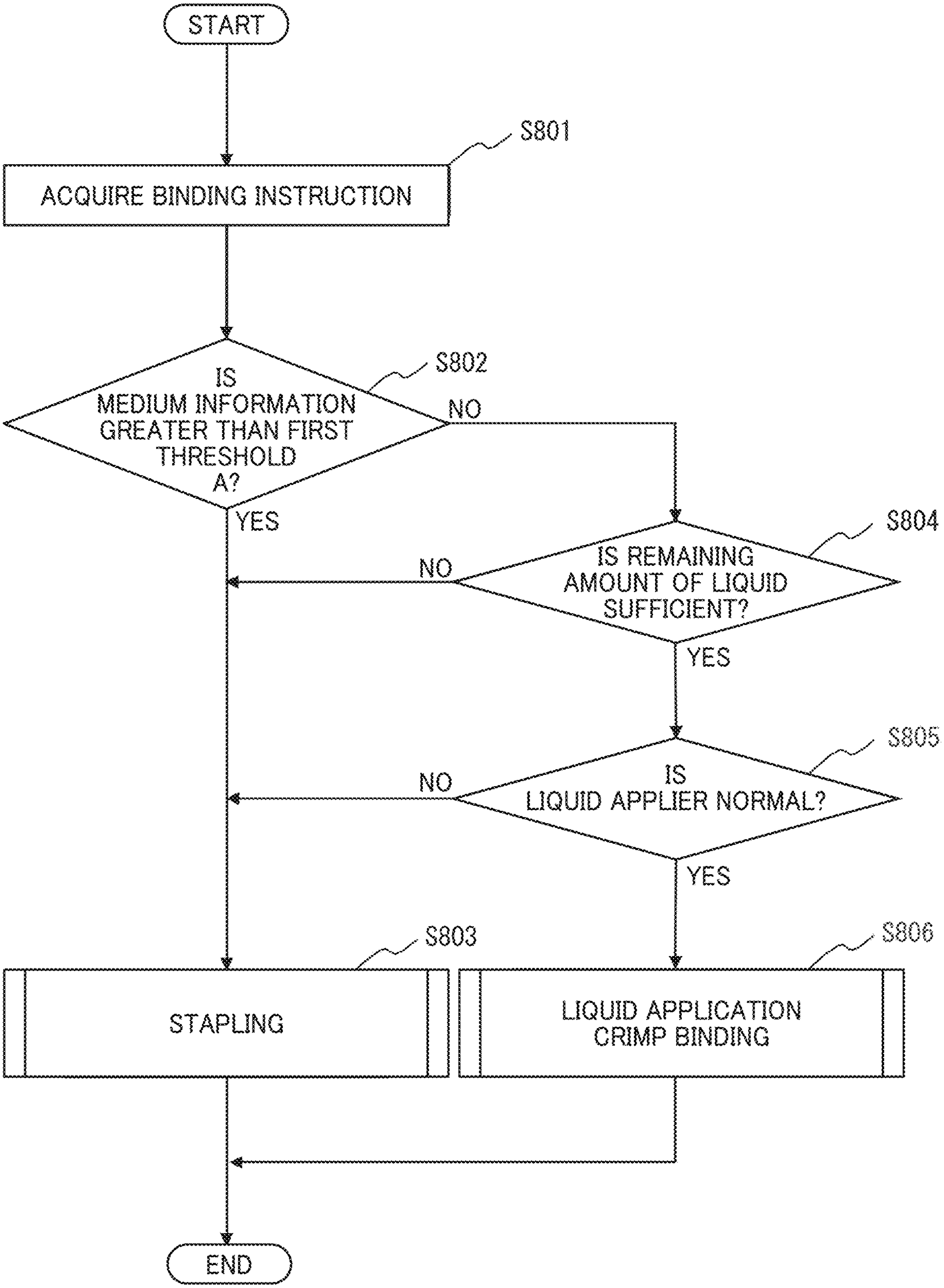
FIG. 11 is a flowchart of a process of binding in which first binding and second binding are automatically switchable.
Figure 18:
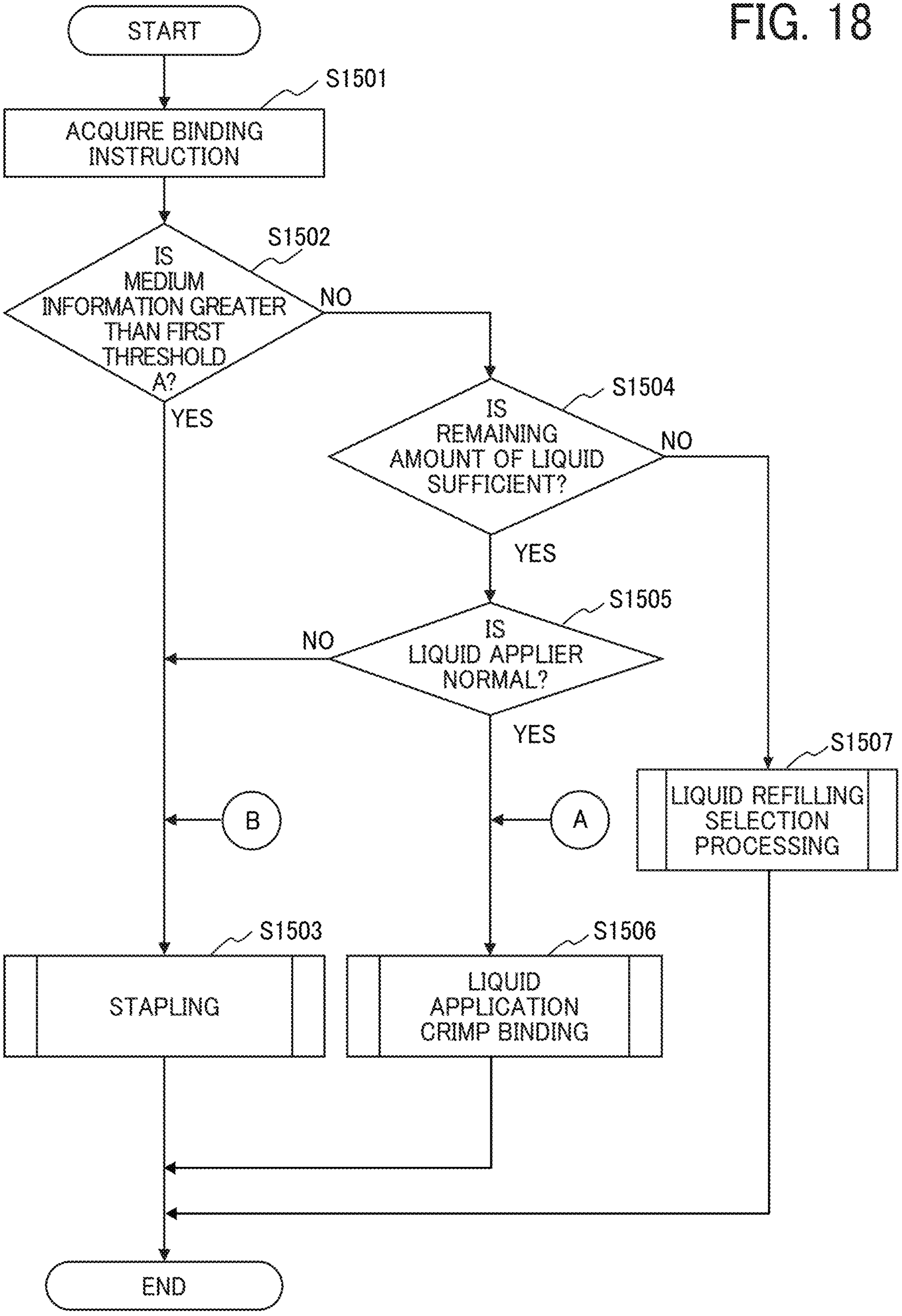
FIG. 18 is a flowchart of a process of binding in which the first binding and the second binding are automatically switchable based on the remaining amount of liquid available for liquid application.

Of the processing according to the third example, the processing from step S1501 to step S1506 illustrated in FIG. 18 is the same as the processing from steps S801 to S806 in FIG. 11 in the first example already described. Therefore, a detailed description thereof is omitted, and different points are described below in detail.

In the present example, when the predetermined number N is not greater than the first threshold value A (NO in step S1502) and the remaining amount of liquid in the liquid storage tank 43 is not sufficient (NO in step S1504), in step S1507, the controller 100 executes liquid refilling selection processing.

Figure 19:
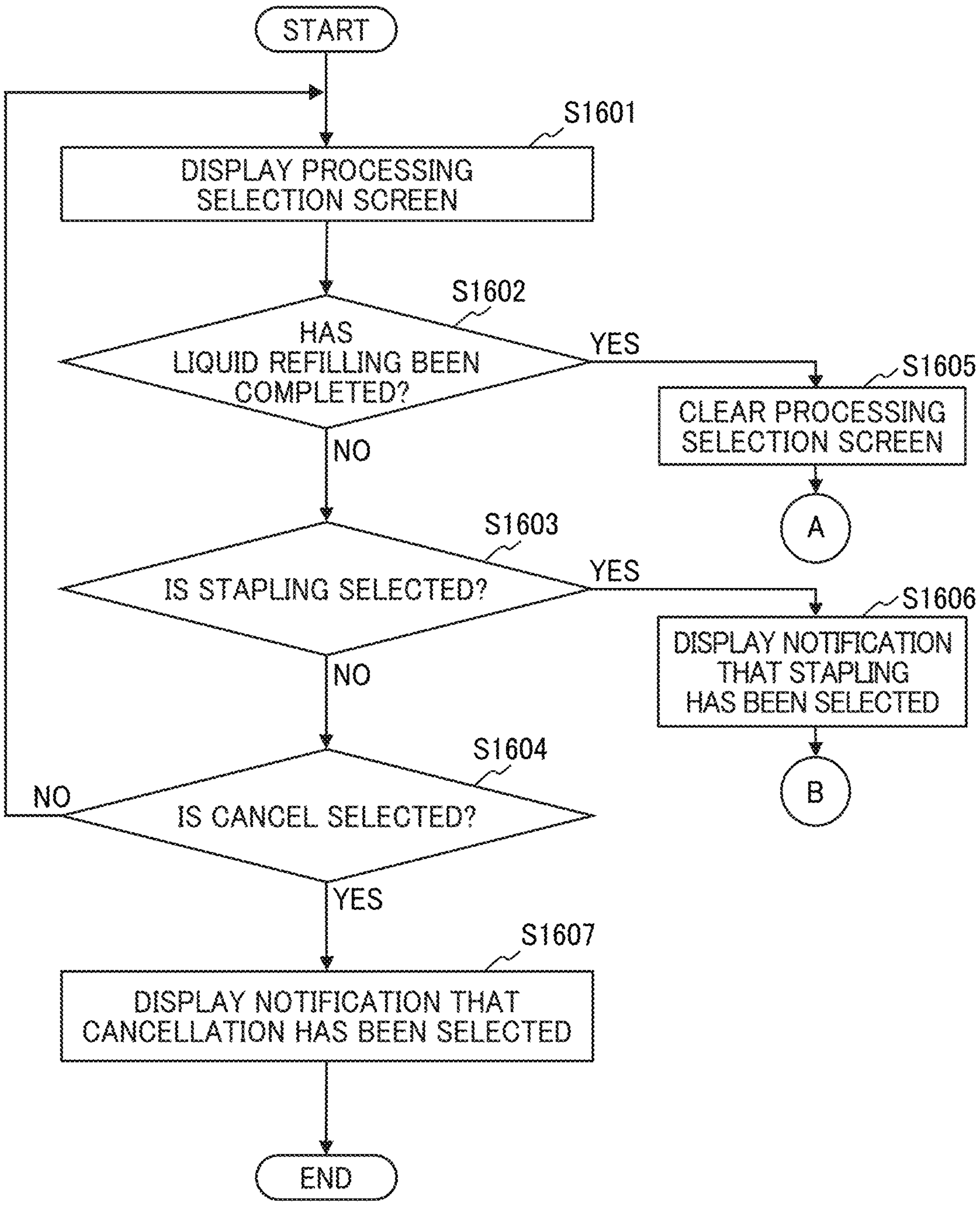
FIG. 19 is a flowchart of a process of binding in which the binding type is switchable to the second binding, based on the remaining amount of liquid during the process of binding of FIG. 18.

Next, details of the liquid-refilling selection processing (step S1507) are described using the flowchart of FIG. 19. First, as illustrated in FIG. 20, the controller 100 displays a liquid-refilling-and-processing-selection screen 1003 on the control panel 110.

Figure 20:
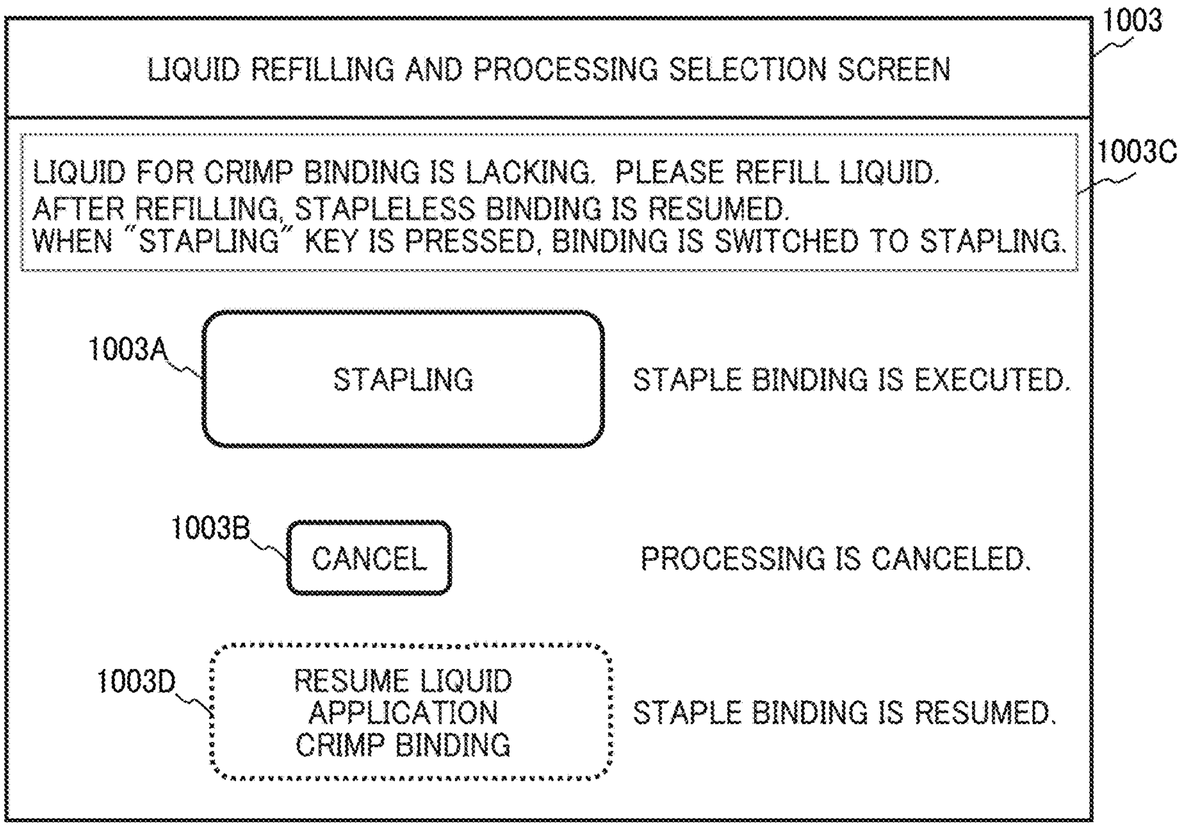
FIG. 20 is a diagram of an example of a setting screen in the process of binding of FIG. 19.

As illustrated in FIG. 20, the liquid-refilling-and-processing-selection screen 1003 displays a message 1003C for notifying shortage of the remaining amount of liquid and prompting refilling of the liquid, a fifth selection button 1003A for switching the binding to "stapling", and a sixth selection button 1003B for instructing stop of the binding.

After the liquid-refilling-and-processing-selection screen 1003 is displayed, in step S1602, the controller 100 checks whether the liquid storage tank 43 is refilled with a sufficient amount of liquid, through detection of the liquid amount sensor 43*a*, and monitors whether switching to "stapling" or "stop" of the binding is selected via the control panel 110. While the amount of liquid is insufficient (NO in step S1602) and the selection operation is not performed on the control panel 110 (NO in step S1603 and NO in step S1604), the process is looped.

When the amount of liquid turns to be sufficient (YES in step S1602), in step S1605, the controller 100 erases the liquid-refilling-and-processing-selection screen 1003 displayed on the control panel 110. In step S1505, the controller 100 shifts the process to the liquid-application crimp binding. In step S1605, instead of erasing the liquid-refilling-and-processing-selection screen 1003, the controller 100 may display a restart button 1003D for restarting the liquid-application crimp binding as illustrated in FIG. 20. In such a case, the user can perform an operation of selecting the restart button 1003D to shift the process to the liquid-application crimp binding of step S1506.

When "stapling" is selected (YES in step S1602) before the amount of liquid turns to be sufficient (NO in step S1603), in step S1606, the controller 100 displays on the control panel 110 a notification indicating that stapling is selected, and shifts the process to the staple binding of step S1503.

When "stop" is selected (UES in step S1604) before the amount of liquid turns to be sufficient (NO in step S1602), in step S1607, the controller 100 displays on the control panel 110 a notification indicating that stop is selected, and terminates the process.

Next, a fourth example of a binding process executed by a medium processing program according to an embodiment of the present disclosure is described with reference to a flowchart of FIG. 21. Each processing function described in the following flowchart is implemented by execution of the medium processing program in the controller 100.

Figure 21:
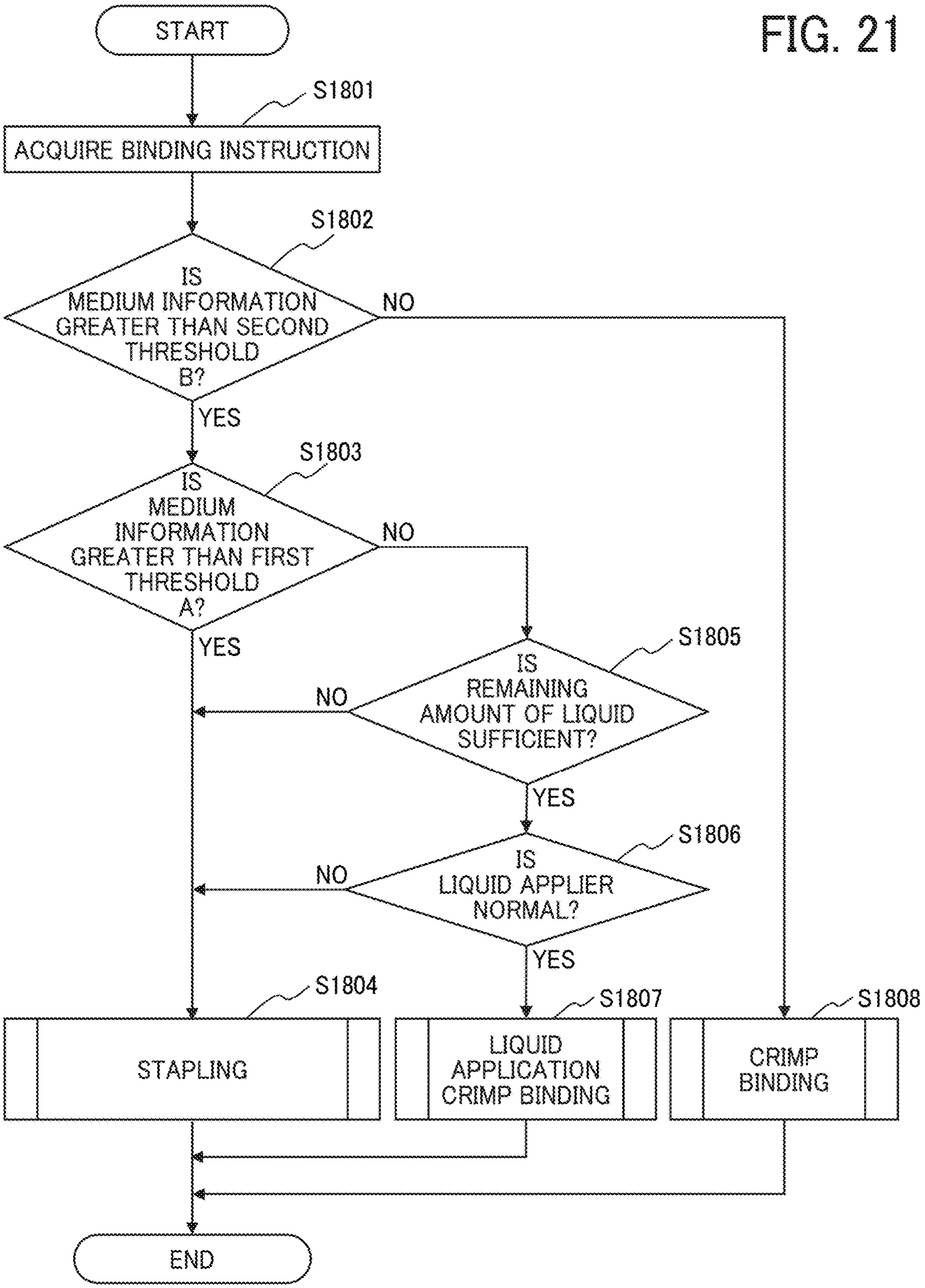
FIG. 21 is a flowchart of a process of binding in which the first binding, the second binding, and third binding are automatically switchable.

Of the processing according to the fourth example, the processing of step S1801 and steps S1803 to S1807 illustrated in FIG. 21 is the same as the processing from steps S801 to S806 in FIG. 11 in the first example already described. Therefore, a detailed description thereof is omitted, and different points are described below in detail.

In the fourth example, first, the operation of the image forming system 1 is started by an instruction operation of a user. In step S1801, the controller 100 acquires a binding instruction including information indicating the content of the binding set by the user on the control panel 110.

In step S1802, the controller 100 determines whether the predetermined number N of sheets acquired in step S1801 is greater than a preset second threshold value B. The second threshold value B is a parameter indicating an upper limit of the number of sheets P that can be bound by the crimp binding in which liquid application is not performed (hereinafter simply referred to as "crimp binding"). When the predetermined number N of sheets is greater than the second threshold value B, the staple binding or the liquid-application crimp binding is performed to maintain the binding strength of the sheet bundle Pb. However, when the predetermined number N of sheets is not greater than the second threshold value B, the binding strength of the sheet bundle Pb can be maintained even if the crimp binding is performed on the sheet bundle Pb to which the liquid is not applied.

For example, when the maximum number of sheets that can be bound is five sheets (the second threshold value B) in the crimp binding in which crimp binding is performed without application of the liquid, the controller 100 determines whether the predetermined number N of sheets is six sheets or more. The maximum number of sheets is set as an initial value. As is described later, the initial value can be set by the user via the control panel 110, and can be appropriately changed in accordance with the number of sheets that can be bound in the first binder 25.

As the second threshold value B, a plurality of threshold values may be set that are automatically adjusted in accordance with information such as the thickness of the sheet (sheet thickness), the type of the sheet (sheet type), and the binding position set by the binding instruction. For example, as illustrated in FIG. 26, when the paper type information is "not set (any other type than coated paper)", the second threshold values B1 that are the maximum numbers of sheets in the liquid-application crimp binding are set to "5 sheets, 3 sheets, and 0 sheets" according to the paper thickness information "plain paper, medium thick paper, and thick paper", respectively. The controller 100 determines whether the predetermined number N of sheets is greater than each of the second thresholds B1. When the paper type information is "coated paper", the controller 100 sets the second threshold value B2, which is the maximum number of sheets to be subjected to the crimp binding, to "0 sheets" regardless of the type of sheet thickness, and determines that the crimp binding is not executable regardless of the predetermined number N of sheets.

When the predetermined number N is greater than the second value B (YES in step S1802), the controller 100 determines that the number of sheets of the sheet bundle Pb is difficult to be bound by the crimp binding, and automatically shifts to a process of selecting the liquid-application crimp binding or the staple binding.

When the predetermined number N of sheets is not greater than the second threshold value B (i.e., is equal to or smaller than the second threshold value B) (NO in step S1802), in step S1808, the controller 100 executes only the crimp binding without performing the liquid application. The processing of step S1808 is the same as the processing of step S806 described in the first example (see FIG. 14) except that the liquid application to the binding position in the step S1103 is omitted, and thus a detailed description thereof is omitted.

As described above, in the present example, any binding of the crimp binding, the liquid-application crimp binding, and the staple binding can be automatically selected (referred to as a "binding automatic-switching function"). In some embodiments, however, a configuration may be adopted in which the user can individually set the binding type as a target of the binding automatic-switching function so that the user can select and use any binding type based on the setting. In such a case, for example, the user can select, as targets of the binding automatic-switching function, only the crimp binding and the staple binding, only the crimp binding and the liquid-application crimp binding, or only the liquid-application crimp binding and the staple binding.

Figure 23:
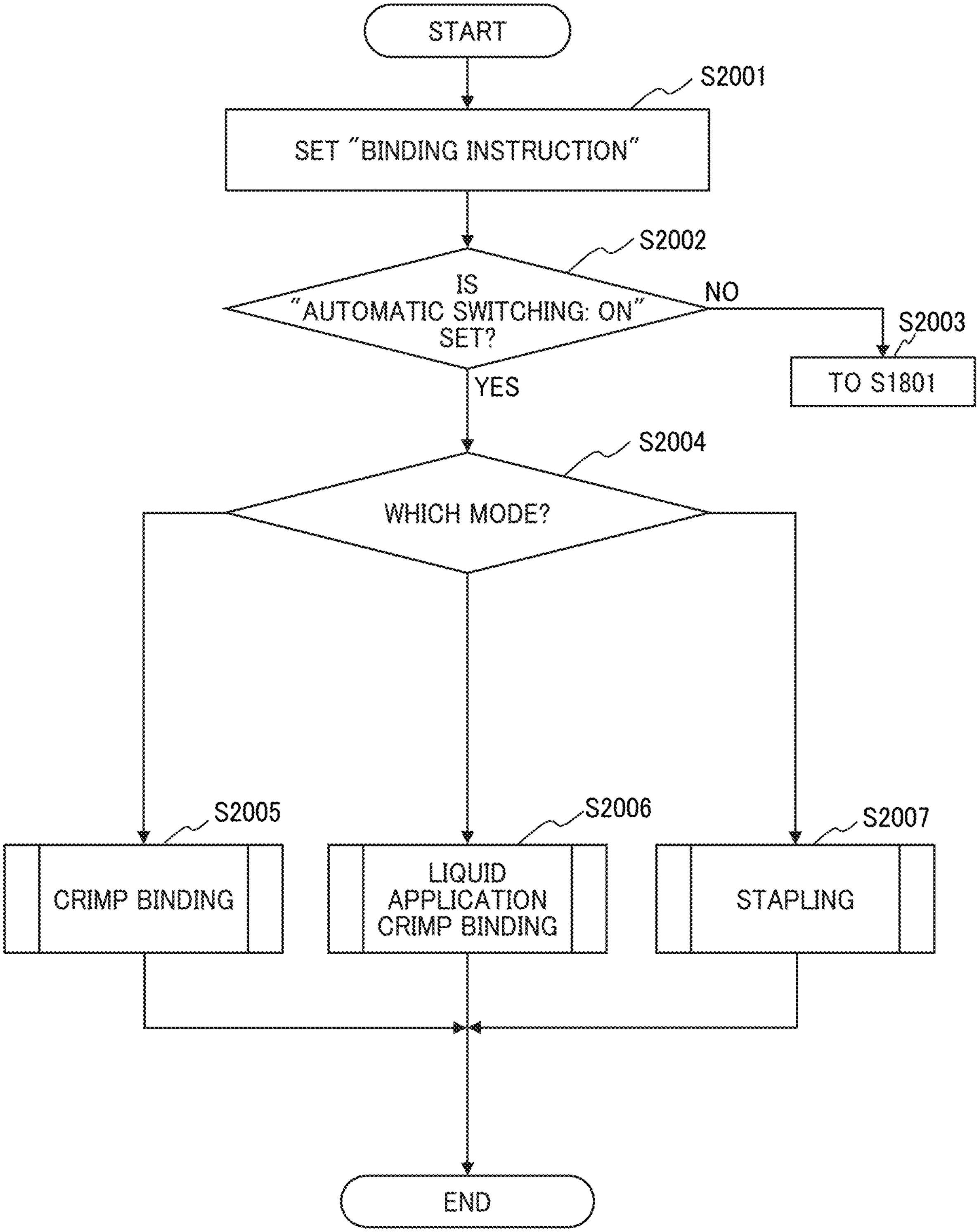
FIG. 23 is a flowchart of a process of binding in which the first binding, the second binding, and the third binding is switchable by a user's selection.

Next, a fifth example of a binding process executed by a medium processing program according to an embodiment of the present disclosure is described with reference to a flowchart of FIG. 23. Each processing function described in the following flowchart is implemented by execution of the medium processing program in the controller 100.

In the present example, unlike the fourth example described with reference to FIG. 21, the binding type is not automatically switched, but the binding process is performed based on any binding mode set by the user. Of the processing according to the third example, the processing from step S2001 to step S2003 illustrated in FIG. 23 is the same as the processing of steps S1301, S1302, and S1306 in FIG. 16 in the second example already described. Therefore, a detailed description thereof is omitted, and different points are described below in detail.

Figure 24:
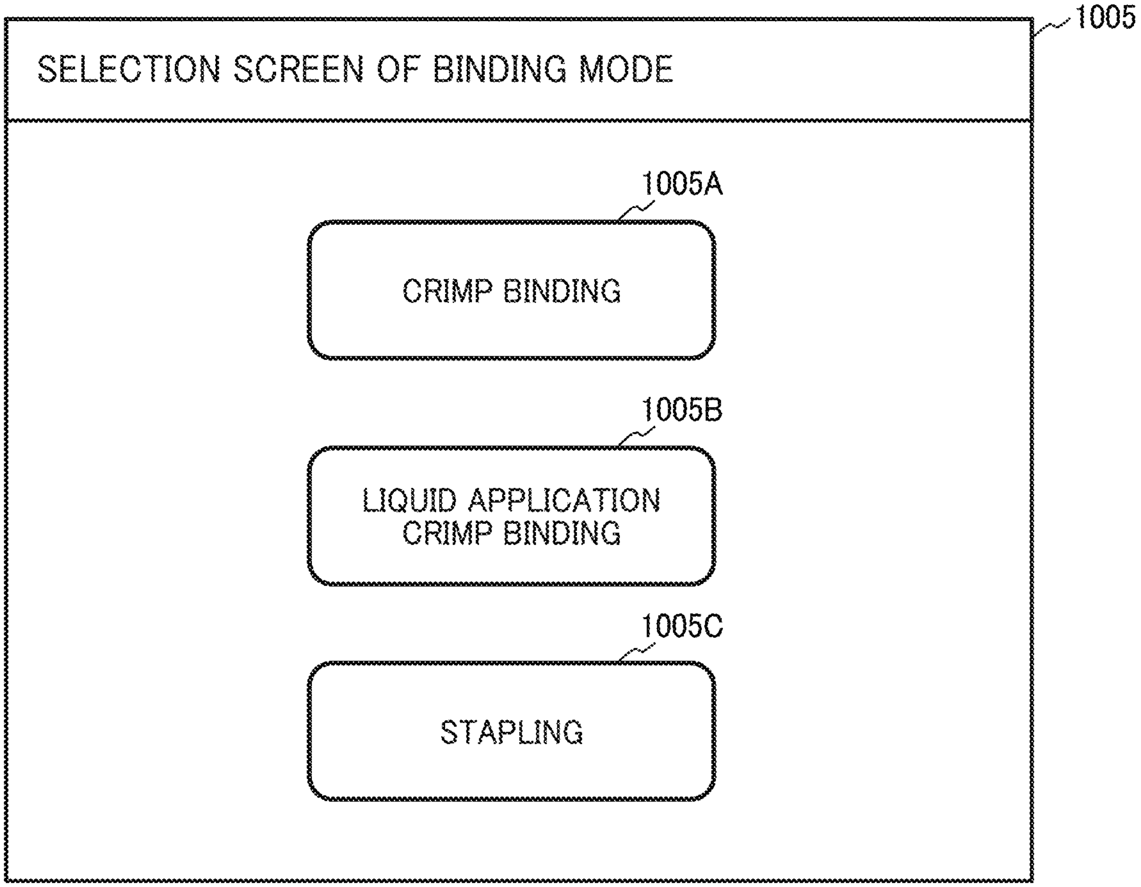
FIG. 24 is a diagram illustrating an example of a setting screen in the process of binding of FIG. 23.

When the second selection button 1001B ("automatic switching OFF") illustrated in FIG. 17 is selected by the user, the controller 100 displays a binding mode selection screen 1005 illustrated in FIG. 24 on the control panel 110. In step S2004, the user can select a binding mode via the binding mode selection screen 1005.

As illustrated in FIG. 24, a first selection button 1005A (crimp binding), a second selection button 1005B (liquid-application crimp binding), and a third selection button 1005C (stapling) for selecting a binding mode are displayed on the binding mode selection screen 1005.

When any one of the first selection button 1005A, the second selection button 1005B, and the third selection button 1005C is selected by the user, the controller 100 shifts to each binding mode set corresponding to the selected one of the first selection button 1005A, the second selection button 1005B, and the third selection button 1005C. The controller 100 causes the first binder 25 and the second binder 55 to execute the binding set in correspondence with each binding mode.

When the first selection button 1005A is selected by the user, in step S2005, the controller 100 executes the crimp binding. Since the crimp binding is the same as the processing of step S1807 described in the fourth example, a detailed description thereof is omitted.

When the second selection button 1005B is selected by the user, in step S2006, the controller 100 executes the liquid-application crimp binding. Since the liquid-application crimp binding is the same as the processing of the step S805 in FIG. 11 already described in the first example, a detailed description thereof is omitted.

When the third selection button 1005C is selected by the user, in step S2007, the controller 100 executes the staple binding. Since the staple binding is the same as that described in the first example, a detailed description thereof is omitted.

As described above, according to the present example, the optimum binding can be executed after any one of the crimp binding, the liquid-application crimp binding, and the staple binding is appropriately selected by the user's selection.

A description is given below of a threshold setting screen according to an embodiment of the present disclosure.

A user interface related to a setting screen of thresholds used in the determination of step S802 in FIG. 11 of the first example, step S1502 in FIG. 18 of the third example, and steps S1802 and S1803 in FIG. 21 of the fourth example is described with reference to FIG. 22.

Figure 22:
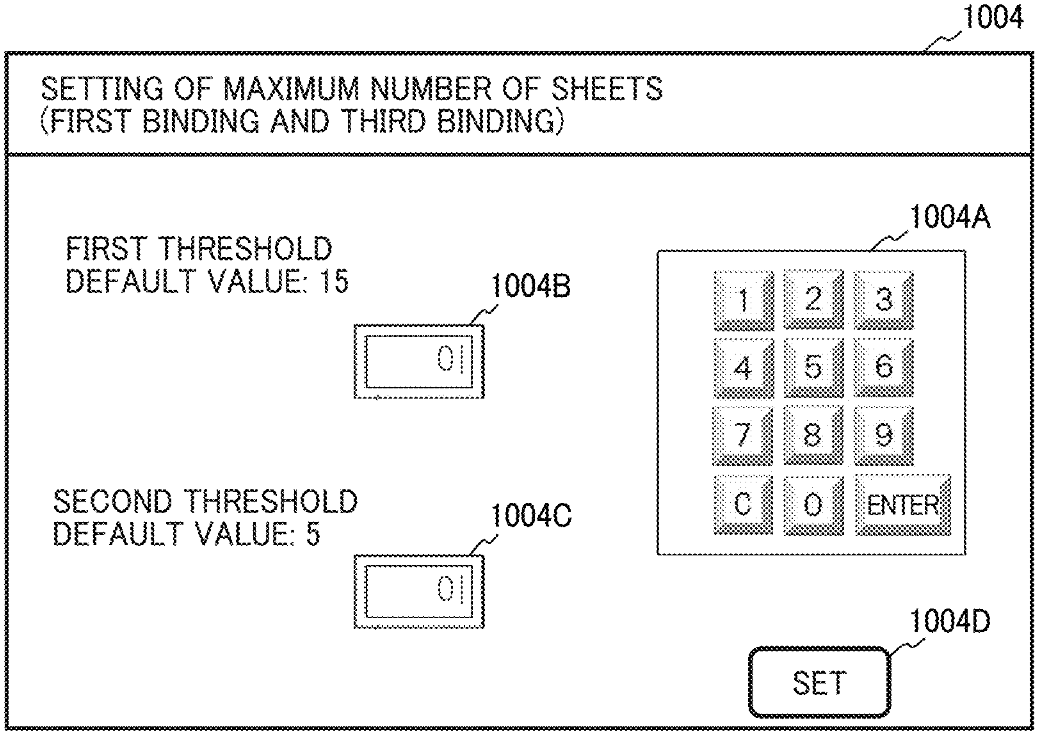
FIG. 22 is a diagram illustrating an example of a setting screen of a maximum number of sheets to be bound in the first binding and the third binding.

As illustrated in FIG. 22, a first threshold-value setting field 1004B and a second threshold-value setting field 1004C are displayed on the maximum-number-of-sheets setting screen 1004 together with a default value display of a first threshold value A as the maximum number of sheets required for the liquid-application crimp binding (first binding) and a default value display of a second threshold value B as the maximum number of sheets required for the crimp binding (third binding). A numeric keypad 1004A is also displayed.

When a numerical value is input to each field via the numeric keypad 1004A and the setting button 1004D is pressed, the first threshold value A and the second threshold value B are temporarily stored in a storage area included in the controller 100.

The settings of the first threshold value A and the second threshold value B can be changed via the maximum-number-of-sheets setting screen 1004. For example, a case where the setting value is changed to "10" is described below. In this case, the user first touches the first threshold-value setting field 1004B or the second threshold-value setting field 1004C in which the current set number of sheets is displayed, and then presses the "1" key, the "0" key, and the "enter" key by operating the numeric keypad 1004A, thus completing the input of the setting value.

The value being input at the time of changing the setting is always displayed in the first threshold-value setting field 1004B or the second threshold-value setting field 1004C. When the "C" key is pressed at the time of changing the setting, the value being input is erased and the setting value can be input again.

According to the above configuration, in a case where the user desires a binding strength higher than the binding strength at the initial maximum number of sheets at which the liquid-application crimp binding is performed, the user can set the maximum number of sheets at which the liquid-application crimp binding is performed to a number smaller than the initial maximum number of sheets. Such a configuration can lower the minimum number of sheets at which the staple binding having a higher binding strength is performed. That is, in a case where the initial maximum number of sheets (first threshold value A) of the liquid-application crimp binding is set to 15 sheets, the liquid-application crimp binding is executed when the number of sheets of the sheet bundle Pb is 15 sheets or less, and the staple binding is executed when the number of sheets of the sheet bundle Pb is 16 sheets or more. However, when the user changes the first threshold value A to 10 sheets as described above, the staple binding having a binding strength higher than that of the liquid-application crimp binding can be executed even on the sheet bundle Pb of 15 sheets on which the liquid-application crimp binding is normally executed.

The user interface causes the controller 100 to display a setting screen on the control panel 110, acquires an input to the setting screen, and applies the input to the determination. That is, the controller 100 and the control panel 110 constitute a condition setting unit that sets the switching condition. Similarly, the controller 100 and the control panel 110 constitute a threshold setting unit.

According to the above-described embodiment, for example, the following operational effects can be obtained.

In typical crimp binding, the larger the number of sheets constituting a sheet bundle, the more difficult it is for a binding teeth to bite into the sheet bundle. Accordingly, for example, the sheets may come off from the sheet bundle after the binding, and it may be difficult to maintain the bound state. In view of this disadvantage, there is also known a technique of adding water to a position on the sheet that the binding teeth are to contact and press, before the crimp binding is performed, so that the binding teeth easily bite into the sheet bundle. However, there has not been known a technique that allows selection between staple binding and crimp binding and also allows execution of the water addition during the crimp binding.

According to the above-described embodiment, for example, the liquid-application crimp binding in which the crimping binding is performed after the liquid application and the staple binding are automatically switchable, thus allowing the binding to be more smoothly performed. According to the above-described embodiment, for example, the liquid-application crimp binding and the staple binding are automatically switched in accordance with the information of a medium such as the type of the sheet (paper type) and the thickness of the sheet of paper (paper thickness). Thus, the binding strength of the sheet bundle can be ensured.

According to the above-described embodiment, for example, the binding type is switched when the shortage of the remaining amount of liquid is detected. Thus, the binding can be smoothly proceeded without interruption even in the case of the shortage of liquid.

Further, according to the above-described embodiment, for example, the binding process automatic switching function for automatically switching the binding type can be disabled so that the user can select the binding type that the user wants to use.

According to the above-described embodiment, for example, the configuration is adopted such that the user can select whether to use the binding automatic-switching function that automatically switches the binding type. Such a configuration can prevent the binding type from being switched to an unintended type of binding.

According to the above-described embodiment, for example, the setting of the number of sheets to be bound at which the automatic switching of the binding is performed can be changed by the user. Such a configuration can change the binding type to an optimum type in accordance with the number of sheets to be bound used by the user.

According to the above-described embodiment, for example, the binding type can be switched to the crimp binding in which crimp binding is performed without application of liquid. Thus, the user can switch execution and non-execution of the application of liquid to adjust the binding strength. In addition, when the number of sheets to be bound is small in the binding, the binding strength can be ensured without use of the liquid necessary for the liquid-application crimp binding.

According to the above-described embodiment, for example, the binding strength and the state of a sheet binding portion are different among the binding functions. Thus, the user can individually set whether any binding function is selectable. In this case, only the binding function set to ON can be automatically selected while the binding function set to OFF is not set as a selection target at the time of automatic selection. A suitable binding function can be selected from among the automatic selection targets based on a condition defined by, for example, the number of sheets to be bound. As described above, a suitable binding function is automatically switched and executed in accordance with the number of sheets to be bound. Thus, an optimum type of binding can be selected in accordance with the binding strength and the state of sheets.

According to the above-described embodiment, for example, the threshold values of the various binding processes to be switched by the binding automatic switching can be set in accordance with the use or preference of the user.

Now, a description is given of a second embodiment of the present disclosure.

Specifically, with reference to FIGS. 27 to 35, a description is given below of a post-processing apparatus 3A according to the second embodiment of the present disclosure. In the following description, components like those of the first embodiment are denoted by like reference numerals, and redundant descriptions thereof may be omitted.

The post-processing apparatus 3A according to the second embodiment is different from the post-processing apparatus 3 according to the first embodiment in which the liquid applier 31 and the crimper 32 are arranged side by side. In the post-processing apparatus 3A according to the second embodiment, a liquid applier 131 is disposed alone at an upstream position in a direction in which the sheet P is conveyed. Such a configuration allows a given number of sheets P to be stacked after the liquid is applied and conveyed to the crimper 32 of the edge binder 25 as the first binder disposed at a downstream position in the direction in which the sheet P is conveyed. Accordingly, the productivity of the binding process performed by the crimper 32 is enhanced.

Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to the reverse conveyance direction and the thickness direction of the sheet P is defined as "main scanning direction."

Figure 27:
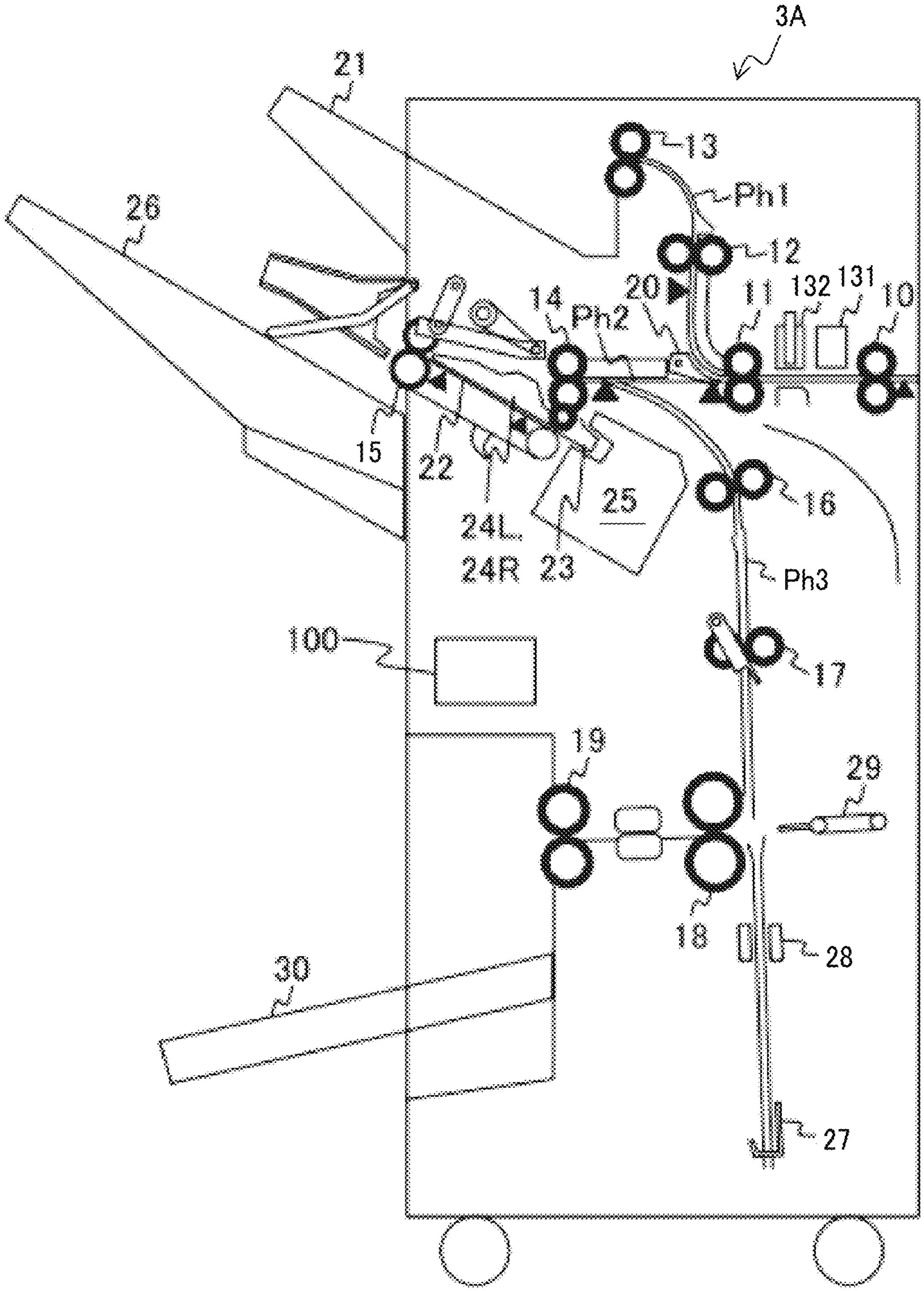
FIG. 27 is a diagram illustrating the internal configuration of a post-processing apparatus according to a second embodiment of the present disclosure.
Figure 28A:
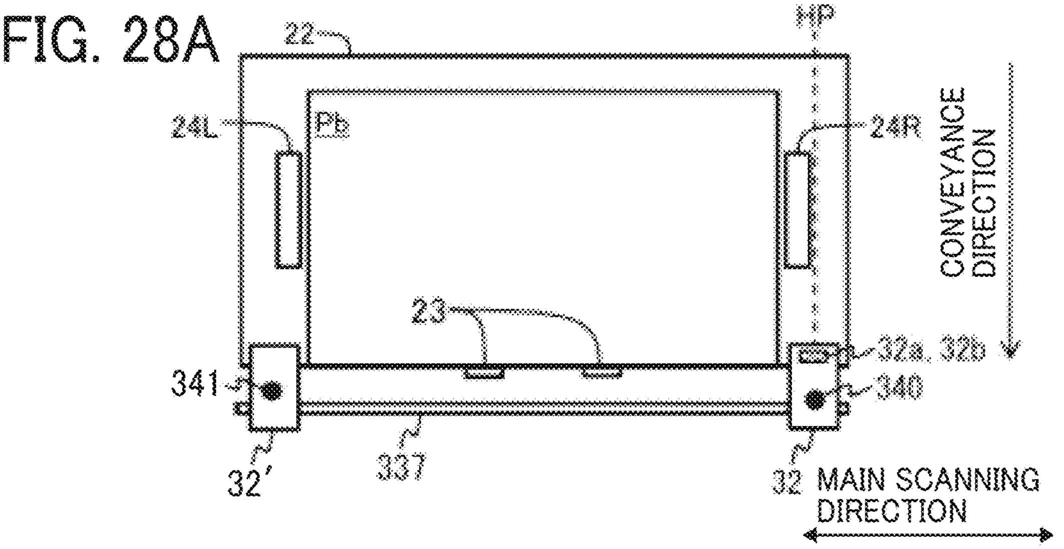
FIGS. 28A, 28B, and 28C are schematic views of an internal tray of the post-processing apparatus according to the second embodiment, viewed from a thickness direction of a sheet.
Figure 28B:
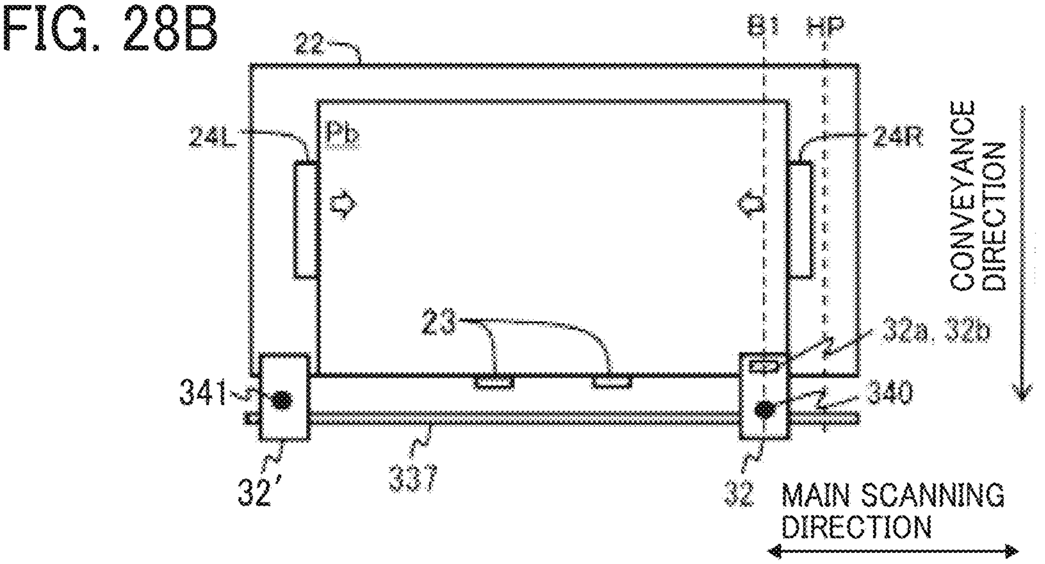
Figure 28C:
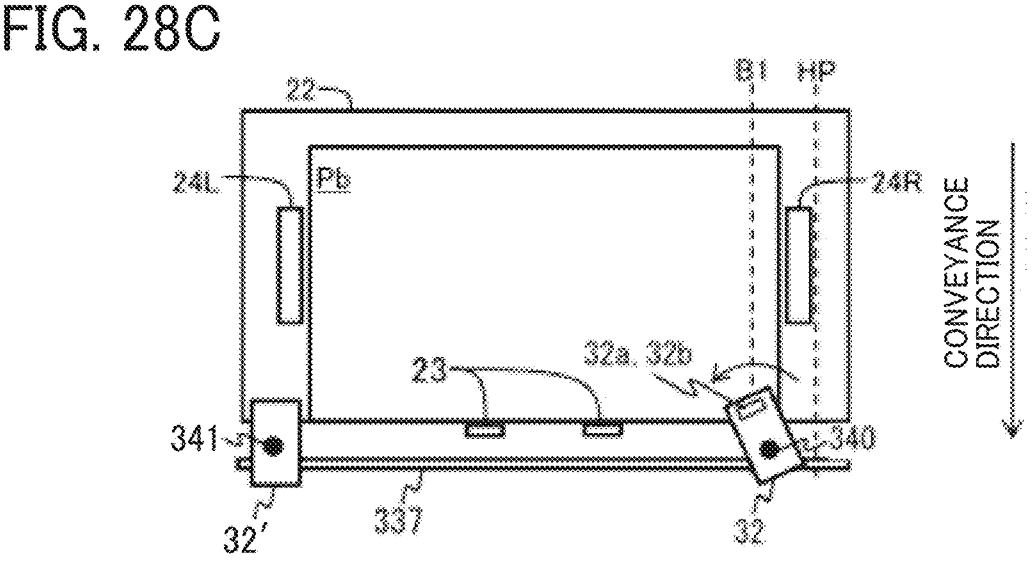

FIG. 27 is a diagram illustrating an internal configuration of the post-processing apparatus 3A according to the second embodiment of the present disclosure. As illustrated in FIGS. 28A, 28B, and 28C, the edge binder 25 includes a crimper 32 and a stapler 32'. As illustrated in FIGS. 28A, 28B, and 28C, the crimper 32 and the stapler 32' are disposed downstream from the internal tray 22 in the conveyance direction. In addition, the crimper 32 and the stapler 32' are located to face a downstream end, in the conveyance direction, of the sheet bundle Pb placed on the internal tray 22 and move in the main scanning direction. Further, the crimper 32 and the stapler 32' are pivoted about an axis extending in the thickness direction of the sheet bundle Pb placed on the internal tray 22. In other words, the crimper 32 and the stapler 32' bind, at a desired angle, a desired position in the main scanning direction on the sheet bundle Pb placed on the internal tray 22 in, for example, corner oblique binding, parallel one-point binding, or parallel two-point binding.

The crimper 32 presses and deforms the sheet bundle Pb with serrate binding teeth 32*a* and 32*b* to bind the sheet bundle Pb by crimping. On the other hand, the stapler 32' passes the staple through a crimp binding position on the sheet bundle Pb placed on the internal tray 22 to staple the sheet bundle Pb.

Figure 29:
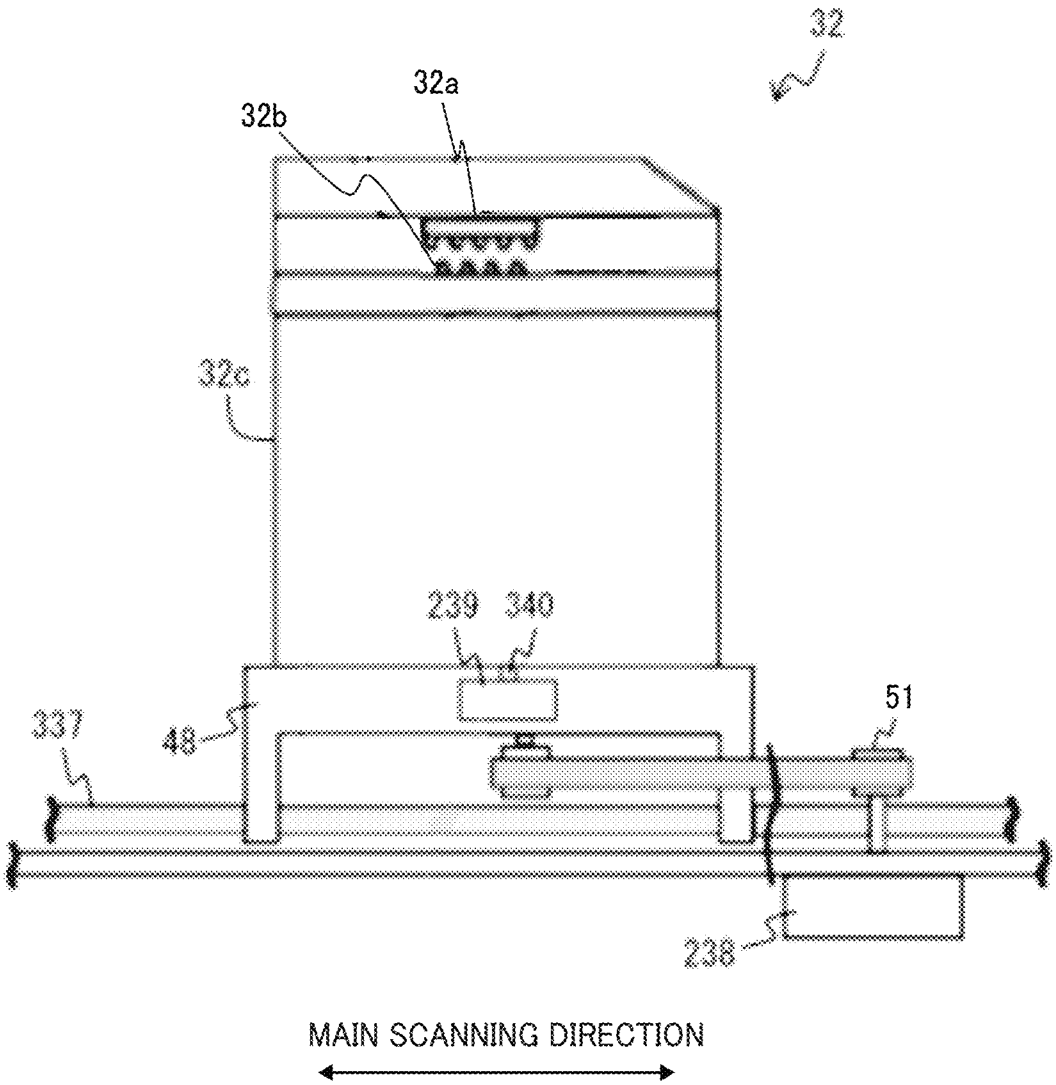
FIG. 29 is a schematic view of a downstream side of a crimper of the post-processing apparatus according to the second embodiment in a conveyance direction.

Each of FIGS. 28A, 28B, and 28C is a schematic view of the internal tray 22 in the thickness direction of the sheet bundle Pb. FIG. 29 is a schematic view of a downstream side of the crimper 32 in the conveyance direction. As illustrated in FIGS. 28A, 28B, and 28C, the crimper 32 and the stapler 32' are disposed downstream from the internal tray 22 in the conveyance direction. The crimper 32 moves in the main scanning direction along the surface of the sheet bundle Pb placed on the internal tray 22. The crimper 32 is also pivoted about a pivot 340 extending in the thickness direction of the sheet bundle Pb placed on the internal tray 22. Similarly, the stapler 32' moves in the main scanning direction of the sheet bundle Pb and is pivoted about a pivot 341 extending in the thickness direction of the sheet bundle Pb. The other configurations of the stapler 32' are similar to, even if not the same as, those of the second binder 55 (see FIG. 6) of the post-processing apparatus 3 according to the first embodiment, and thus a detailed description thereof is omitted.

More specifically, as illustrated in FIG. 29, a guide rail 337 extending in the main scanning direction is disposed downstream from the internal tray 22 in the conveyance direction. The crimper 32 is moved in the main scanning direction along the surface of the sheet bundle Pb placed on the internal tray 22, in other words, along the guide rail 337, by a driving force transmitted from a crimper movement motor 238 by a driving force transmission assembly 51 including a pulley and a timing belt. The pivot 340 is fixed to a bottom face of the crimping frame 32*c* that holds the components of the crimper 32. The pivot 340 is rotatably held by the base 48 on which the crimping frame 32*c* is disposed. When a driving force is transmitted from a pivot motor 239 to the pivot 340, the crimper 32 is pivoted about the pivot 340 extending in the thickness direction of the sheet P placed on the internal tray 22. The guide rail 337, the crimper movement motor 238, the pivot motor 239, the pivot 340, and the driving force transmission assembly 51 construct a driving assembly of the crimper 32.

The crimper 32 moves between the standby position HP illustrated in FIG. 28A and a position where the crimper 32 faces the crimp binding position B1 illustrated in FIGS. 28B and 28C. The standby position HP is away in the main scanning direction from the sheet bundle Pb placed on the internal tray 22. For example, in FIGS. 28A, 28B, and 28C, the standby position HP is distanced to the right of the sheet bundle Pb along the main scanning direction. The crimp binding position B1 is a position on the sheet bundle Pb placed on the internal tray 22. However, the specific position of the crimp binding position B1 is not limited to the position illustrated in FIGS. 28B and 28C. The binding position B1 may be one or more positions along the main scanning direction at the downstream end, in the conveyance direction, of the sheet P.

The posture of the crimper 32 changes or is pivoted between a parallel binding posture illustrated in FIG. 28B and an oblique binding posture illustrated in FIG. 28C. The parallel binding posture is a posture of the crimper 32 in which the length of the pair of binding teeth 32*a* and 32*b* (in other words, a rectangular crimp binding trace) is along the main scanning direction. The oblique binding posture is a posture of the crimper 32 in which the length of the pair of binding teeth 32*a* and 32*b* (in other words, the rectangular crimp binding trace) is inclined with respect to the main scanning direction.

The pivot angle, which is an angle of the pair of binding teeth 32*a* and 32*b* with respect to the main scanning direction, in the oblique binding posture is not limited to the angle illustrated in FIG. 28C. The pivot angle in the oblique binding posture may be any angle provided that the pair of binding teeth 32*a* and 32*b* faces the sheet bundle Pb placed on the internal tray 22.

Figure 35:
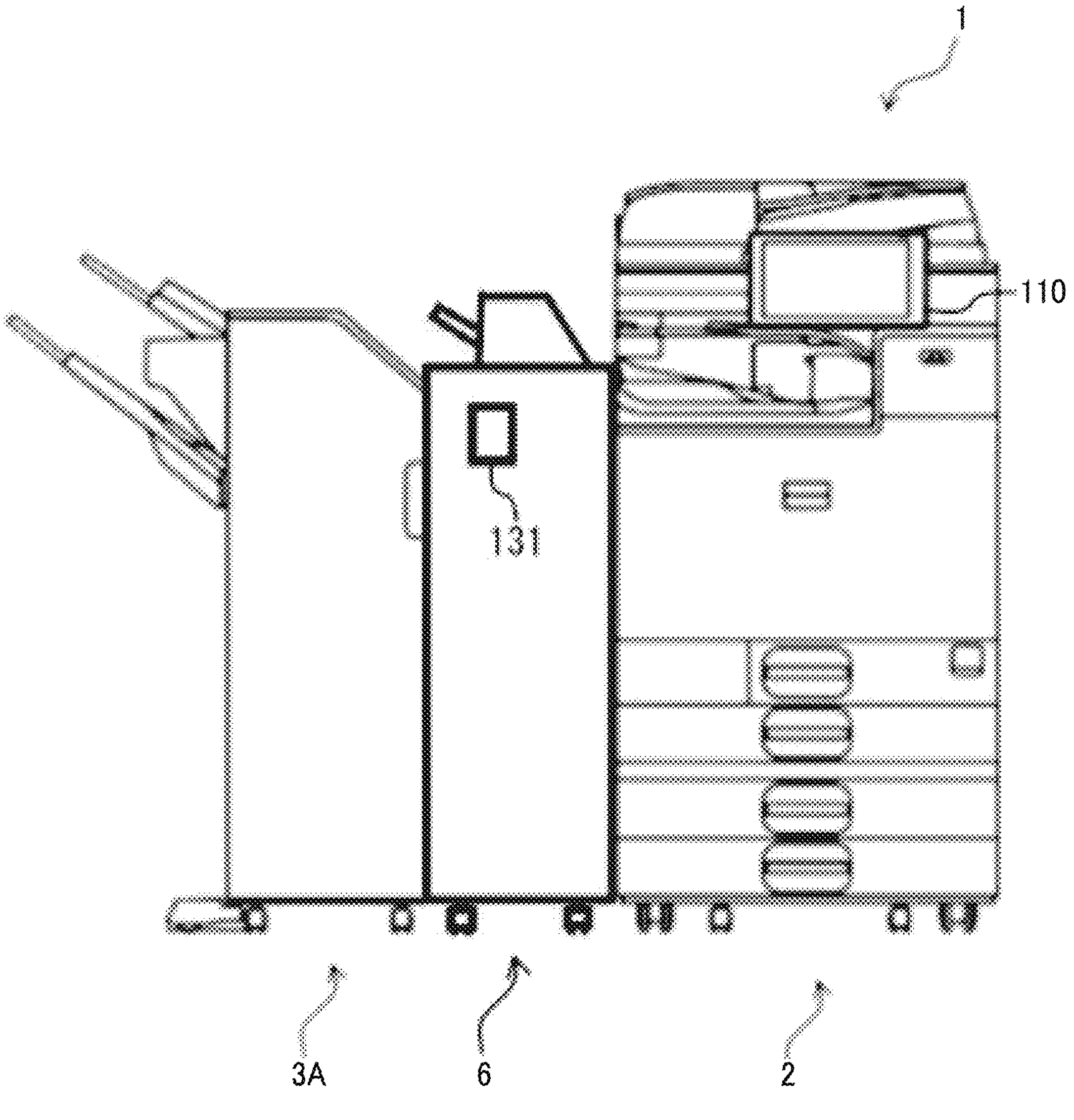
FIG. 35 is a diagram illustrating the overall configuration of an image forming system according to a modification of the embodiment illustrated in FIG. 1.

The post-processing apparatus 3A includes the liquid applier 131 and a hole punch 132 serving as a processor. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the arrangement illustrated in FIG. 27. For example, in a case where an inserter 6 is disposed between the image forming apparatus 2 and the post-processing apparatus 3A as illustrated in FIG. 35, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 30A:
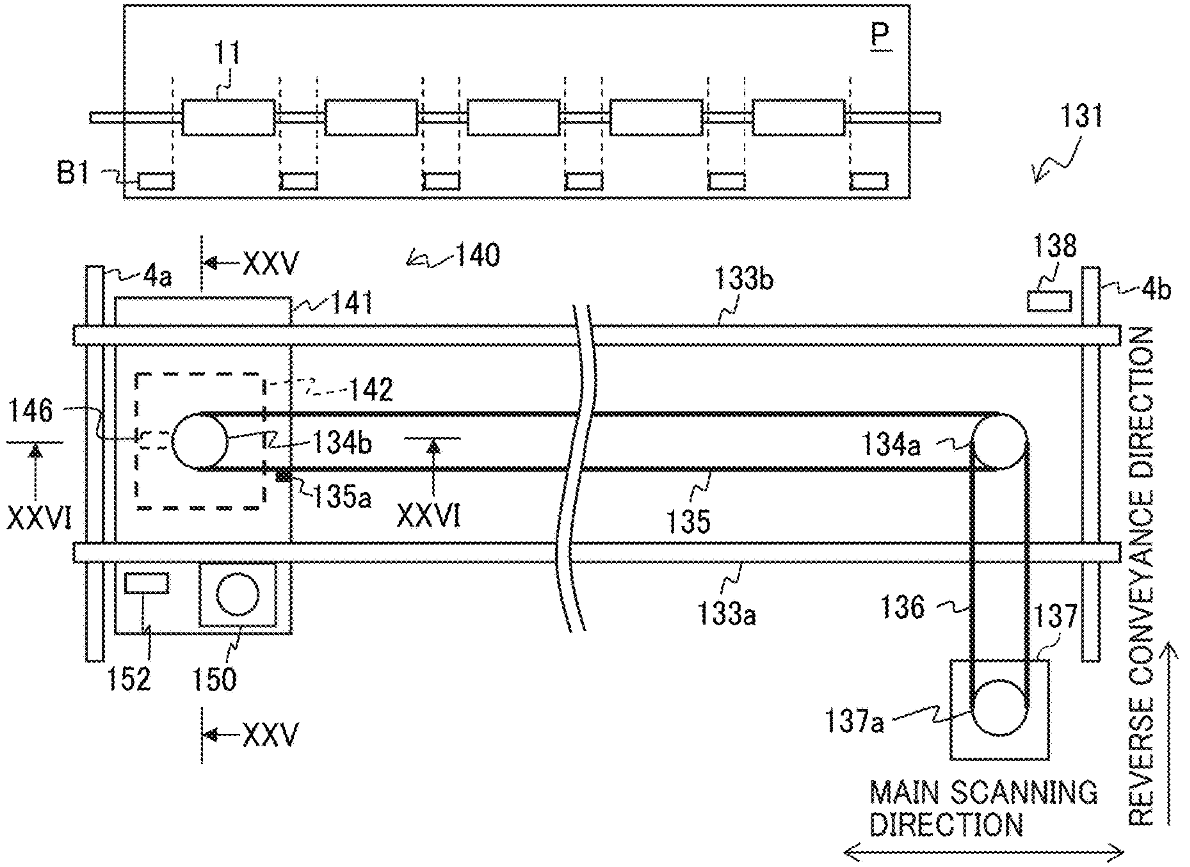
FIGS. 30A and 30B are schematic views of a liquid applier of the post-processing apparatus according to the second embodiment, viewed from the thickness direction of the sheet.

As illustrated in FIG. 30A, the conveyance roller pair 11 is located so as not to overlap, in the main scanning direction, the liquid application position B1 on the sheet P to which the liquid has been applied by a liquid application head 146 of the liquid applier 131. This is to prevent the amount of liquid at the liquid application position B1 from decreasing due to the plurality of roller pairs pressing the liquid application position B1 when the conveyance roller pair 11 conveys the sheet P. As a result, when the sheet P reaches the crimper 32 disposed downstream from the liquid applier 31 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 while the sheet P is conveyed.

In addition, the plurality of roller pairs of the conveyance roller pair 11 that is located so as not to overlap the liquid application position B1 on the sheet P in the main scanning direction prevents the conveying performance of the sheet P from being worse due to the adhesion of liquid to the plurality of roller pairs and further prevents a conveyance jam caused when the conveying performance of the sheet P is worsened. Although only the conveyance roller pair 11 has been described above, the plurality of roller pairs of the conveyance roller pairs 14 and 15 are preferably located so as not to overlap the liquid application position B1 on the sheet P in the main scanning direction, like the plurality of roller pairs of the conveyance roller pair 11.

The liquid applier 131 applies liquid (for example, water) to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processor disposed near the liquid applier 131 is not limited to the hole punch 132. Alternatively, the processor may be an inclination corrector that corrects an inclination or skew of the sheet P that is conveyed by the conveyance roller pairs 10 and 11.

Figure 30B:
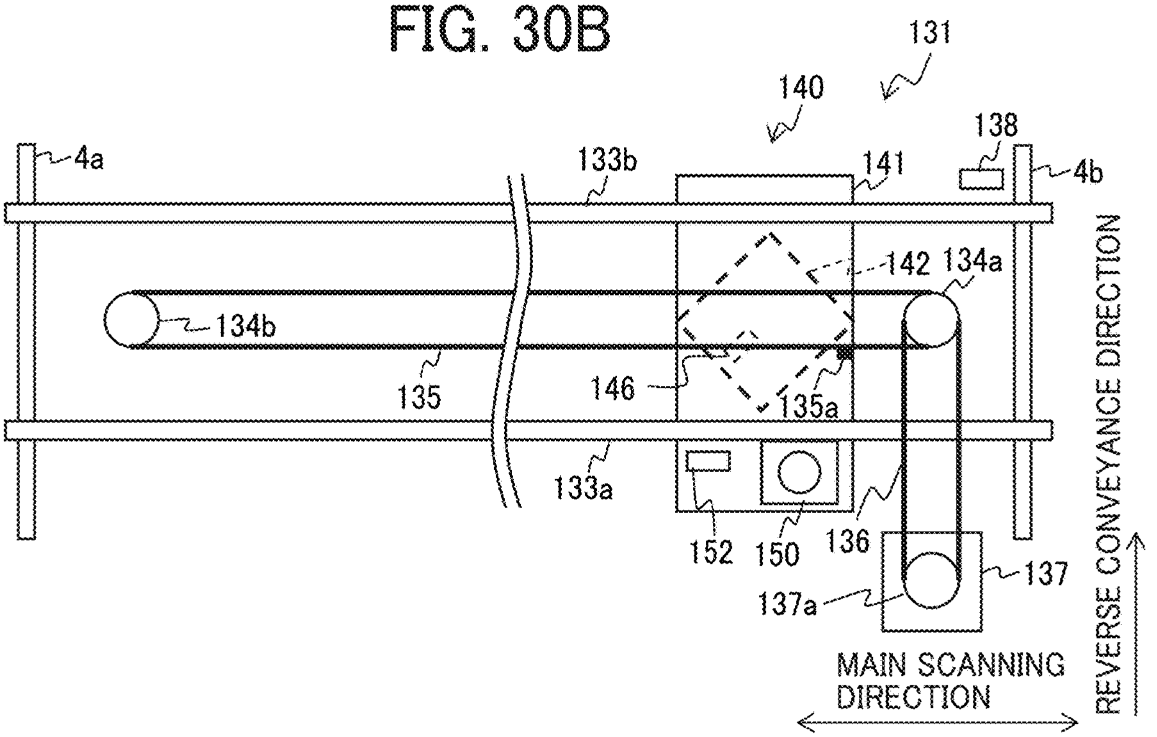
Figure 31C:
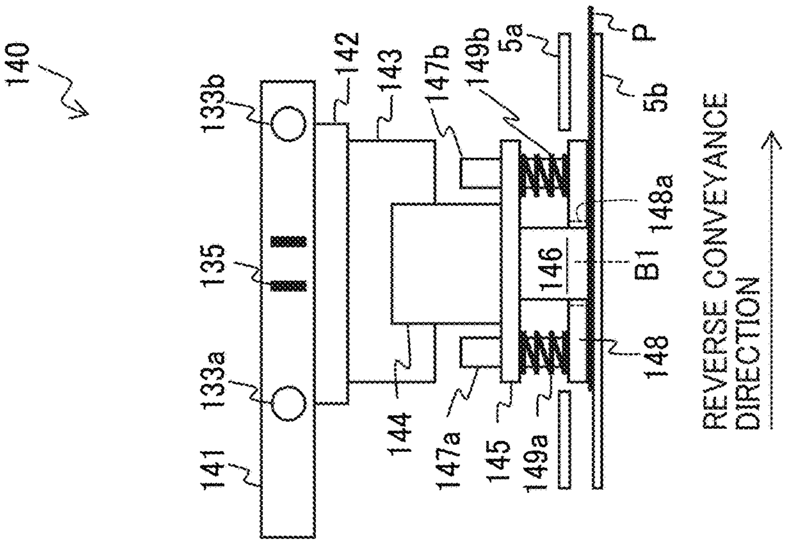
FIGS. 31A, 31B, and 31C are cross-sectional views of a liquid application unit of the liquid applier taken through XXV-XXV of FIG. 30A.
Figure 31B:
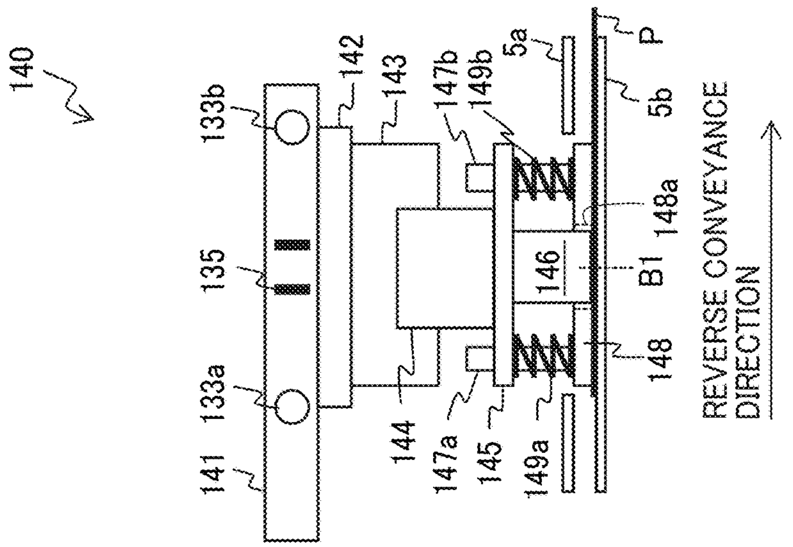
Figure 31A:
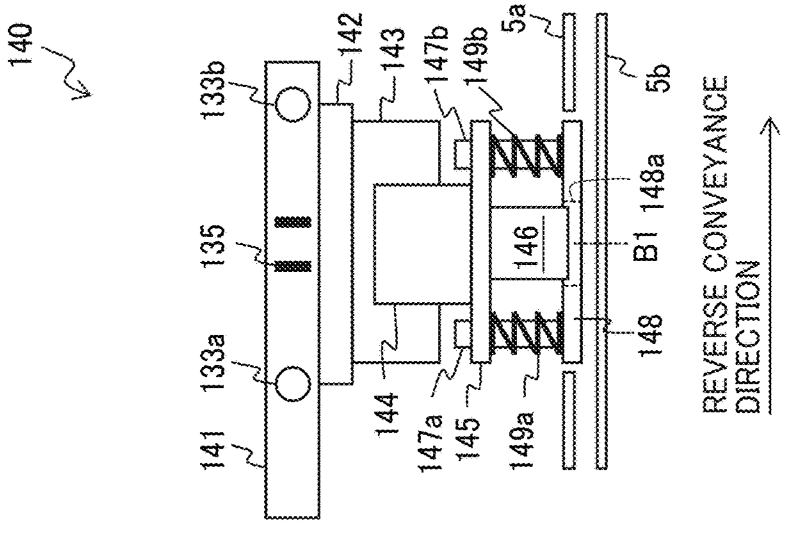
Figure 32A:
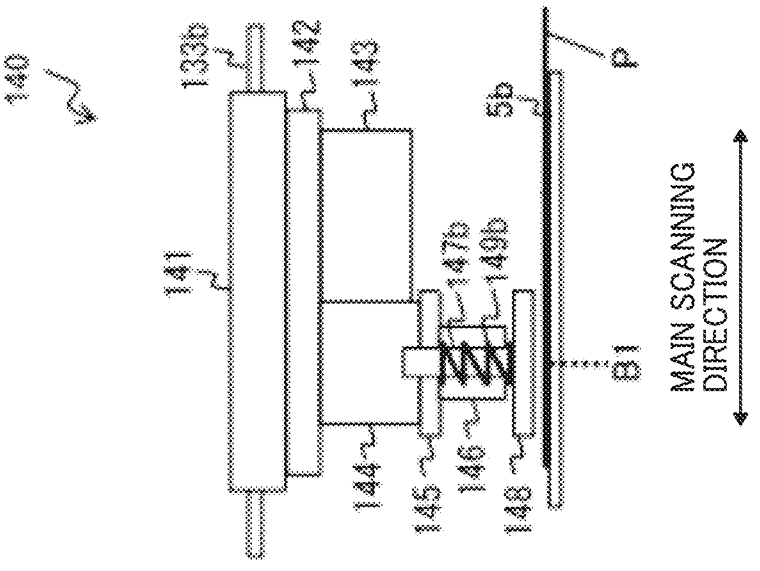
FIGS. 32A, 32B, and 32C are cross-sectional views of the liquid application unit of the liquid applier taken through XXVI-XXVI of FIG. 30A.
Figure 32B:
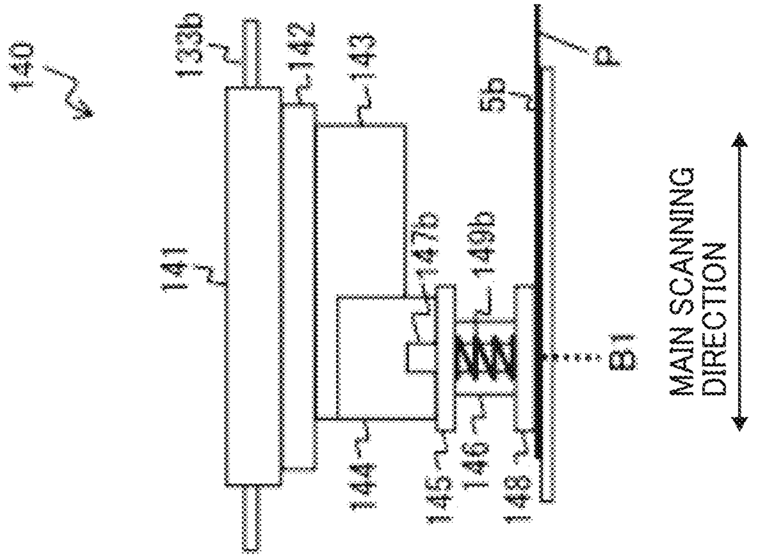
Figure 32C:
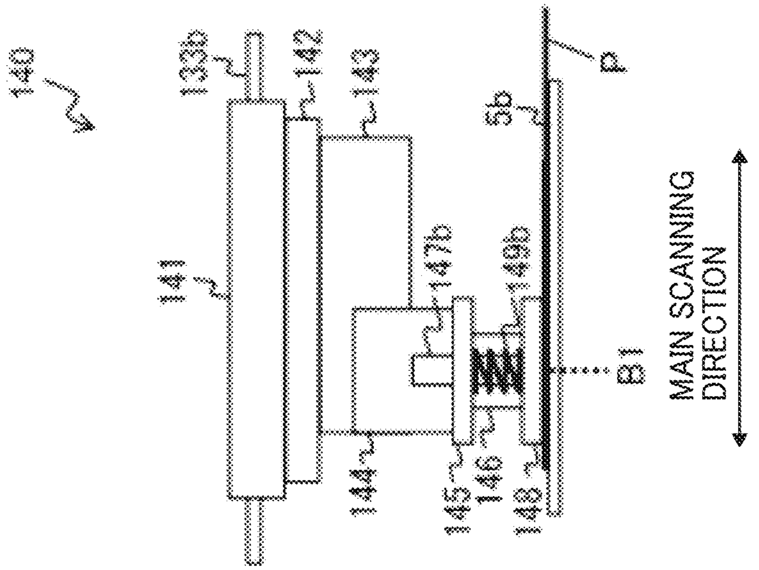

FIGS. 30A and 30B are views of the liquid applier 131 in the thickness direction of the sheet P, according to the second embodiment of the present disclosure. FIGS. 31A, 31B, and 31C are cross-sectional views of a liquid application unit 140 of the liquid applier 131 taken through XXV-XXV of FIG. 30A. FIGS. 32A, 32B, and 32C are cross-sectional views of the liquid application unit 140 of the liquid applier 131 taken through XXVI-XXVI of FIG. 30A. As illustrated in FIGS. 30A to 32C, the liquid applier 131 includes a pair of guide shafts 133*a* and 133*b*, a pair of pulleys 134*a* and 134*b*, endless annular belts 135 and 136, a liquid applier movement motor 137, a standby position sensor 138, and the liquid application unit 140.

The guide shafts 133*a* and 133*b*, each extending in the main scanning direction, are apart from each other in the reverse conveyance direction. The pair of guide shafts 133*a* and 133*b* is supported by a pair of side plates 4*a* and 4*b* of the post-processing apparatus 3A. On the other hand, the pair of guide shafts 133*a* and 133*b* supports the liquid application unit 140 such that the liquid application unit 140 can move in the main scanning direction.

The pair of pulleys 134*a* and 134*b* is disposed between the guide shafts 133*a* and 133*b* in the reverse conveyance direction. On the other hand, the pulleys 134*a* and 134*b* are apart from each other in the main scanning direction. The pair of pulleys 134*a* and 134*b* is supported by a frame of the post-processing apparatus 3A so as to be rotatable about an axis extending in the thickness direction of the sheet P.

The endless annular belt 135 is entrained around the pair of pulleys 134*a* and 134*b*. The endless annular belt 135 is coupled to the liquid application unit 140 by a connection 135*a*. The endless annular belt 136 is entrained around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the liquid applier movement motor 137 being switched.

The standby position sensor 138 detects that the liquid application unit 140 has reached a standby position in the main scanning direction. The standby position sensor 138 then outputs a standby position signal indicating the detection result to the controller 100, which will be described below with reference to FIG. 33. The standby position sensor 138 is, for example, an optical sensor including a light emitting unit and a light receiving unit. The liquid application unit 140 at the standby position blocks an optical path between the light emitting unit and the light receiver. Then, the standby position sensor 138 outputs the standby position signal in response to the light output from the light emitter not being received by the light receiver. The specific configuration of the standby position sensor 138 is not limited to the configuration described above.

As illustrated in FIGS. 31A, 31B, and 31C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 faces the conveyance passage through the opening of the upper guide plate 5*a* to face the sheet P conveyed along the conveyance passage.

Figure 33:
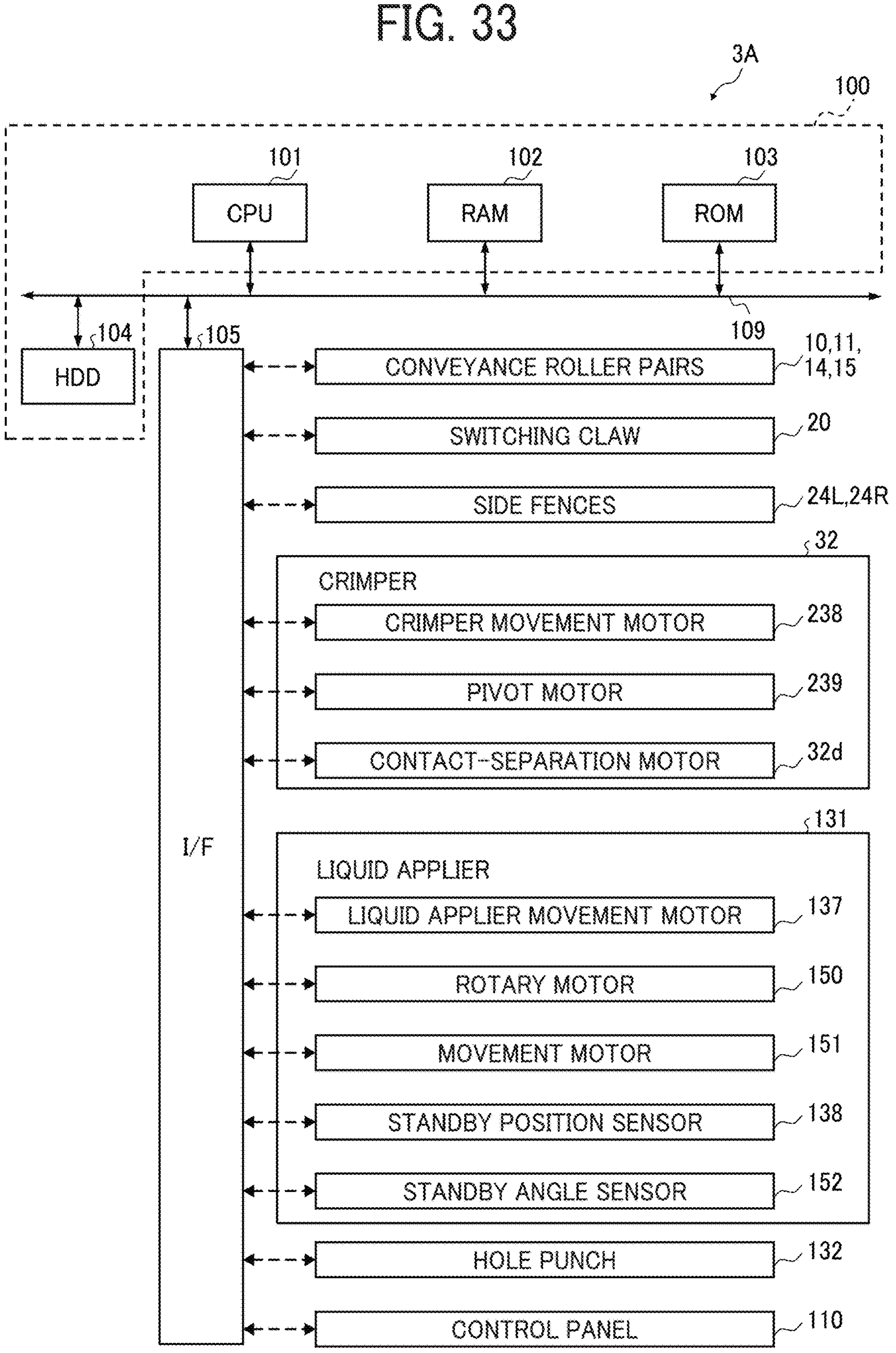
FIG. 33 is a block diagram illustrating a hardware configuration of the post-processing apparatus according to the second embodiment to control the operation of the post-processing apparatus.

As illustrated in FIGS. 30A to 32C, the liquid application unit 140 includes a base 141, a rotary bracket 142, a liquid storage tank 143, a mover 144, a holder 145, the liquid application head 146, columns 147*a* and 147*b*, a pressure plate 148, coil springs 149*a* and 149*b*, a rotary motor 150, a movement motor 151 illustrated in FIG. 33, and a standby angle sensor 152, which is also illustrated in FIG. 33.

The base 141 is supported by the pair of guide shafts 133*a* and 133*b* so as to be slidable in the main scanning direction. The base 141 is coupled to the endless annular belt 135 by the connection 135*a*. On the other hand, the base 141 supports the components of the liquid application unit 140 such as the rotary bracket 142, the liquid storage tank 143, the mover 144, the holder 145, the liquid application head 146, the columns 147*a* and 147*b*, the pressure plate 148, the coil springs 149*a* and 149*b*, the rotary motor 150, the movement motor 151, and the standby angle sensor 152.

The rotary bracket 142 is supported by a lower face of the base 141 so as to be pivotable about an axis extending in the thickness direction of the sheet P. The rotary bracket 142 is rotated with respect to the base 141 by a driving force transmitted from the rotary motor 150. On the other hand, the rotary bracket 142 supports the liquid storage tank 143, the mover 144, the holder 145, the liquid application head 146, the columns 147*a* and 147*b*, the pressure plate 148, and the coil springs 149*a* and 149*b*.

The standby angle sensor 152 detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitter and a light receiver. The rotary bracket 142 at the standby angle blocks an optical path between the light emitter and the light receiver. Then, the standby angle sensor 152 outputs the standby angle signal in response to the light output from the light emitter not being received by the light receiver. The specific configuration of the standby angle sensor 152 is not limited to the configuration described above.

Note that FIG. 30A illustrates the rotary bracket 142 in a position for the parallel binding that is performed by the crimper 32 disposed downstream from the liquid applier 131 in a direction in which the sheet P is conveyed. FIG. 30B illustrates the rotary bracket 142 in a position for the oblique binding (i.e., corner binding) that is performed by the crimper 32 disposed downstream from the liquid applier 131 in the direction in which the sheet P is conveyed.

The liquid storage tank 143 stores liquid to be applied to the sheet P. The mover 144 is supported by the liquid storage tank 143 so as to be movable (for example, up and down) in the thickness direction of the sheet P. The mover 144 is moved with respect to the liquid storage tank 143 by a driving force transmitted from the movement motor 151. The holder 145 is attached to a lower end of the mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (for example, sponge or fiber).

The columns 147*a* and 147*b* project downward from the holder 145 around the liquid application head 146. The columns 147*a* and 147*b* can move relative to the holder 145 in the thickness direction. The columns 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 downward with respect to the holder 145.

As illustrated in FIGS. 31A and 32A, before the sheet P is conveyed to the position where the sheet P faces the opening of the upper guide plate 5*a*, the pressure plate 148 is positioned at or above the opening. Next, when the sheet P conveyed by the conveyance roller pairs 10 and 11 stops at a position where the liquid application position B1 on the sheet P faces the opening, the movement motor 151 is rotated in the first direction. As a result, the mover 144, the holder 145, the liquid application head 146, the columns 147*a* and 147*b*, the pressure plate 148, and the coil springs 149*a* and 149*b* are moved down together to allow the pressure plate 148 to contact the sheet P. Note that the liquid application position B1 corresponds to the crimp binding position to be crimped and bound by the edge binder 25.

As the movement motor 151 keeps rotating in the first direction after the pressure plate 148 contacts the sheet P, the coil springs 149*a* and 149*b* are compressed to further move down the mover 144, the holder 145, the liquid application head 146, and the columns 147*a* and 147*b*. As a result, as illustrated in FIGS. 31B and 32B, a lower face of the liquid application head 146 contacts the sheet P through the through hole 148*a*. Then, the liquid contained in the liquid application head 146 is applied to the sheet P.

Further rotation of the movement motor 151 in the first direction further strongly presses the liquid application head 146 against the sheet P as illustrated in FIGS. 31C and 32C. Accordingly, the amount of liquid that is applied to the sheet P increases. In short, the liquid applier 131 changes the pressing force of the liquid application head 146 against the sheet P to adjust the amount of liquid that is applied to the sheet P.

On the other hand, the rotation of the movement motor 151 in the second direction opposite to the first direction moves up the mover 144, the holder 145, the liquid application head 146, the columns 147*a* and 147*b*, the pressure plate 148, and the coil springs 149*a* and 149*b* together. As a result, as illustrated in FIGS. 31A and 32A, the liquid application head 146 and the pressure plate 148 are separated from the sheet P. In other words, the liquid applier 131 includes the liquid application head 146 that can be separated from the sheet P.

FIG. 33 is a block diagram illustrating a hardware configuration of the post-processing apparatus 3A to control the operation of the post-processing apparatus 3A according to the second embodiment of the present disclosure. As illustrated in FIG. 33, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching claw 20, the side fences 24L and 24R, the crimper movement motor 238, the pivot motor 239, the contact-separation motor 32*d*, the liquid applier movement motor 137, the rotary motor 150, the movement motor 151, the standby position sensor 138, the standby angle sensor 152, the hole punch 132, and the control panel 110 to the common bus 109. The controller 100 controls operations of the conveyance roller pairs 10, 11, 14, and 15, the switching claw 20, the side fences 24L and 24R, the crimper movement motor 238, the pivot motor 239, the contact-separation motor 32*d*, the liquid applier movement motor 137, the rotary motor 150, the movement motor 151, and the hole punch 132 through the I/F 105. In addition, the controller 100 acquires detection results from the standby position sensor 138 and the standby angle sensor 152 through the I/F 105. Although FIG. 33 illustrates the components that execute the edge stitching process, the components that execute the saddle stitching process are also similarly controlled by the controller 100.

The control panel 110 includes an operation device that receives instructions input by a user and a display serving as a notifier that notifies the user of information. The operation device includes, for example, hard keys and a touch screen overlaid on a display. The control panel 110 acquires information from the user through the operation device and provides information to the user through the display.

Figure 34:
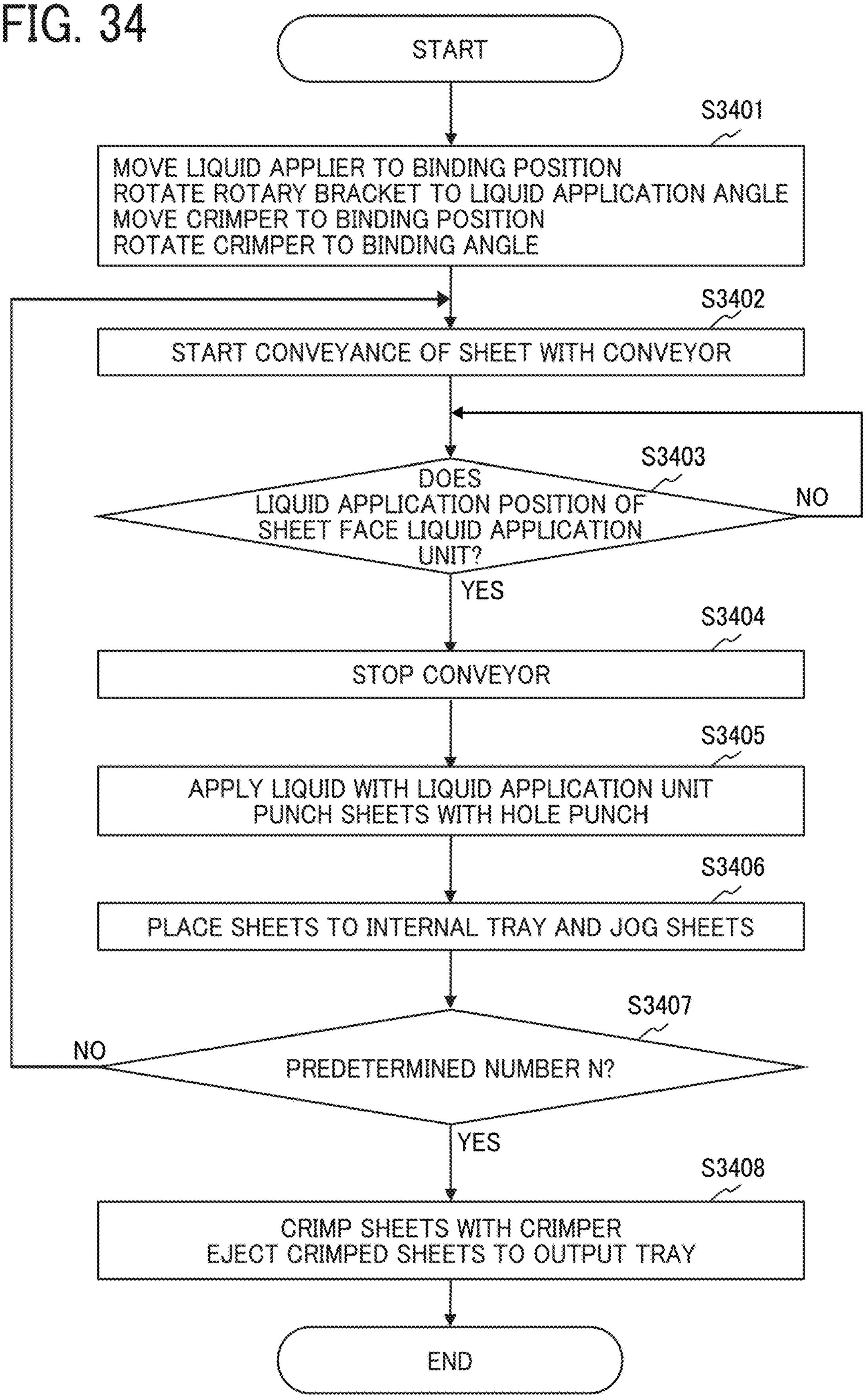
FIG. 34 is a flowchart of post-processing performed by the post-processing apparatus according to the second embodiment.

FIG. 34 is a flowchart of post-processing performed by the post-processing apparatus 3A according to the second embodiment. Specifically, FIG. 34 is a flowchart of a process to execute the one-point binding illustrated in FIGS. 15A to 15D.

For example, the controller 100 executes the post-processing illustrated in FIG. 34 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the crimp binding position B1 (corresponding to the liquid application position B1), a binding angle (corresponding to a liquid application angle), and an operation that is executed in parallel with the liquid application (i.e., punching a hole in the present embodiment). In the following description, the number of sheets P of the sheet bundle Pb may be referred to as a "predetermined number N." Note that, at the start of the post-processing, the liquid application unit 140 is at the standby position HP corresponding to the standby position HP illustrated in FIGS. 15A to 15D whereas the rotary bracket 142 is held at the standby angle.

First, in step S3401, the controller 100 drives the liquid applier movement motor 137 to move the liquid application unit 140 in the main scanning direction such that liquid application head 146 moves from the standby position HP to a position where the liquid application head 146 can face the liquid application position B1 corresponding to the crimp binding position B1 illustrated in FIGS. 15B and 15C. In addition, in step S3401, the controller 100 drives the rotary motor 150 to rotate the rotary bracket 142 such that the liquid application head 146 rotates from the standby angle to the liquid application angle. It is ascertained based on a pulse signal output from a rotary encoder of the liquid applier movement motor 137 that the liquid application head 146 has reached the position where the liquid application head 146 can face the liquid application position B1. Similarly, it is ascertained based on a pulse signal output from a rotary encoder of the rotary motor 150 that the liquid application head 146 has reached the liquid application angle.

Further, in step S3401, the controller 100 drives the crimper movement motor 238 to move the crimper 32 from the standby position HP to the position where the crimper 32 can face the crimp binding position B1 as illustrated in FIGS. 28A and 28B. Furthermore, in step S3401, the controller 100 drives the pivot motor 239 to rotate the crimper 32 from the standby angle to the binding angle, which may be referred to as a crimp binding angle in the following description. It is ascertained based on a pulse signal output from a rotary encoder of the crimper movement motor 238 that the crimper 32 has reached the position where the crimper 32 can face the crimp binding position B1. Similarly, it is ascertained based on a pulse signal output from a rotary encoder of the pivot motor 239 that the crimper 32 has reached the crimp binding angle.

Subsequently, in step S3402, the controller 100 drives the conveyance roller pairs 10 and 11 to start conveying the sheet P on which an image is formed by the image forming apparatus 2. In step S3403, the controller 100 determines whether the liquid application position B1 on the sheet P has faced the liquid application unit 140 (more specifically, the liquid application head 146). When the liquid application position B1 on the sheet P has not faced the liquid application head 146 (NO in step S3403), the controller 100 repeats the determination in step S3403. In other words, the controller 100 continues driving the conveyance roller pairs 10 and 11 until the liquid application position B1 on the sheet P faces the liquid application head 146. By contrast, when the liquid application position B1 on the sheet P has faced the liquid application head 146 (YES in step S3403), in step S3404, the controller 100 stops the conveyance roller pairs 10 and 11. It is ascertained based on a pulse signal output from a rotary encoder of a motor that drives the conveyance roller pairs 10 and 11 that the liquid application position B1 on the sheet P has faced the liquid application head 146.

In step S3405, the controller 100 executes the process of applying the liquid to the liquid application position B1 on the sheet P with the liquid applier 131 and the process of punching a hole in the sheet P with the hole punch 132 in parallel. More specifically, the controller 100 rotates the movement motor 151 in the first direction to bring the liquid application head 146 into contact with the liquid application position B1 on the sheet P. In addition, the controller 100 changes the pressing force of the liquid application head 146 (in other words, the amount of rotation of the movement motor 151) depending on the amount of liquid that is applied to the sheet P.

The amount of liquid that is applied to the sheet P may be the same for all the sheets P of the sheet bundle Pb or may be different for each sheet P. For example, the controller 100 may apply a decreased amount of liquid to the sheet P conveyed later. The amount of rotation of the movement motor 151 may be ascertained based on a pulse signal output from a rotary encoder of the movement motor 151.

In step S3406, the controller 100 drives the conveyance roller pairs 10, 11, 14, and 15 to place the sheet P on the internal tray 22. The controller 100 moves the side fences 24L and 24R to align the position of the sheet bundle Pb placed on the internal tray 22 in the main scanning direction. In short, the controller 100 performs so-called jogging.

In step S3407, the controller 100 determines whether or not the number of sheets P placed on the internal tray 22 has reached the given number N of sheets indicated by the post-processing command. When the controller 100 determines that the number of sheets P placed on the internal tray 22 has not reached the given number N of sheets (NO in step S3407), the controller 100 executes the operations of steps S3402 to S3406 again.

By contrast, when the controller 100 determines that the number of sheets P that are placed on the internal tray 22 has reached the given number N of sheets (YES in step S3407), in step S3408, the controller 100 causes the crimper 32 to crimp and bind the crimp binding position B1 (corresponding to the liquid application position B1) on the sheet bundle Pb to which the liquid has been applied by the liquid applier 131. In addition, in step S3408, the controller 100 rotates the conveyance roller pair 15 to output the sheet bundle Pb thus crimped and bound to the output tray 26. Then, the controller 100 drives the liquid applier movement motor 137 to move the liquid applier 131 to the standby position HP and drives the crimper movement motor 238 to move the crimper 32 to the standby position HP.

The embodiments of the present disclosure are applied to the edge binder 25 that executes the edge stitching as described above. However, the embodiments of the present disclosure may be applied to the saddle binder 28 that executes the saddle stitching.

As described above, the control method by the controller 100 described above is implemented by cooperation between hardware resources of a computer and a program as computer software. That is, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Now, a description is given of some aspects of the present disclosure.

Aspect 1

A medium processing apparatus includes: a liquid applier to apply liquid to a liquid application position of a medium; a crimper to press and deform at least a part to which the liquid is applied by the liquid applier, to bind a plurality of media including the medium to which the liquid is applied; a stapler to perform stapling with a staple on a medium bundle in which the plurality of media is bound by the crimper; and a controller to: control operations of the crimper, the liquid applier, and the stapler; and selectively switch between first binding performed by the liquid applier and the crimper and second binding performed by only the stapler, in accordance with information on the medium or a binding position at which the medium bundle is bound by the crimper.

Aspect 2

In the medium processing apparatus according to aspect 1, the controller executes the first binding with the liquid applier and the crimper to perform when the information on the medium is less than a first threshold number of media, and executes the second binding with only the stapler when the information on the medium is equal to or greater than the first threshold number of media.

Aspect 3

In the medium processing apparatus according to aspect 1 or 2, the controller executes third binding with only the crimper when the information on the medium is equal to or less than a second threshold number of media that is less than the first threshold number of media.

Aspect 4

The medium processing apparatus according to any one of aspects 1 to 3 further includes a threshold setting unit to allow a user to set the first threshold number of media and a second threshold number of media that is less than the first threshold number of media.

Aspect 5

The medium processing apparatus according to any one of aspects 1 to 4, further comprising a switching confirmation unit to allow a user to confirm execution and non-execution of switching between the first binding and the second binding.

Aspect 6

In the medium processing apparatus according to any one of aspects 1 to 5, the first binding and the second binding are selectable for a user.

Aspect 7

The medium processing apparatus according to any one of aspects 3 to 6 further includes a liquid amount sensor to detect a remaining amount of liquid used for application of the liquid. The controller executes the second binding or the third binding when the remaining amount of liquid is insufficient with respect to a number of media constituting the medium bundle.

Aspect 8

In the medium processing apparatus according to any one of aspects 1 to 7, the controller executes the second binding or the third binding when an abnormality occurs in the liquid applier.

Aspect 9

In the medium processing apparatus according to any one of aspects 1 to 8, the information on the medium is at least one of a number of media constituting the medium bundle, a thickness of the medium, and a type of the medium.

Aspect 10

In the medium processing apparatus according to any one of aspects 1 to 9, the binding position is a corner portion of the medium bundle or an end portion of the medium bundle along any one side of the medium bundle.

Aspect 11

An image forming system includes an image forming apparatus including an image forming unit to form images on a plurality of media; and the medium processing apparatus according to any one of aspects 1 to 10 to perform a binding operation on the medium bundle including the plurality of media on which the images are formed by the image forming apparatus.

Aspect 12

A program product to cause the crimper, the liquid applier, and the stapler to operate when executed in the controller of the medium processing apparatus according to any one of aspects 1 to 10.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A medium processing apparatus, comprising:
- a liquid applier configured to apply liquid to a liquid application position of a medium;
- a crimper configured to press and deform at least a part to which the liquid is applied by the liquid applier, to bind a plurality of media including the medium to which the liquid is applied;
- a stapler configured to perform stapling with a staple on a medium bundle including the plurality of media; and
- circuitry configured to:
  - control operations of the crimper, the liquid applier, and the stapler;
  - selectively switch between first binding performed by the liquid applier and the crimper and second binding performed by only the stapler, in accordance with information on the medium or a binding position at which the medium bundle is bound by the crimper;
  - execute the first binding with the liquid applier and the crimper when the information on the medium is less than a first threshold number of media; and
  - execute the second binding with only the stapler when the information on the medium is equal to or greater than the first threshold number of media.

2. The medium processing apparatus according to claim 1, wherein the circuitry is configured to execute third binding with only the crimper when the information on the medium is equal to or less than a second threshold number of media that is less than the first threshold number of media.

3. The medium processing apparatus according to claim 1, further comprising an operation device configured to confirm execution and non-execution of switching between the first binding and the second binding.

4. The medium processing apparatus according to claim 1, wherein the first binding and the second binding are selectable.

5. The medium processing apparatus according to claim 1, wherein the information on the medium is at least one of a number of media constituting the medium bundle, a thickness of the medium, or a type of the medium.

6. The medium processing apparatus according to claim 1, wherein the binding position is a corner portion of the medium bundle or an end portion of the medium bundle along any one side of the medium bundle.

7. An image forming system, comprising:
- an image forming apparatus configured to form images on a plurality of media; and
- the medium processing apparatus according to claim 1, configured to perform a binding operation on the medium bundle including the plurality of media on which the images are formed by the image forming apparatus.

8. A non-transitory computer-readable storage medium storing program code to be executed in the circuitry of the medium processing apparatus according to claim 1 to configure the circuitry to control the operations of the crimper, the liquid applier, and the stapler.

9. A medium processing apparatus, comprising:
- a liquid applier configured to apply liquid to a liquid application position of a medium;
- a crimper configured to press and deform at least a part to which the liquid is applied by the liquid applier, to bind a plurality of media including the medium to which the liquid is applied;
- a stapler configured to perform stapling with a staple on a medium bundle including the plurality of media;
- circuitry configured to:
  - control operations of the crimper, the liquid applier, and the stapler;
  - selectively switch between first binding performed by the liquid applier and the crimper and second binding performed by only the stapler, in accordance with information on the medium or a binding position at which the medium bundle is bound by the crimper;
  - execute the first binding with the liquid applier and the crimper when the information on the medium is less than a first threshold number of media; and
  - execute the second binding with only the stapler when the information on the medium is equal to or greater than the first threshold number of media; and
- an operation device configured to set the first threshold number of media and a second threshold number of media that is less than the first threshold number of media.

10. The medium processing apparatus according to claim 9, wherein the circuitry is configured to execute third binding with only the crimper when the information on the medium is equal to or less than a second threshold number of media that is less than the first threshold number of media.

11. The medium processing apparatus according to claim 9, further comprising an operation device configured to confirm execution and non-execution of switching between the first binding and the second binding.

12. The medium processing apparatus according to claim 9, wherein the first binding and the second binding are selectable.

13. The medium processing apparatus according to claim 9, wherein the information on the medium is at least one of a number of media constituting the medium bundle, a thickness of the medium, or a type of the medium.

14. The medium processing apparatus according to claim 9, wherein the binding position is a corner portion of the medium bundle or an end portion of the medium bundle along any one side of the medium bundle.

15. An image forming system, comprising:
- an image forming apparatus configured to form images on a plurality of media; and
- the medium processing apparatus according to claim 9, configured to perform a binding operation on the medium bundle including the plurality of media on which the images are formed by the image forming apparatus.

16. A non-transitory computer-readable storage medium storing program code to be executed in the circuitry of the medium processing apparatus according to claim 9 to configure the circuitry to control the operations of the crimper, the liquid applier, and the stapler.

17. A medium processing apparatus, comprising:
- a liquid applier configured to apply liquid to a liquid application position of a medium;

a crimper configured to press and deform at least a part to which the liquid is applied by the liquid applier, to bind a plurality of media including the medium to which the liquid is applied;

a stapler configured to perform stapling with a staple on a medium bundle including the plurality of media; and circuitry configured to:

control operations of the crimper, the liquid applier, and the stapler;

selectively switch between first binding performed by the liquid applier and the crimper and second binding performed by only the stapler, in accordance with information on the medium or a binding position at which the medium bundle is bound by the crimper;

execute the first binding with the liquid applier and the crimper when the information on the medium is less than a first threshold number of media; and execute the second binding with only the stapler when the information on the medium is equal to or greater than the first threshold number of media, wherein the circuitry is configured to execute third binding with only the crimper when the information on the medium is equal to or less than a second threshold number of media that is less than the first threshold number of media; and a liquid amount sensor configured to detect a remaining amount of liquid used for application of the liquid, wherein the circuitry is configured to execute the second binding or the third binding when the remaining amount of liquid is insufficient with respect to a number of media constituting the medium bundle.

18. A medium processing apparatus, comprising:

a liquid applier configured to apply liquid to a liquid application position of a medium;

a crimper configured to press and deform at least a part to which the liquid is applied by the liquid applier, to bind a plurality of media including the medium to which the liquid is applied;

a stapler configured to perform stapling with a staple on a medium bundle including the plurality of media; and circuitry configured to:

control operations of the crimper, the liquid applier, and the stapler;

selectively switch between first binding performed by the liquid applier and the crimper and second binding performed by only the stapler, in accordance with information on the medium or a binding position at which the medium bundle is bound by the crimper;

execute the first binding with the liquid applier and the crimper when the information on the medium is less than a first threshold number of media; and execute the second binding with only the stapler when the information on the medium is equal to or greater than the first threshold number of media, wherein the circuitry is configured to execute third binding with only the crimper when the information on the medium is equal to or less than a second threshold number of media that is less than the first threshold number of media; and wherein the circuitry is configured to execute the second binding or the third binding when an abnormality occurs in the liquid applier.

* * * * *